(12) United States Patent
Ota et al.

(10) Patent No.: US 12,411,313 B2
(45) Date of Patent: Sep. 9, 2025

(54) IMAGING LENS AND IMAGING APPARATUS

(71) Applicant: FUJIFILM Corporation, Tokyo (JP)

(72) Inventors: Motoari Ota, Saitama (JP); Daiki Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 392 days.

(21) Appl. No.: 18/169,495

(22) Filed: Feb. 15, 2023

(65) Prior Publication Data

US 2023/0266565 A1    Aug. 24, 2023

(30) Foreign Application Priority Data

Feb. 24, 2022  (JP) ................. 2022-027159

(51) Int. Cl.
*G02B 13/00* (2006.01)
*G02B 9/10* (2006.01)
*G02B 9/12* (2006.01)

(52) U.S. Cl.
CPC ............. *G02B 13/003* (2013.01); *G02B 9/10* (2013.01); *G02B 9/12* (2013.01); *G02B 13/0035* (2013.01)

(58) Field of Classification Search
CPC ... G02B 9/10; G02B 9/12; G02B 9/64; G02B 13/00; G02B 13/003; G02B 13/0035; G02B 13/0045; G02B 13/02; G02B 13/04; G02B 13/18
See application file for complete search history.

(56) References Cited

U.S. PATENT DOCUMENTS

| | | |
|---|---|---|
| 2011/0317282 A1 | 12/2011 | Kimura |
| 2012/0069440 A1 | 3/2012 | Harada et al. |
| 2013/0265653 A1 | 10/2013 | Kimura |
| 2014/0153118 A1 | 6/2014 | Onozaki |
| 2015/0338605 A1 | 11/2015 | Nishio et al. |
| 2017/0108673 A1 | 4/2017 | Ichikawa |
| 2018/0074289 A1 | 3/2018 | Ichikawa et al. |
| 2019/0033563 A1 | 1/2019 | Ichikawa et al. |
| 2019/0086650 A1 | 3/2019 | Kunugise et al. |
| 2019/0258027 A1 | 8/2019 | Kunugise |
| 2020/0103634 A1 | 4/2020 | Okada et al. |
| 2021/0088762 A1 | 3/2021 | Saito |

FOREIGN PATENT DOCUMENTS

| | | |
|---|---|---|
| JP | 2012-027451 A | 2/2012 |
| JP | 2012-083705 A | 4/2012 |
| JP | 2014-109711 A | 6/2014 |
| JP | 2016-009170 A | 1/2016 |
| JP | 2016-012034 A | 1/2016 |
| JP | 2016-038418 A | 3/2016 |
| JP | 2016-184136 A | 10/2016 |

(Continued)

*Primary Examiner* — Jack Dinh
(74) *Attorney, Agent, or Firm* — Studebaker Brackett PLLC

(57) ABSTRACT

An imaging lens includes, in order from the object side, a first lens group that has a negative refractive power and a second lens group that has a positive refractive power. During focusing, only the second lens group moves. The first lens group includes three negative lenses successively in order from a position closest to the object side. Assuming that an open F number is FNo, a maximum half angle of view is ω, a back focal length is Bf, and a focal length of the whole system f, the imaging lens satisfies $0.8<FNo/\tan\omega<1.9$ and $0.3<Bf/(f\times\tan\omega)<1.2$.

20 Claims, 28 Drawing Sheets

EXAMPLE 1

(56) References Cited

FOREIGN PATENT DOCUMENTS

| | | |
|---|---|---|
| JP | 2017-167327 A | 9/2017 |
| JP | 2018-081161 A | 5/2018 |
| JP | 2019-053236 A | 4/2019 |
| JP | 2019-197130 A | 11/2019 |
| JP | 2019-204115 A | 11/2019 |
| JP | 2020-052349 A | 4/2020 |
| JP | 2021-047384 A | 3/2021 |
| JP | 2021-157086 A | 10/2021 |
| JP | 2021-173954 A | 11/2021 |
| WO | 2016/194113 A1 | 12/2016 |
| WO | 2017/168603 A1 | 10/2017 |

EXAMPLE 1

EXAMPLE 1

EXAMPLE 2

EXAMPLE 3

EXAMPLE 3

EXAMPLE 3

EXAMPLE 4

EXAMPLE 6

EXAMPLE 6

EXAMPLE 7

EXAMPLE 7

EXAMPLE 8

EXAMPLE 8

EXAMPLE 9

EXAMPLE 9

EXAMPLE 10

EXAMPLE 11

EXAMPLE 12

IMAGING LENS AND IMAGING APPARATUS

CROSS-REFERENCE TO RELATED APPLICATIONS

This application claims priority from Japanese Patent Application No. 2022-027159, filed on Feb. 24, 2022, the entire disclosure of which is incorporated herein by reference.

BACKGROUND OF THE INVENTION

Technical Field

A technique of the present disclosure relates to an imaging lens and an imaging apparatus.

Related Art

In the related art, as an imaging lens that can be used in an imaging apparatus such as a digital camera, imaging lenses described in JP2021-157086A and JP2017-167327A below are known.

There is a demand for an imaging lens having a small size, a small F number, and a wide angle of view, and maintaining favorable optical performance. The demand level is increasing year by year.

SUMMARY

The present disclosure has been made in view of the above circumstances, and has an object to provide an imaging lens having a small size, a small F number, and a wide angle of view, and maintaining favorable optical performance, and an imaging apparatus comprising the imaging lens.

An imaging lens according to one aspect of the present disclosure comprises, successively in order from a position closest to an object side to an image side: a first lens group that has a negative refractive power; and a second lens group that has a positive refractive power.

Only the second lens group moves along an optical axis during focusing. The first lens group includes, successively in order from the position closest to the object side to the image side, a first negative lens, a second negative lens, and a third negative lens. Conditional Expressions (1) and (2) are satisfied. The symbols of Conditional Expressions are defined as follows. It is assumed that an open F number in a state where the infinite distance object is in focus is FNo. It is assumed that a maximum half angle of view in a state where the infinite distance object is in focus is $\omega$. It is assumed that a back focal length of a whole system at an air-equivalent distance in a state where the infinite distance object is in focus is Bf. It is assumed that a focal length of the whole system in a state where the infinite distance object is in focus is f.

$$0.8 < FNo/\tan \omega < 1.9 \qquad (1)$$

$$0.3 < Bf/(f \times \tan \omega) < 1.2 \qquad (2)$$

Assuming that a sum of Bf and a distance on the optical axis from a lens surface closest to the object side in the imaging lens to a lens surface closest to the image side in the imaging lens is TTL, it is preferable that the imaging lens of the above-mentioned aspect satisfies Conditional Expression (3).

$$6 < TTL \times FNo/(f \times \tan \omega) < 15 \qquad (3)$$

Assuming that a distance on the optical axis from a lens surface closest to the object side in the imaging lens to a paraxial entrance pupil position in a state where the infinite distance object is in focus is Denp, it is preferable that the imaging lens of the above-mentioned aspect satisfies Conditional Expression (4).

$$0.7 < Denp/f < 3 \qquad (4)$$

Assuming that the focal length of the second lens group is f2, it is preferable that the imaging lens of the above-mentioned aspect satisfies Conditional Expression (5).

$$0.2 < f/f2 < 0.7 \qquad (5)$$

Assuming that a combined focal length between the first negative lens and the second negative lens is fL12, it is preferable that the imaging lens of the above-mentioned aspect satisfies Conditional Expression (6).

$$-2.75 < f/fL12 < -0.75 \qquad (6)$$

In a configuration in which the imaging lens includes an aperture stop, it is preferable that the imaging lens according to the above-mentioned aspect satisfies Conditional Expression (7). The symbols of Conditional Expressions are defined as follows. It is assumed that a sum of Bf and a distance on the optical axis from the aperture stop to a lens surface closest to the image side in the imaging lens in a state where the infinite distance object is in focus is STI. It is assumed that a sum of Bf and a distance on the optical axis from a lens surface closest to the object side in the imaging lens to the lens surface closest to the image side in the imaging lens is TTL.

$$0.25 < STI/TTL < 0.6 \qquad (7)$$

In a configuration in which the first lens group includes an air lens formed of two concave lens surfaces facing toward each other, assuming that a paraxial curvature radius of an object side surface of the air lens of the first lens group is Rf, and a paraxial curvature radius of an image side surface of the air lens of the first lens group is Rr, it is preferable that the imaging lens of the above-mentioned aspect satisfies Conditional Expression (8).

$$-1 < (Rf+Rr)/(Rf-Rr) < 0.5 \qquad (8)$$

Assuming that a height of a principal ray with a maximum image height from an optical axis in a plane which is perpendicular to the optical axis and which passes through an intersection between the optical axis and a lens surface closest to the object side in the imaging lens in a state where the infinite distance object is in focus is HG1, it is preferable that the imaging lens of the above-mentioned aspect satisfies Conditional Expression (9).

$$0.5 < HG1/(f \times \tan \omega) < 2.5 \qquad (9)$$

It is preferable that the first negative lens and the second negative lens are configured to be meniscus lenses having surfaces convex toward the object side. In such a configuration, assuming that a paraxial curvature radius of an object side surface of the first negative lens is R1f, and a paraxial curvature radius of an image side surface of the first negative lens is R1r, it is preferable that the first negative lens of the above-mentioned aspect satisfies Conditional Expression (10).

$$1 < (R1f+R1r)/(R1f-R1r) < 3 \qquad (10)$$

It is preferable that the first lens group includes a positive lens disposed adjacent to the image side of the third negative lens, and the third negative lens and the positive lens are cemented to each other.

The imaging lens according to the above-mentioned aspect may be configured to consist of, in order from the object side to the image side, the first lens group, the second lens group, and a third lens group that has a positive or negative refractive power. In such a configuration, assuming that a focal length of the third lens group is f3, it is preferable that the imaging lens of the above-mentioned aspect satisfies Conditional Expression (11).

$$-0.1 < f/f3 < 0.25 \quad (11)$$

Assuming that an average value of a refractive index of the first negative lens at a d line and a refractive index of the second negative lens at the d line is NL12ave, it is preferable that the imaging lens of the above-mentioned aspect satisfies Conditional Expression (12).

$$1.5 < NL12ave < 1.95 \quad (12)$$

It is preferable that the imaging lens of the above-mentioned aspect includes two or more cemented lenses closer to the image side than the first lens group. For example, the imaging lens according to the above-mentioned aspect may be configured to include three cemented lenses closer to the image side than the first lens group.

The first lens group may be configured to include four positive lenses. It is preferable that the first lens group includes five negative lenses.

It is preferable that either one of the first negative lens or the second negative lens has an object side surface and an image side surface which are aspherical surfaces.

An imaging apparatus according to another aspect of the present disclosure comprises the imaging lens according to the above-mentioned aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "~ group that has a positive refractive power" in the present specification means that the group has a positive refractive power as a whole. Similarly, the term "group that has a negative refractive power" means that the group has a negative refractive power as a whole. Each of "second lens group", "third lens group", and "focus group", in the present specification is not limited to a configuration consisting of a plurality of lenses, but may have a configuration consisting of only one lens.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The curvature radius, the sign of the refractive power, and the surface shape of the lens including the aspherical surface will be used in terms of the paraxial region unless otherwise specified.

The term "the whole system" of the present specification means an imaging lens. The "focal length" used in a conditional expression is a paraxial focal length. Unless otherwise specified, the "distance on the optical axis" used in Conditional Expression is considered as a geometrical distance. The values used in Conditional Expressions are values in a case where the d line is used as a reference in a state where the infinite distance object is in focus unless otherwise specified. The sign of the curvature radius of the convex surface facing toward the object side is positive, and the sign of the curvature radius of the convex surface facing toward the image side is negative.

The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide an imaging lens having a small size, a small F number, and a wide angle of view, and maintaining favorable optical performance, and an imaging apparatus comprising the imaging lens.

DESCRIPTION OF THE EMBODIMENTS

Hereinafter, embodiments of the present disclosure will be described with reference to the accompanying drawings.

Figure 1:
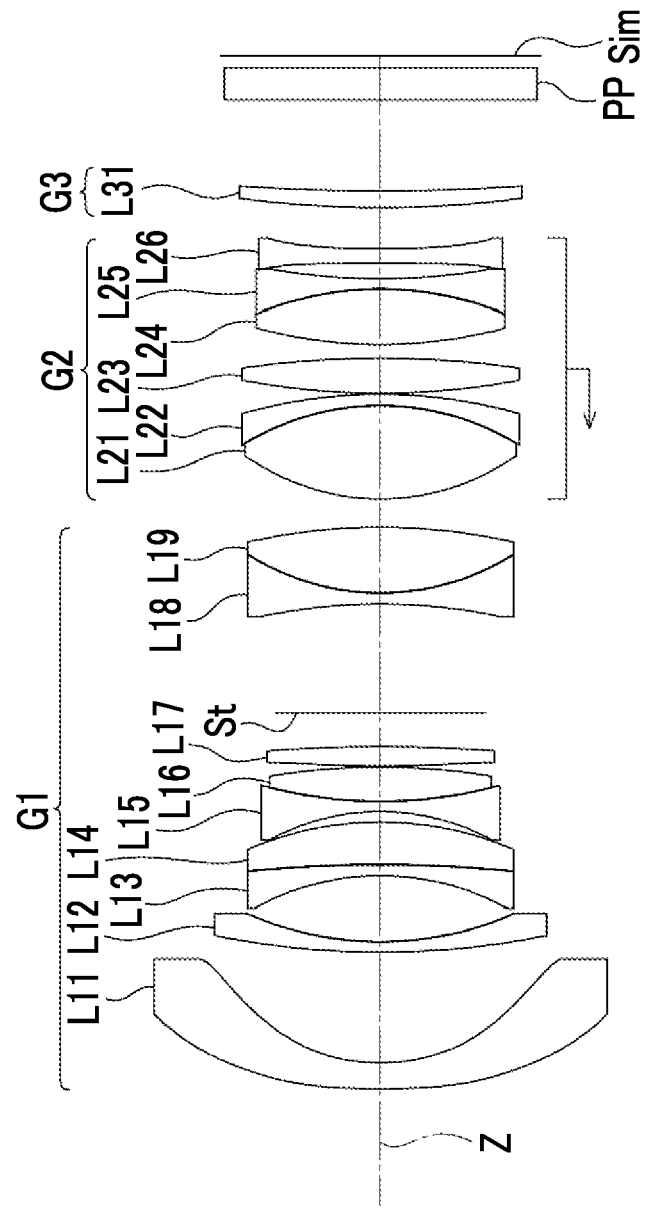
FIG. 1 is a cross-sectional view showing a configuration of an imaging lens according to an embodiment, which corresponds to the imaging lens of Example 1.
Figure 2:
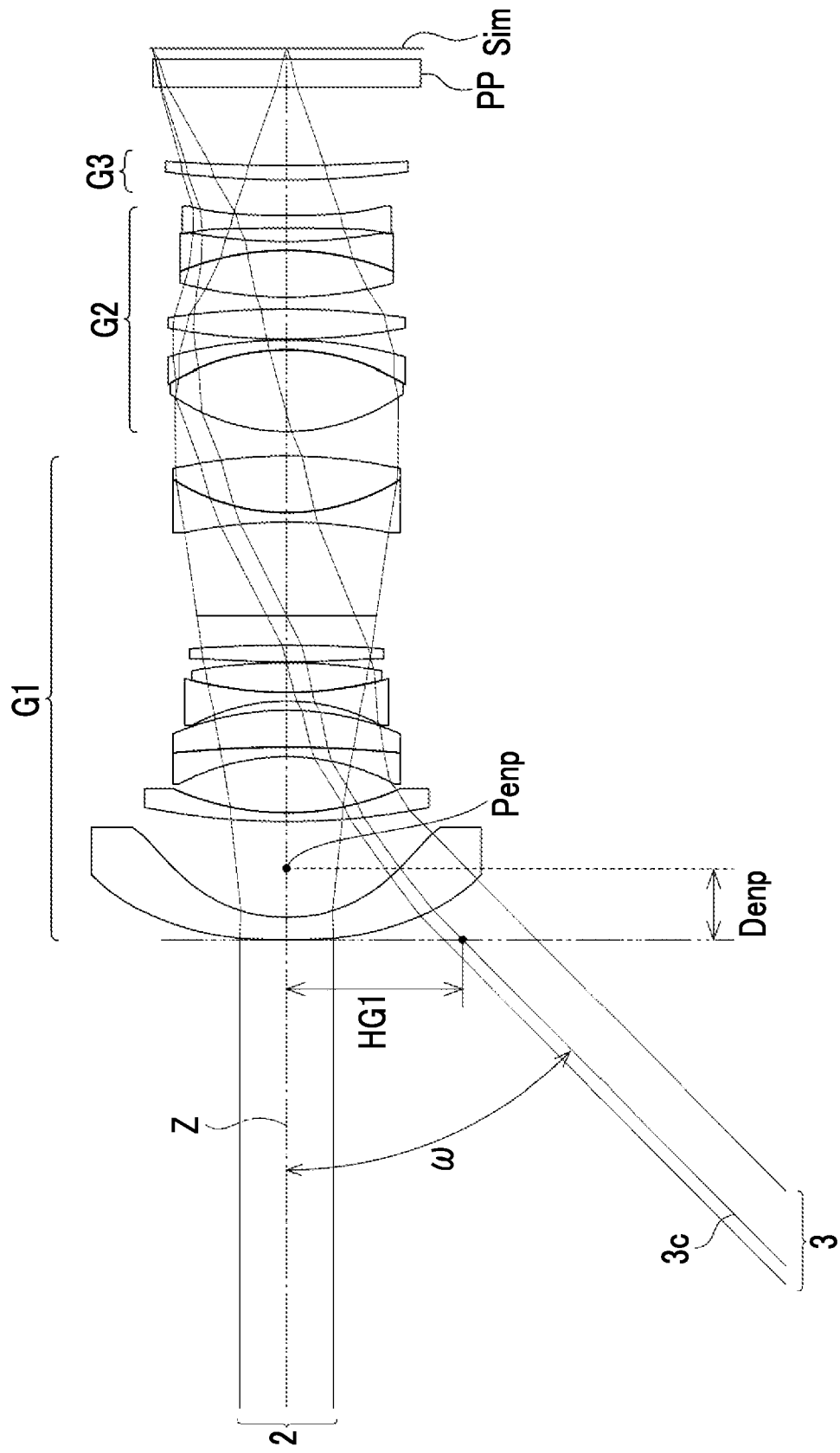
FIG. 2 is a cross-sectional view showing a configuration and luminous flux of the imaging lens of FIG. 1.

FIG. 1 is a cross-sectional view showing a configuration of an imaging lens according to an embodiment of the present disclosure. FIG. 2 is a cross-sectional view of a configuration and luminous flux of the imaging lens of FIG. 1. FIG. 2 shows, as the luminous flux, an on-axis luminous flux 2 and a luminous flux 3 with a maximum half angle of view ω. FIGS. 1 and 2 show situations where an infinite distance object is in focus, in which the left side thereof is an object side, and the right side thereof is an image side. In the present specification, an object at a distance of infinity is referred to as the infinite distance object. The examples shown in FIGS. 1 and 2 correspond to the imaging lens of Example 1 to be described later. Hereinafter, description thereof will be given mainly with reference to FIG. 1.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lenses according to an embodiment of the present disclosure comprises, successively in order from a position closest to the object side to the image side along the optical axis Z: a first lens group G1 that has a negative refractive power; and a second lens group G2 that has a positive refractive power. By forming the first lens group G1 closest to the object side as a group that has a negative refractive power, there is an advantage in achieving wide angle of view. By forming the second lens group G2 as a group that has a positive refractive power, there is an advantage in achieving reduction in total length of the optical system.

During focusing, only the second lens group G2 moves along the optical axis Z. By not moving the entire optical system during focusing, the weight of the lens group that moves during focusing can be reduced. As a result, there is an advantage in achieving an increase in speed of focusing. Further, by integrally moving only one lens group during focusing, a focusing mechanism can be simplified as compared with a floating focus type optical system. The term "integral movement" in the present specification means that the same amount of movement is performed in the same direction at the same time.

It should be noted that the term "lens group" in the present specification refers to a part including at least one lens, which is a constituent part of the imaging lens and is divided by an air spacing that changes during focusing. During focusing, each lens group moves or remains stationary, and the mutual spacing between the lenses in each lens group does not change. That is, in the present specification, one lens group is a group in which the spacing between adjacent groups changes during focusing and the total spacing between adjacent lenses does not change within itself.

For example, the imaging lens of FIG. 1 consists of, in order from the object side to the image side, a first lens group G1 that has a negative refractive power, a second lens group G2 that has a positive refractive power, and a third lens group G3 that has a positive refractive power. Each lens group in FIG. 1 is configured as follows. The first lens group G1 consists of nine lenses and an aperture stop St. More specifically, the first lens group G1 consists of lenses L11 to L17, an aperture stop St, and lenses L18 and L19, in order from the object side to the image side. The second lens group G2 consists of six lenses L21 to L26, in order from the object side to the image side. The third lens group G3 consists of one lens L31. It should be noted that the aperture stop St in FIG. 1 does not indicate a size and a shape, but indicates a position in an optical axis direction.

In the example of FIG. 1, during focusing, the first lens group G1 and the third lens group G3 remain stationary with respect to the image plane Sim, and the entire second lens group G2 moves integrally along the optical axis Z. In the present specification, a group which moves along the optical axis Z during focusing is referred to as a focus group. The focusing is performed by moving the focus group. The arrow pointing to the left below the second lens group G2 in FIG. 1 indicates that the second lens group G2 is a focus group moving toward the object side during focusing from the infinite distance object to the close object.

The first lens group G1 of the imaging lens of the present disclosure is configured to include the first negative lens, the second negative lens, and the third negative lens, successively in order from the position closest to the object side to the image side. By disposing the three negative lenses in such a manner, a strong negative refractive power can be provided on the object side in the first lens group G1. As a result, there is an advantage in achieving wide angle of view. In the example of FIG. 1, the lenses L11, L12, and L13 correspond to the first negative lens, the second negative lens, and the third negative lens, respectively.

The first negative lens and the second negative lens may be configured to be meniscus lenses having surfaces convex toward the object side. In such a case, since a refraction angle of the luminous flux incident on the first negative lens and the second negative lens can be made smaller, there is an advantage in correction of various aberrations such as field curvature.

It is preferable that either one of the first negative lens or the second negative lens has an object side surface and an image side surface which are aspherical surfaces. In such a case, it is easy to suppress various aberrations of the off-axis luminous flux while achieving reduction in diameter of the first lens group G1.

It is preferable that the first lens group G1 includes a positive lens disposed adjacent to the image side of the third negative lens. Further, it is preferable that the third negative lens and the positive lens disposed adjacent to the image side of the third negative lens are cemented to each other. In such a case, there is an advantage in correcting chromatic aberration. In the example of FIG. 1, the lens L14 corresponds to a positive lens disposed adjacent to the image side of the third negative lens.

It is preferable that the first lens group G1 includes five negative lenses. In such a case, there is an advantage in correcting distortion. The first lens group G1 may be configured to include four positive lenses. In such a case, there is an advantage in correcting spherical aberration.

It is preferable that the imaging lens of the present disclosure includes two or more cemented lenses closer to the image side than the first lens group G1. In such a case, there is an advantage in correcting lateral chromatic aberration. For example, the imaging lens of the present disclosure may be configured to include three cemented lenses closer to the image side than the first lens group G1. In such a case, there is an advantage in correcting lateral chromatic aberration. It is preferable that the cemented lens disposed closer to the image side than the first lens group G1 includes a positive lens and a negative lens.

It is preferable that the first lens group G1 includes an air lens formed of two concave lens surfaces facing toward each other. In the present specification, the air spacing interposed between two lens surfaces facing toward each other is regarded as a lens having a refractive index of 1, and the air spacing is referred to as an air lens. The lens surfaces of the two concave surfaces facing toward each other make it easy to appropriately correct spherical aberration and astigmatism, and also make it easy to suppress the Petzval sum of the entire lens system. In the example of FIG. 1, the image side surface of the lens L12 is a concave surface, the object side surface of the lens L13 is a concave surface, and these two concave surfaces facing toward each other form a biconvex air lens.

The second lens group G2 may be configured to include three positive lenses. The second lens group G2 may be configured to include two or three negative lenses. The second lens group G2 may be configured to include two cemented lenses.

The imaging lenses of the present disclosure may consist of, in order from the object side to the image side, three lens groups including a first lens group G1 that has a negative refractive power, a second lens group G2 that has a positive refractive power, and a third lens group G3 that has a positive or negative refractive power. By disposing the third lens group G3 closer to the image side than the second lens group G2, it is easy to satisfactorily correct various aberrations relating to the off-axis luminous flux.

In the configuration in which the imaging lens consists of the above-mentioned three lens groups, the third lens group G3 may be configured to consist of two or fewer lenses. In such a case, there is an advantage in achieving reduction in size. Further, in a case where one lens component is one single lens or one cemented lens, the third lens group G3 may be configured to consist of one lens component. In such a case, there is an advantage in achieving reduction in size.

Hereinafter, preferable configurations of the imaging lens of the present disclosure relating to Conditional Expression will be described. In the following description of conditional expressions, in order to avoid redundancy, the same symbol is used for the same definition, and the duplicate description of the symbol is omitted. Further, the "imaging lens according to the embodiment of the present disclosure" is also simply referred to as an "imaging lens" in order to avoid redundancy.

It is preferable that the imaging lens satisfies Conditional Expression (1). Here, it is assumed that an open F number in a state where the infinite distance object is in focus is FNo. Further, it is assumed that a maximum half angle of view in a state where the infinite distance object is in focus is ω. For example, FIG. 2 shows the maximum half angle of view ω. tan of Conditional Expression (1) is a tangent. By not allowing the corresponding value of Conditional Expression (1) to be equal to or less than the lower limit thereof, it is easy to maintain high optical performance, or it is possible to suppress an increase in size of the optical system. By not allowing the corresponding value of Conditional Expression (1) to be equal to or greater than the upper limit thereof, there is an advantage in ensuring a small F number and achieving a wide angle of view. In order to obtain more favorable characteristics, it is more preferable that the imaging lens satisfies Conditional Expression (1-1), and it is yet more preferable that the imaging lens satisfies Conditional Expression (1-2).

$$0.8 < FNo/\tan \omega < 1.9 \tag{1}$$

$$0.9 < FNo/\tan \omega < 1.6 \tag{1-1}$$

$$1 < FNo/\tan \omega < 1.5 \tag{1-2}$$

It is preferable that the imaging lens satisfies Conditional Expression (2). Here, it is assumed that a back focal length of the whole system at an air-equivalent distance in a state where the infinite distance object is in focus is Bf. Further, it assumed that a focal length of the whole system in a state where the infinite distance object is in focus is f. The back focal length is a distance on the optical axis from the lens surface closest to the image side in the imaging lens to the image plane Sim. By not allowing the corresponding value of Conditional Expression (2) to be equal to or less than the lower limit thereof, it is possible to suppress an increase in diameter of the lens of the second lens group G2. By not allowing the corresponding value of Conditional Expression (2) to be equal to or greater than the upper limit thereof, there is an advantage in achieving reduction in total length of the optical system. In order to obtain more favorable characteristics, it is more preferable that the imaging lens satisfies Conditional Expression (2-1), and it is yet more preferable that the imaging lens satisfies Conditional Expression (2-2).

$$0.3 < Bf/(f \times \tan \omega) < 1.2 \tag{2}$$

$$0.4 < Bf/(f \times \tan \omega) < 1.1 \tag{2-1}$$

$$0.45 < Bf/(f \times \tan \omega) < 1 \tag{2-2}$$

Assuming that a sum of Bf and a distance on the optical axis from a lens surface closest to the object side in the imaging lens to a lens surface closest to the image side in the imaging lens is TTL, it is preferable that the imaging lens satisfies Conditional Expression (3). By not allowing the corresponding value of Conditional Expression (3) to be equal to or less than the lower limit thereof, it is possible to ensure an appropriate total length of the optical system. As a result, there is an advantage in correction of various aberrations. By not allowing the corresponding value of Conditional Expression (3) to be equal to or greater than the upper limit thereof, it is possible to suppress an increase in size of the entire optical system. In order to obtain more favorable characteristics, it is more preferable that the imaging lens satisfies Conditional Expression (3-1), and it is yet more preferable that the imaging lens satisfies Conditional Expression (3-2).

$$6 < TTL \times FNo/(f \times \tan \omega) < 15 \tag{3}$$

$$7 < TTL \times FNo/(f \times \tan \omega) < 12.5 \tag{3-1}$$

$$8 < TTL \times FNo/(f \times \tan \omega) < 11 \tag{3-2}$$

Assuming that a distance on the optical axis from a lens surface closest to the object side in the imaging lens to a paraxial entrance pupil position Penp in a state where the infinite distance object is in focus is Denp, it is preferable that the imaging lens satisfies Conditional Expression (4). For example, FIG. 2 shows the paraxial entrance pupil position Penp in a state where the infinite distance object is in focus, and the distance Denp defined above. By not allowing the corresponding value of Conditional Expression (4) to be equal to or less than the lower limit thereof, there is an advantage in suppressing distortion. By not allowing the corresponding value of Conditional Expression (4) to be equal to or greater than the upper limit thereof, there is an advantage in achieving reduction in size of the first lens group G1. In order to obtain more favorable characteristics, it is more preferable that the imaging lens satisfies Conditional Expression (4-1), and it is yet more preferable that the imaging lens satisfies Conditional Expression (4-2).

$$0.7 < Denp/f < 3 \qquad (4)$$

$$0.8 < Denp/f < 2.8 \qquad (4\text{-}1)$$

$$0.9 < Denp/f < 2.5 \qquad (4\text{-}2)$$

Assuming that a focal length of the second lens group G2 is f2, it is preferable that the imaging lens satisfies Conditional Expression (5). By not allowing the corresponding value of Conditional Expression (5) to be equal to or less than the lower limit thereof, a positive refractive power of the second lens group G2 can be ensured. As a result, there is an advantage in achieving reduction in total length of the optical system. By not allowing the corresponding value of Conditional Expression (5) to be equal to or greater than the upper limit thereof, the positive refractive power of the second lens group G2 is prevented from becoming excessively strong. As a result, there is an advantage in suppressing spherical aberration and astigmatism.

In order to obtain more favorable characteristics, it is more preferable that the imaging lens satisfies Conditional Expression (5-1), and it is yet more preferable that the imaging lens satisfies Conditional Expression (5-2).

$$0.2 < f/f2 < 0.7 \qquad (5)$$

$$0.25 < f/f2 < 0.65 \qquad (5\text{-}1)$$

$$0.3 < f/f2 < 0.6 \qquad (5\text{-}2)$$

Assuming that a combined focal length between the first negative lens and the second negative lens is fL12, it is preferable that the imaging lens satisfies Conditional Expression (6). By not allowing the corresponding value of Conditional Expression (6) to be equal to or less than the lower limit thereof, the negative refractive power obtained by combining the first negative lens and the second negative lens is prevented from becoming excessively strong. As a result, there is an advantage in suppressing distortion. By not allowing the corresponding value of Conditional Expression (6) to be equal to or greater than the upper limit thereof, the negative refractive power obtained by combining the first negative lens and the second negative lens is prevented from becoming excessively weak. As a result, there is an advantage in achieving wide angle of view. In order to obtain more favorable characteristics, it is more preferable that the imaging lens satisfies Conditional Expression (6-1), and it is yet more preferable that the imaging lens satisfies Conditional Expression (6-2).

$$-2.75 < f/fL12 < -0.75 \qquad (6)$$

$$-2.5 < f/fL12 < -1 \qquad (6\text{-}1)$$

$$-2.25 < f/fL12 < -1.25 \qquad (6\text{-}2)$$

In a configuration in which the imaging lens includes the aperture stop St, it is preferable that the imaging lens satisfies Conditional Expression (7). Here, it is assumed that a sum of Bf and a distance on the optical axis from the aperture stop to a lens surface closest to the image side in the imaging lens in a state where the infinite distance object is in focus is STl. By not allowing the corresponding value of Conditional Expression (7) to be equal to or less than the lower limit thereof, the position of the aperture stop St is prevented from coming excessively close to the image plane Sim, and thus it is easy to reduce the angle of incidence of the off-axis principal ray on the image plane Sim. As a result, there is an advantage in ensuring the amount of ambient light. By not allowing the corresponding value of Conditional Expression (7) to be equal to or greater than the upper limit thereof, an object side space more sufficient than the aperture stop St can be ensured, and thus an appropriate number of lenses are disposed. Thereby, the imaging lens can be configured without forcibly reducing an absolute value of the curvature radius of the lens. The above-mentioned configuration facilitates suitable correction of various aberrations. In order to obtain more favorable characteristics, it is more preferable that the imaging lens satisfies Conditional Expression (7-1), and it is yet more preferable that the imaging lens satisfies Conditional Expression (7-2).

$$0.25 < STl/TTL < 0.6 \qquad (7)$$

$$0.27 < STl/TTL < 0.57 \qquad (7\text{-}1)$$

$$0.3 < STl/TTL < 0.53 \qquad (7\text{-}2)$$

In a configuration in which the first lens group G1 includes an air lens formed of two concave lens surfaces facing toward each other, it is preferable that the imaging lens satisfies Conditional Expression (8). Here, it is assumed that a paraxial curvature radius of an object side surface of the air lens of the first lens group G1 is Rf and a paraxial curvature radius of an image side surface of the air lens of the first lens group G1 is Rr. By satisfying Conditional Expression (8), the refractive power of one surface of the object side surface and the image side surface of the air lens can be prevented from becoming excessively strong or excessively weak with respect to the refractive power of the other surface. Thereby, spherical aberration and astigmatism can be appropriately corrected, and the Petzval sum of the entire lens system can be suppressed. In order to obtain more favorable characteristics, it is more preferable that the imaging lens satisfies Conditional Expression (8-1), and it is yet more preferable that the imaging lens satisfies Conditional Expression (8-2).

$$-1 < (Rf+Rr)/(Rf-Rr) < 0.5 \qquad (8)$$

$$-0.75 < (Rf+Rr)/(Rf-Rr) < 0.4 \qquad (8\text{-}1)$$

$$-0.5 < (Rf+Rr)/(Rf-Rr) < 0.3 \qquad (8\text{-}2)$$

It is preferable that the imaging lens satisfies Conditional Expression (9). Here, it is assumed that a height of a principal ray 3c with a maximum image height from the optical axis Z in a plane which is perpendicular to the optical axis Z and which passes through an intersection between the optical axis Z and a lens surface closest to the object side in the imaging lens in a state where the infinite distance object is in focus is HG1. For example, in FIG. 2, the two-dot chain line indicates a plane that passes through an intersection between the optical axis Z and a lens surface closest to the object side in the imaging lens and that is perpendicular to the optical axis Z. Further, as an example, FIG. 2 shows the principal ray 3c with the maximum image height and the height HG1 defined above. In the present example, the luminous flux 3 with the maximum angle of view is also the luminous flux with the maximum image height. By not allowing the corresponding value of Conditional Expression (9) to be equal to or less than the lower limit thereof, the rays with the respective image heights are appropriately separated in the first lens group G1. As a result, there is an advantage in the correction of astigmatism. By not allowing the corresponding value of Conditional Expression (9) to be equal to or greater than the upper limit thereof, the height from the optical axis Z in a case where the ray with the peripheral angle of view passes through the lens surface closest to the object side can be reduced. As a result, there is an advantage in achieving reduction in diameter of the filter mounted on the object side of the imaging lens. In order to obtain more favorable characteristics, it is more preferable that the imaging lens satisfies Conditional Expression (9-1), and it is yet more preferable that the imaging lens satisfies Conditional Expression (9-2).

$$0.5 < HG1/(f \times \tan \omega) < 2.5 \quad (9)$$

$$0.7 < HG1/(f \times \tan \omega) < 2 \quad (9\text{-}1)$$

$$0.9 < HG1/(f \times \tan \omega) < 1.6 \quad (9\text{-}2)$$

In a configuration in which the first negative lens and the second negative lens are meniscus lenses having surfaces convex toward the object side, it is preferable that the first negative lens satisfies Conditional Expression (10). Here, it is assumed that a paraxial curvature radius of the object side surface of the first negative lens is R1f and a paraxial curvature radius of the image side surface of the first negative lens is R1r. By not allowing the corresponding value of Conditional Expression (10) to be equal to or less than the lower limit thereof, there is an advantage in suppressing astigmatism and distortion. By not allowing the corresponding value of Conditional Expression (10) to be equal to or greater than the upper limit thereof, the absolute value of the curvature radius of the object side surface of the first negative lens is prevented from becoming excessively small, and thus the imaging lens is mounted on the object side of the imaging lens. As a result, there is an advantage in achieving reduction in diameter of the filter. In order to obtain more favorable characteristics, it is more preferable that the imaging lens satisfies Conditional Expression (10-1), and it is yet more preferable that the imaging lens satisfies Conditional Expression (10-2).

$$1 < (R1f + R1r)/(R1f - R1r) < 3 \quad (10)$$

$$1.1 < (R1f + R1r)/(R1f - R1r) < 2.5 \quad (10\text{-}1)$$

$$1.2 < (R1f + R1r)/(R1f - R1r) < 2 \quad (10\text{-}2)$$

The imaging lenses consists of, in order from the object side to the image side, the first lens group G1 that has a negative refractive power, the second lens group G2 that has a positive refractive power, and the third lens group G3 that has a positive or negative refractive power. In such a configuration, it is preferable that the imaging lens satisfies Conditional Expression (11). Here, it is assumed that a focal length of the third lens group is f3. By not allowing the corresponding value of Conditional Expression (11) to be equal to or less than the lower limit thereof, the positive refractive power of the second lens group G2 is prevented from becoming excessively strong. As a result, there is an advantage in suppressing spherical aberration. By not allowing the corresponding value of Conditional Expression (11) to be equal to or greater than the upper limit thereof, the Petzval sum is prevented from becoming excessively large. As a result, there is an advantage in suppressing field curvature. In order to obtain more favorable characteristics, it is more preferable that the imaging lens satisfies Conditional Expression (11-1), and it is yet more preferable that the imaging lens satisfies Conditional Expression (11-2).

$$-0.1 < f/f3 < 0.25 \quad (11)$$

$$-0.05 < f/f3 < 0.2 \quad (11\text{-}1)$$

$$0 < f/f3 < 0.15 \quad (11\text{-}2)$$

Assuming that an average value of a refractive index of the first negative lens at a d line and a refractive index of the second negative lens at the d line is NL12ave, it is preferable that the imaging lens satisfies Conditional Expression (12). By not allowing the corresponding value of Conditional Expression (12) to be equal to or less than the lower limit thereof, the negative refractive power obtained from the first negative lens and the second negative lens is prevented from becoming excessively weak. As a result, there is an advantage in achieving wide angle of view. By not allowing the corresponding value of Conditional Expression (12) to be equal to or greater than the upper limit thereof, it is possible to suppress reduction in weights of the first negative lens and the second negative lens. In order to obtain more favorable characteristics, it is more preferable that the imaging lens satisfies Conditional Expression (12-1), and it is yet more preferable that the imaging lens satisfies Conditional Expression (12-2).

$$1.5 < NL12ave < 1.95 \quad (12)$$

$$1.6 < NL12ave < 1.9 \quad (12\text{-}1)$$

$$1.64 < NL12ave < 1.85 \quad (12\text{-}2)$$

The above-mentioned configuration and the example shown in FIG. 1 are an example of the imaging lens of the present disclosure. Various modifications can be made without departing from the scope of the technique of the present disclosure. For example, the number of lens groups constituting the imaging lens and the number of lenses included in each lens group may be different from the number of the example of FIG. 1.

The above-mentioned preferred configurations and available configurations may be optional combinations, and it is preferable to selectively adopt the configurations in accordance with required specification. It should be noted that the conditional expressions that the imaging lens of the present disclosure preferably satisfies are not limited to the conditional expressions described in the form of expression, and the lower limit and the upper limit are selected from the preferable, more preferable, and yet more preferable conditional expressions. The conditional expressions may include all conditional expressions obtained through optional combinations.

For example, according to a preferred aspect, the imaging lens of the present disclosure comprises, successively in order from a position closest to an object side to an image side: a first lens group G1 that has a negative refractive power; and a second lens group G2 that has a positive refractive power. Only the second lens group G2 moves along an optical axis Z during focusing, the first lens group G1 includes, successively in order from the position closest to the object side to the image side, a first negative lens, a second negative lens, and a third negative lens. Conditional Expressions (1) and (2) are satisfied.

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 is a cross-sectional view of a configuration of an imaging lens of Example 1, and an illustration method and a configuration thereof are as described above. Therefore, some description is not repeated herein. The imaging lens of Example 1 consists of, in order from the object side to the image side, a first lens group G1 that has a negative refractive power, a second lens group G2 that has a positive refractive power, and a third lens group G3 that has a positive refractive power. During focusing from the infinite distance object to the close object, the first lens group G1 and the third lens group G3 remain stationary with respect to the image plane Sim, and the second lens group G2 moves toward the object side.

Regarding the imaging lens of Example 1, Table 1 shows basic lens data, Table 2 shows specifications, Table 3 shows variable surface spacings, and Table 4 shows aspherical coefficients thereof.

The table of basic lens data will be described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The values of the surface spacings in Table 1 are values in a state where the infinite distance object is in focus. The variable surface spacing that changes during focusing is noted as "variable" in the rightmost column of the same row. The column of Nd shows a refractive index of each constituent element at the d line. The column of vd shows an Abbe number of each constituent element based on the d line.

In the table of basic lens data, the sign of the curvature radius of the convex surface facing toward the object side is positive and the sign of the curvature radius of the convex surface facing toward the image side is negative. In a cell of a surface number of a surface corresponding to the aperture stop St, the surface number and a term of (St) are noted. A value at the bottom cell of the column of surface spacing in the table indicates a spacing between the image plane Sim and the surface closest to the image side in the table.

Table 2 shows the focal length f, the back focal length Bf at the air-equivalent distance, and the open F number FNo, and the maximum total angle of view 2ω, based on the d line. The maximum half angle of view ω is a half value of the maximum total angle of view 2ω. [°] in the column of the maximum total angle of view indicates the unit is degrees. Table 2 shows values in a state where the infinite distance object is in focus.

In the leftmost column of Table 3, D is attached to the surface number of the variable surface spacing on the object side. For example, "D16" is a spacing between the sixteenth surface and the seventeenth surface. In Table 3, the column of "Infinity" shows the values of the surface spacing in a state where the infinite distance object is in focus, and the right column shows the values of the surface spacing in the state where the close object is in focus. The distance shown in the right column of "Infinity" is a distance from the lens surface closest to the object side to the close object, and is 0.11 meters (m) in Example 1.

In basic lens data, a reference sign * is attached to surface numbers of aspherical surfaces, and numerical values of the paraxial curvature radius are written into the column of the curvature radius of the aspherical surface. In Table 4, the row of Sn shows surface numbers of the aspherical surfaces, and the rows of KA and Am show numerical values of the aspherical coefficients for each aspherical surface. It should be noted that m of Am is an integer of 3 or more, and differs depending on the surface. For example, in the first surface of Example 1, m=3, 4, 5, . . . , and 20. The "E±n" (n: an integer) in numerical values of the aspherical coefficients of Table 4 indicates "×10$^{±n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd | |
|---|---|---|---|---|---|
| *1 | 110.3240 | 2.3000 | 1.51633 | 64.06 | |
| *2 | 19.6086 | 9.7718 | | | |
| 3 | 78.2363 | 0.9000 | 1.49700 | 81.61 | |
| 4 | 30.4787 | 5.7432 | | | |
| 5 | −24.3076 | 0.9700 | 1.43700 | 95.10 | |
| 6 | −121.0569 | 3.7771 | 1.88577 | 24.97 | |
| 7 | −30.9381 | 0.9307 | | | |
| 8 | −21.3149 | 0.8900 | 1.77418 | 26.29 | |
| 9 | 41.5751 | 3.0241 | 1.90607 | 36.36 | |
| 10 | −61.7315 | 0.1001 | | | |
| *11 | 114.3593 | 1.6930 | 1.80139 | 45.45 | |
| *12 | −120.7226 | 3.0002 | | | |
| 13(St) | ∞ | 9.5958 | | | |
| 14 | −52.6177 | 0.9700 | 1.48000 | 58.75 | |
| 15 | 22.8841 | 5.7784 | 1.64143 | 59.43 | |
| 16 | −55.7073 | 2.5002 | | | Variable |
| 17 | 21.4838 | 8.2399 | 1.49700 | 81.61 | |
| 18 | −24.2389 | 1.0000 | 1.99466 | 27.56 | |
| 19 | −46.2314 | 0.1000 | | | |
| 20 | 69.6969 | 3.0676 | 1.95906 | 17.47 | |
| 21 | −90.6891 | 1.2130 | | | |
| 22 | 44.3633 | 4.8123 | 1.49700 | 81.61 | |
| 23 | −30.1157 | 0.9000 | 1.94822 | 17.59 | |
| 24 | 58.5883 | 1.3637 | | | |
| *25 | −223.4266 | 1.3200 | 1.80999 | 37.80 | |
| *26 | 371.8882 | 3.6004 | | | Variable |
| 27 | 98.2396 | 1.4768 | 1.50930 | 64.64 | |
| 28 | 191.0178 | 8.0000 | | | |

TABLE 1-continued

Example 1

| Sn | R | D | Nd | vd |
|---|---|---|---|---|
| 29 | ∞ | 2.8500 | 1.51680 | 64.20 |
| 30 | ∞ | 1.0894 | | |

TABLE 2

Example 1

| | |
|---|---|
| f | 14.13 |
| Bf | 10.97 |
| FNo | 1.44 |
| 2ω[°] | 92.2 |

TABLE 3

Example 1

| | Infinity | 0.11 m |
|---|---|---|
| D16 | 2.5002 | 0.7481 |
| D26 | 3.6004 | 5.3525 |

TABLE 4

Example 1

| Sn | 1 | 2 | 11 |
|---|---|---|---|
| KA  | 1.0000000E+00 | 1.0000000E+00 | 1.0000000E+00 |
| A3  | −9.3580727E−20 | −8.7960764E−20 | −7.4340609E−20 |
| A4  | 2.4644288E−04 | 2.1034955E−04 | −6.3895696E−06 |
| A5  | −4.2896868E−05 | −1.6543994E−05 | 9.9426856E−06 |
| A6  | 1.9419119E−06 | −5.2191515E−06 | −5.0623177E−06 |
| A7  | 4.6284070E−07 | 1.0207354E−06 | 8.0838774E−07 |
| A8  | −5.7365327E−08 | 5.9697925E−08 | 1.1355240E−07 |
| A9  | −1.6970471E−09 | −2.2315116E−08 | −5.0180657E−08 |
| A10 | 5.2509028E−10 | −1.1440197E−10 | 1.5074879E−09 |
| A11 | −6.2943868E−12 | 2.6124921E−10 | 1.1347076E−09 |
| A12 | −2.4518209E−12 | −4.5183564E−12 | −9.5676740E−11 |
| A13 | 8.2361473E−14 | −1.7907238E−12 | −1.2970512E−11 |
| A14 | 5.9561303E−15 | 5.2067492E−14 | 1.5957472E−12 |
| A15 | −3.1232249E−16 | 7.1968692E−15 | 7.5953943E−14 |
| A16 | −5.9400178E−18 | −2.5892172E−16 | −1.2905113E−14 |
| A17 | 5.3844089E−19 | −1.5720654E−17 | −1.9061320E−16 |
| A18 | −1.7541027E−21 | 6.3339260E−19 | 5.1407504E−17 |
| A19 | −3.5819714E−22 | 1.4415208E−20 | 6.9997911E−20 |
| A20 | 5.5269274E−24 | −6.2209491E−22 | −7.9354360E−20 |

| Sn | 12 | 25 | 26 |
|---|---|---|---|
| KA  | 1.0000000E+00 | 1.0000000E+00 | 1.0000000E+00 |
| A3  | 2.3414365E−20 | −3.2526065E−20 | −1.0426587E−18 |
| A4  | 2.3320111E−05 | 9.6539794E−05 | 1.5520898E−04 |
| A5  | −3.5875488E−06 | −3.6755863E−05 | −8.4406292E−06 |
| A6  | −1.0251498E−06 | 7.0181254E−06 | −7.2216443E−06 |
| A7  | 6.9728409E−07 | 1.1209771E−06 | 3.4973213E−06 |
| A8  | −8.5963084E−08 | −5.0120508E−07 | −1.9120695E−07 |
| A9  | −1.6043027E−08 | −5.1433655E−09 | −1.5503487E−07 |
| A10 | 4.1312098E−09 | 1.4664941E−08 | 2.1984672E−08 |
| A11 | 4.0627255E−11 | −5.7842884E−10 | 2.7354069E−09 |
| A12 | −7.3087922E−11 | −2.3294559E−10 | −6.6513588E−10 |
| A13 | 3.0912018E−12 | 1.6331751E−11 | −8.5325841E−12 |
| A14 | 6.1360503E−13 | 1.9858634E−12 | 9.3994458E−12 |
| A15 | −4.5671712E−14 | −1.9693441E−13 | −3.6133308E−13 |
| A16 | −2.1835535E−15 | −7.2828931E−15 | −5.9956448E−14 |
| A17 | 2.5588892E−16 | 1.1539062E−15 | 4.7238637E−15 |
| A18 | 2.7172112E−19 | −4.4753170E−18 | 8.2754811E−17 |
| A19 | −5.1747210E−19 | −2.6843630E−18 | −1.7850595E−17 |
| A20 | 1.1279890E−20 | 7.4930186E−20 | 4.7811742E−19 |

Figure 3:
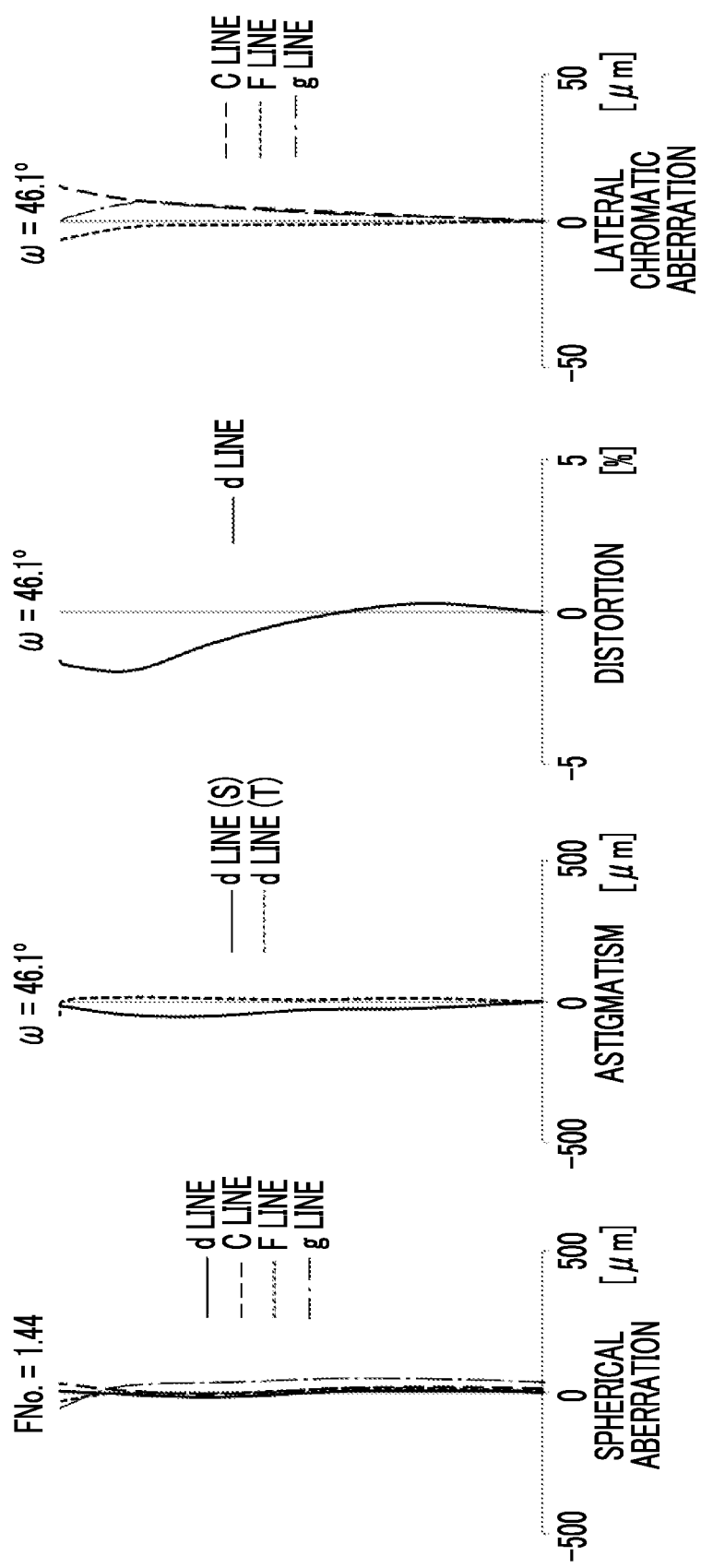
FIG. 3 is a diagram showing aberrations of the imaging lens of Example 1.

FIG. 3 shows aberration diagrams of an imaging lens of Example 1 in a state where the object at infinity is in focus. FIG. 3 shows spherical aberration, astigmatism, distortion, and lateral chromatic aberration, in order from the left side. In the spherical aberration diagram, aberrations at the d line, the C line, the F line, and the g line are indicated by the solid line, the long broken line, the short broken line, and the chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by a solid line. In the lateral chromatic aberration diagram, aberrations at the C line, the F line, and the g line are respectively indicated by the long broken line, the short broken line, and the chain line. In the spherical aberration diagram, the value of the open F number is shown after "FNo. =". FNo. of the spherical aberration diagram is the same as FNo in the table of specifications. In other aberration diagrams, a value of the maximum half angle of view is shown after "ω=".

Symbols, meanings, description methods, and illustration methods of the respective data pieces according to Example 1 are basically similar to those in the following examples unless otherwise specified. Therefore, in the following description, repeated description will not be given.

Example 2

Figure 4:
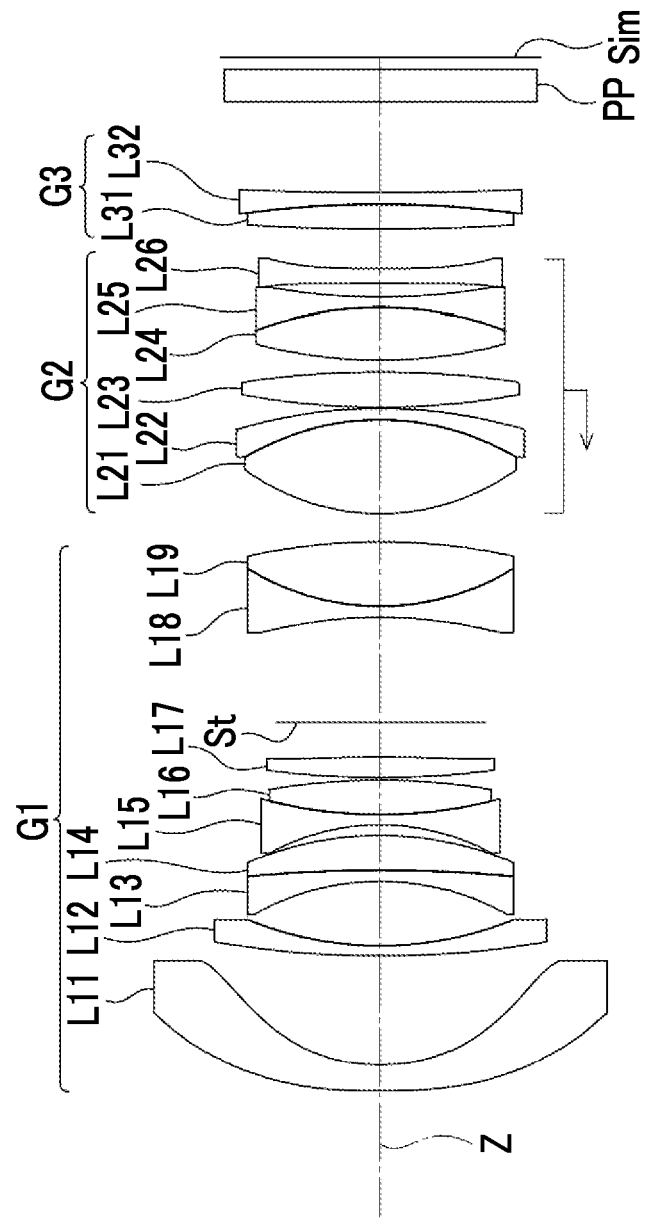
FIG. 4 is a cross-sectional view showing a configuration of an imaging lens of Example 2.

FIG. 4 is a cross-sectional view of a configuration of an imaging lens of Example 2. The imaging lens of Example 2 consists of, in order from the object side to the image side, a first lens group G1 that has a negative refractive power, a second lens group G2 that has a positive refractive power, and a third lens group G3 that has a positive refractive power. The first lens group G1 consists of lenses L11 to L17, an aperture stop St, and lenses L18 and L19, in order from the object side to the image side. The second lens group G2 consists of six lenses L21 to L26, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves toward the object side.

Figure 5:
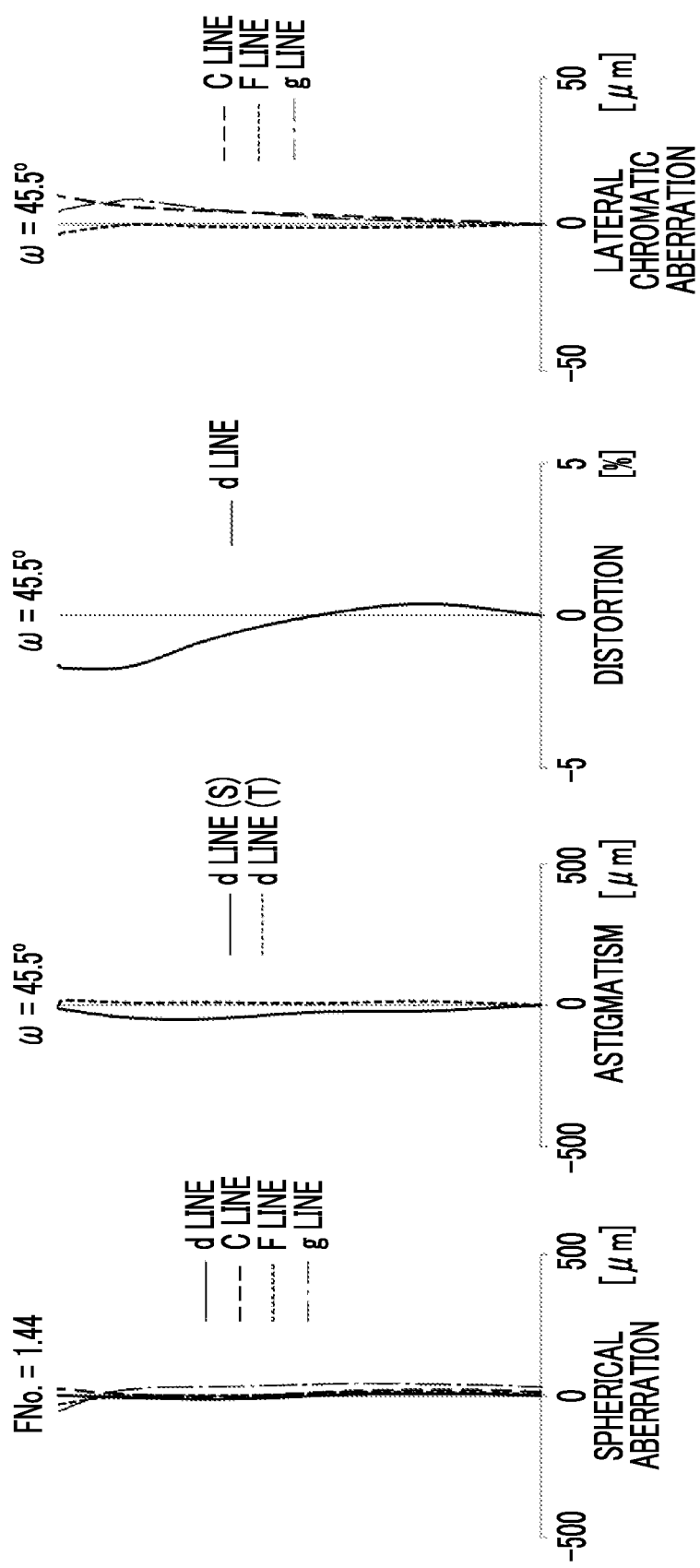
FIG. 5 is a diagram showing aberrations of the imaging lens of Example 2.

Regarding the imaging lens of Example 2, Table 5 shows basic lens data, Table 6 shows specifications, Table 7 shows variable surface spacings, and Table 8 shows aspherical coefficients thereof. FIG. 5 shows aberration diagrams.

TABLE 5

Example 2

| Sn | R | D | Nd | vd |
|---|---|---|---|---|
| *1 | 135.4658 | 2.3000 | 1.51633 | 64.06 |
| *2 | 20.1326 | 9.5946 | | |
| 3 | 91.7378 | 0.9000 | 1.49700 | 81.61 |
| 4 | 32.5112 | 5.5896 | | |
| 5 | −23.7478 | 0.9700 | 1.43700 | 95.10 |
| 6 | −132.1918 | 3.0922 | 1.87582 | 27.64 |
| 7 | −31.0427 | 0.9411 | | |
| 8 | −21.2807 | 0.8900 | 1.77019 | 26.49 |
| 9 | 42.4567 | 3.0396 | 1.93181 | 34.82 |
| 10 | −60.4175 | 0.2445 | | |

TABLE 5-continued

Example 2

| Sn | R | D | Nd | vd | |
|---|---|---|---|---|---|
| *11 | 104.1025 | 1.7912 | 1.80139 | 45.45 | |
| *12 | −113.7149 | 3.0140 | | | |
| 13 (St) | ∞ | 9.3192 | | | |
| 14 | −43.5319 | 0.9700 | 1.48000 | 58.75 | |
| 15 | 23.2802 | 5.6600 | 1.64206 | 59.40 | |
| 16 | −58.0076 | 2.5001 | | | Variable |
| 17 | 21.3228 | 8.2880 | 1.49700 | 81.61 | |
| 18 | −24.1592 | 1.0000 | 1.99999 | 27.70 | |
| 19 | −46.3520 | 0.1002 | | | |
| 20 | 70.2842 | 3.1022 | 1.95906 | 17.47 | |
| 21 | −86.3315 | 1.0414 | | | |
| 22 | 45.4355 | 4.5924 | 1.49700 | 81.61 | |
| 23 | −32.7076 | 0.9000 | 1.93533 | 18.23 | |
| 24 | 59.3532 | 1.1886 | | | |
| *25 | −247.0741 | 1.3200 | 1.81000 | 32.59 | |
| *26 | −3152.8894 | 3.5000 | | | Variable |
| 27 | 209.1553 | 2.1711 | 1.73944 | 54.06 | |
| 28 | −97.0585 | 1.0200 | 1.81779 | 24.11 | |
| 29 | 305.0042 | 8.0000 | | | |
| 30 | ∞ | 2.8500 | 1.51680 | 64.20 | |
| 31 | ∞ | 1.0910 | | | |

TABLE 6

Example 2

| | |
|---|---|
| f | 14.42 |
| Bf | 10.97 |
| FNo | 1.44 |
| 2ω[°] | 91.0 |

TABLE 7

Example 2

| | Infinity | 0.11 m |
|---|---|---|
| D16 | 2.5001 | 0.7588 |
| D26 | 3.5000 | 5.2413 |

TABLE 8

Example 2

| Sn | 1 | 2 | 11 |
|---|---|---|---|
| KA | 1.0000000E+00 | 1.0000000E+00 | 1.0000000E+00 |
| A3 | −3.2217264E−19 | −1.6320941E−19 | 3.0203685E−20 |
| A4 | 2.8826261E−04 | 2.5013943E−04 | 1.3043267E−05 |
| A5 | −4.8670394E−05 | −1.8274589E−05 | 9.8227835E−06 |
| A6 | 2.3921861E−06 | −5.5809382E−06 | −5.7847576E−06 |
| A7 | 4.7983975E−07 | 1.1106943E−06 | 1.2131705E−06 |
| A8 | −6.6274091E−08 | 5.7292159E−08 | 5.4052694E−08 |
| A9 | −1.2438520E−09 | −2.4135870E−08 | −5.8214392E−08 |
| A10 | 5.8447175E−10 | 2.0666004E−11 | 4.7220019E−09 |
| A11 | −1.1654536E−11 | 2.8142093E−10 | 1.0294196E−09 |
| A12 | −2.6297903E−12 | −6.3799587E−12 | −1.5680949E−10 |
| A13 | 1.0923904E−13 | −1.9223738E−12 | −7.3126205E−12 |
| A14 | 6.0703659E−15 | 6.5171805E−14 | 2.1100457E−12 |
| A15 | −3.8391895E−16 | 7.7013352E−15 | −3.4993667E−15 |
| A16 | −5.2387014E−18 | −3.0972389E−16 | −1.4077797E−14 |
| A17 | 6.3753823E−19 | −1.6772048E−17 | 3.0342134E−16 |
| A18 | −3.5355256E−21 | 7.3548412E−19 | 4.3227867E−17 |
| A19 | −4.1434519E−22 | 1.5335538E−20 | −1.1020174E−18 |
| A20 | 6.8287671E−24 | −7.0448409E−22 | −4.0361451E−20 |

TABLE 8-continued

Example 2

| Sn | 12 | 25 | 26 |
|---|---|---|---|
| KA | 1.0000000E+00 | 1.0000000E+00 | 1.0000000E+00 |
| A3 | 2.0135790E−20 | 0.0000000E+00 | −2.5255583E−19 |
| A4 | 4.1681033E−05 | 9.9649126E−05 | 1.7086775E−04 |
| A5 | −7.0440542E−06 | −2.7315266E−05 | −1.0654992E−05 |
| A6 | 3.3254674E−07 | 3.7386543E−06 | −7.7227643E−06 |
| A7 | 6.3230786E−07 | 1.0803265E−06 | 3.6275036E−06 |
| A8 | −1.5181496E−07 | −3.1378214E−07 | −1.7740428E−07 |
| A9 | −4.2672756E−09 | −1.9430108E−08 | −1.5711822E−07 |
| A10 | 5.1945693E−09 | 9.8043133E−09 | 2.1759242E−08 |
| A11 | −3.4510562E−10 | 4.4589016E−11 | 2.7363267E−09 |
| A12 | −7.2512873E−11 | −1.6889556E−10 | −6.6178352E−10 |
| A13 | 9.2568399E−12 | 3.9582694E−12 | −8.1581671E−12 |
| A14 | 3.7713993E−13 | 1.6570338E−12 | 9.3563819E−12 |
| A15 | −9.9270012E−14 | −6.4822979E−14 | −3.6614590E−13 |
| A16 | 9.5837031E−16 | −8.7345525E−15 | −5.9632446E−14 |
| A17 | 4.9835125E−16 | 4.1912476E−16 | 4.7489685E−15 |
| A18 | −1.7122040E−17 | 1.9978693E−17 | 8.1705424E−17 |
| A19 | −9.6386473E−19 | −1.0105711E−18 | −1.7899238E−17 |
| A20 | 4.7519405E−20 | −5.4041210E−21 | 4.7871627E−19 |

Example 3

Figure 6:
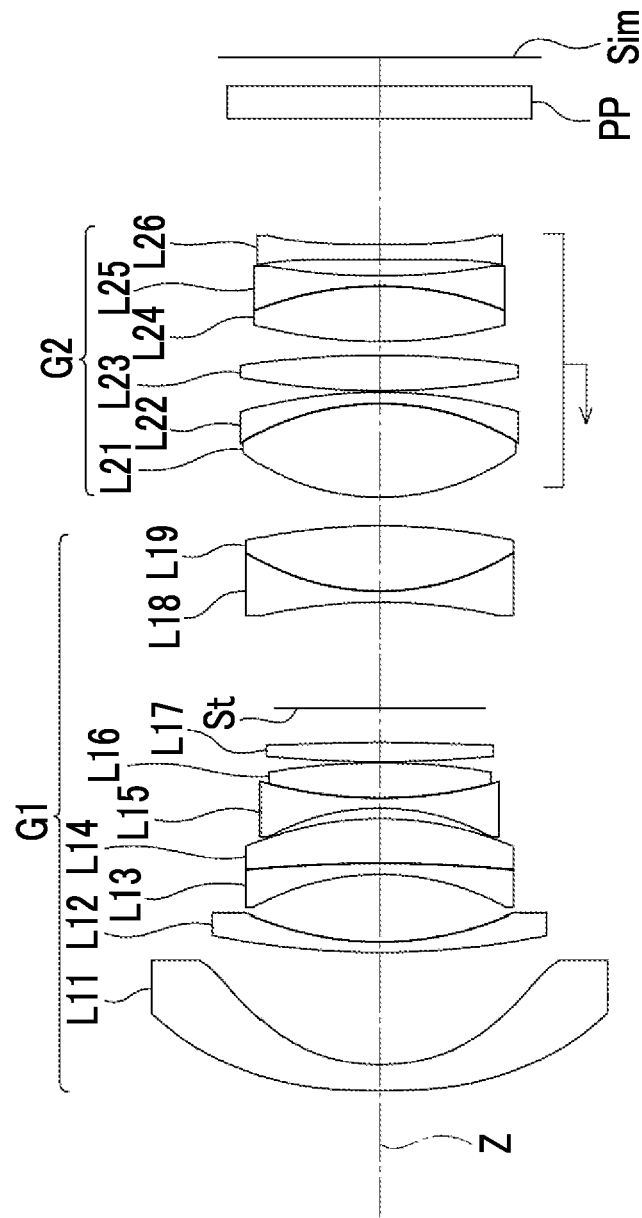
FIG. 6 is a cross-sectional view showing a configuration of an imaging lens of Example 3.
Figure 7:
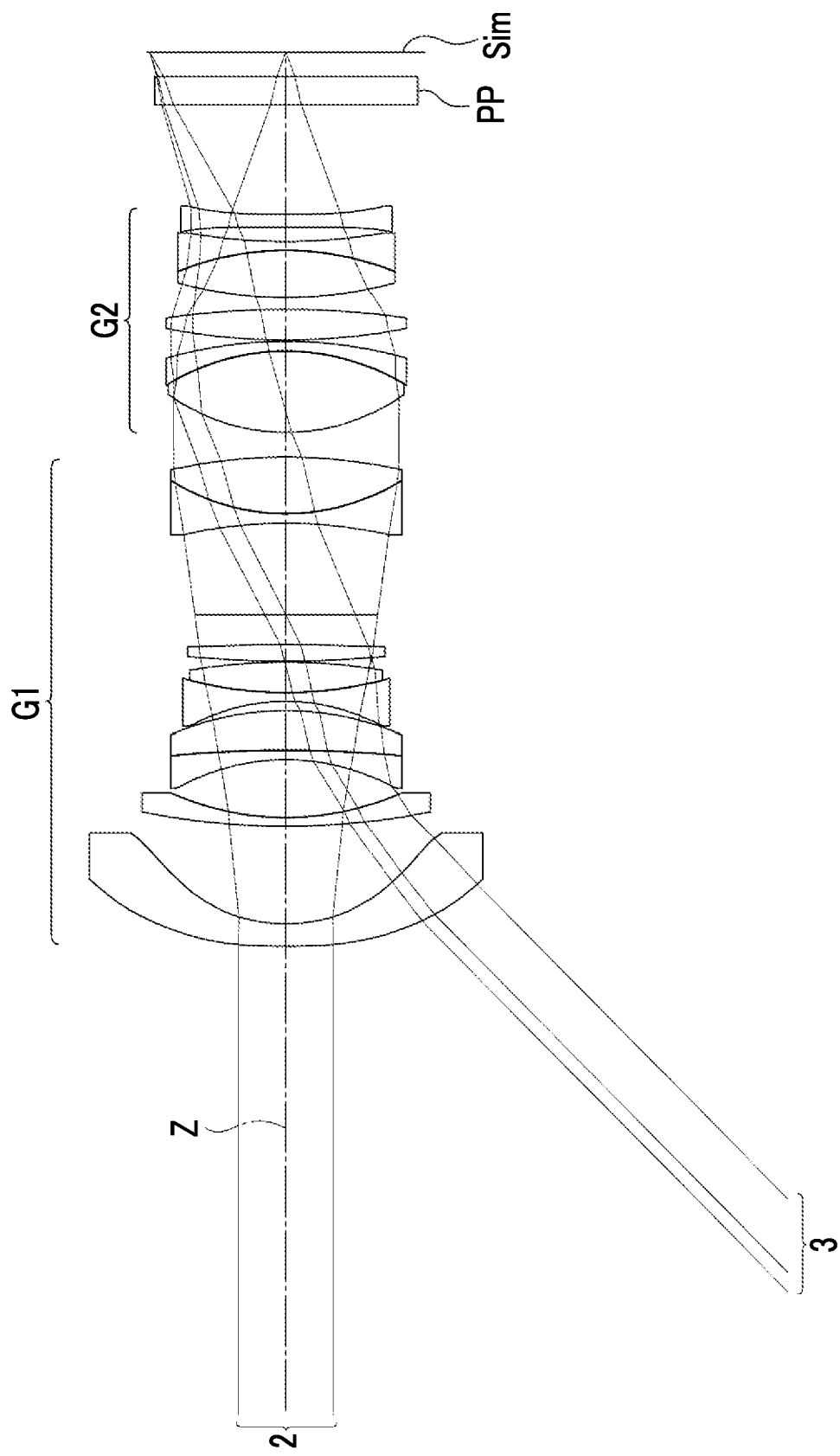
FIG. 7 is a cross-sectional view showing a configuration and luminous flux of the imaging lens of Example 3.

FIG. 6 is a cross-sectional view of a configuration of an imaging lens of Example 3. FIG. 7 is a cross-sectional view of luminous flux and a configuration of the imaging lens of Example 3. The imaging lens of Example 3 consists of, in order from the object side to the image side, a first lens group G1 that has a negative refractive power, and a second lens group G2 that has a positive refractive power. The first lens group G1 consists of nine lenses and an aperture stop St. More specifically, the first lens group G1 consists of lenses L11 to L17, an aperture stop St, and lenses L18 and L19, in order from the object side to the image side. The second lens group G2 consists of six lenses L21 to L26, in order from the object side to the image side. During focusing from the infinite distance object to the close object, the first lens group G1 remains stationary with respect to the image plane Sim, and the second lens group G2 moves toward the object side.

Figure 8:
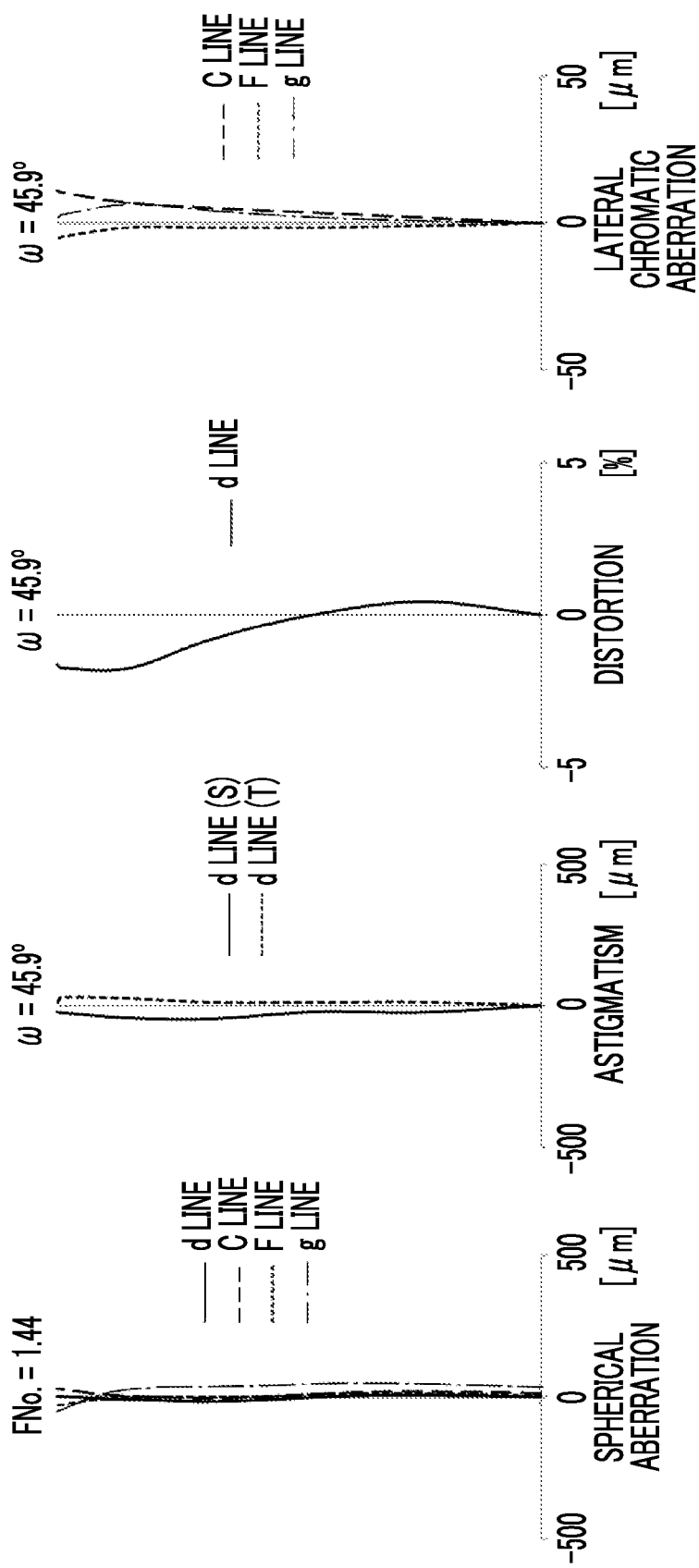
FIG. 8 is a diagram showing aberrations of the imaging lens of Example 3.

Regarding the imaging lens of Example 3, Table 9 shows basic lens data, Table 10 shows specifications, Table 11 shows variable surface spacings, and Table 12 shows aspherical coefficients thereof. FIG. 8 shows aberration diagrams.

TABLE 9

Example 3

| Sn | R | D | Nd | vd |
|---|---|---|---|---|
| *1 | 101.5471 | 2.3000 | 1.51633 | 64.06 |
| *2 | 19.7756 | 9.8689 | | |
| 3 | 77.0426 | 0.9000 | 1.49700 | 81.61 |
| 4 | 30.1740 | 5.8505 | | |
| 5 | −23.8497 | 0.9700 | 1.43700 | 95.10 |
| 6 | −126.0926 | 3.9309 | 1.89797 | 26.88 |
| 7 | −30.9336 | 0.9351 | | |
| 8 | −21.2793 | 0.8900 | 1.77144 | 26.43 |
| 9 | 40.6907 | 3.0872 | 1.90752 | 35.48 |
| 10 | −61.8451 | 0.1000 | | |
| *11 | 115.7038 | 1.6994 | 1.80139 | 45.45 |
| *12 | −120.2774 | 3.0001 | | |
| 13 (St) | ∞ | 9.3175 | | |
| 14 | −49.4050 | 0.9700 | 1.48242 | 58.30 |
| 15 | 23.0684 | 5.7419 | 1.64044 | 59.48 |

TABLE 9-continued

Example 3

| Sn | R | D | Nd | vd | |
|---|---|---|---|---|---|
| 16 | −56.1614 | 2.5002 | | | Variable |
| 17 | 21.4960 | 8.2431 | 1.49700 | 81.61 | |
| 18 | −24.2022 | 1.0000 | 1.99622 | 27.66 | |
| 19 | −46.3271 | 0.1356 | | | |
| 20 | 68.7342 | 3.0955 | 1.95906 | 17.47 | |
| 21 | −89.4841 | 1.2081 | | | |
| 22 | 44.4443 | 4.7759 | 1.49700 | 81.61 | |
| 23 | −30.5540 | 0.9000 | 1.95206 | 17.40 | |
| 24 | 60.0638 | 1.4458 | | | |
| *25 | −293.4691 | 1.3200 | 1.80999 | 37.45 | |
| *26 | 1481.1022 | 11.0760 | | | Variable |
| 27 | ∞ | 2.8500 | 1.51680 | 64.20 | |
| 28 | ∞ | 2.5268 | | | |

TABLE 10

Example 3

| f | 14.23 |
|---|---|
| Bf | 15.48 |
| FNo | 1.44 |
| 2ω[°] | 91.8 |

TABLE 11

Example 3

| | Infinity | 0.11 m |
|---|---|---|
| D16 | 2.5002 | 0.8474 |
| D26 | 11.0760 | 12.7288 |

TABLE 12

Example 3

| Sn | 1 | 2 | 11 |
|---|---|---|---|
| KA | 1.0000000E+00 | 1.0000000E+00 | 1.0000000E+00 |
| A3 | 3.7432291E−19 | 0.0000000E+00 | 1.0536464E−19 |
| A4 | 2.5563630E−04 | 2.1573204E−04 | 4.8946700E−06 |
| A5 | −4.3418651E−05 | −1.5902168E−05 | 8.9761069E−06 |
| A6 | 1.8299916E−06 | −5.2713152E−06 | −5.3597595E−06 |
| A7 | 4.7642312E−07 | 1.0094197E−06 | 1.0558832E−06 |
| A8 | −5.6600199E−08 | 6.0909018E−08 | 9.1370511E−08 |
| A9 | −1.8633641E−09 | −2.2204206E−08 | −5.9402104E−08 |
| A10 | 5.2331249E−10 | −1.3468042E−10 | 3.0180597E−09 |
| A11 | −5.1308968E−12 | 2.6068308E−10 | 1.3040276E−09 |
| A12 | −2.4643257E−12 | −4.3175451E−12 | −1.3488238E−10 |
| A13 | 7.7492788E−14 | −1.7897180E−12 | −1.4668718E−11 |
| A14 | 6.0687926E−15 | 5.0910162E−14 | 2.1546150E−12 |
| A15 | −3.0031131E−16 | 7.1999586E−15 | 8.4834568E−14 |
| A16 | −6.3151908E−18 | −2.5516741E−16 | −1.7541353E−14 |
| A17 | 5.2233016E−19 | −1.5737404E−17 | −2.0930110E−16 |
| A18 | −1.1577796E−21 | 6.2705286E−19 | 7.2548263E−17 |
| A19 | −3.4912875E−22 | 1.4436543E−20 | 6.7970766E−20 |
| A20 | 5.1509560E−24 | −6.1774569E−22 | −1.2060742E−19 |

| Sn | 12 | 25 | 26 |
|---|---|---|---|
| KA | 1.0000000E+00 | 1.0000000E+00 | 1.0000000E+00 |
| A3 | −2.8097238E−20 | 2.1684043E−20 | −1.0426587E−18 |
| A4 | 3.1471638E−05 | 9.2519104E−05 | 1.5973417E−04 |
| A5 | −3.4874833E−06 | −3.2426176E−05 | −7.9531157E−06 |
| A6 | −1.2210254E−06 | 6.4593238E−06 | −7.3142540E−06 |
| A7 | 7.9309953E−07 | 9.3410386E−07 | 3.4368764E−06 |
| A8 | −8.6919240E−08 | −4.6015332E−07 | −1.9091693E−07 |
| A9 | −2.1049551E−08 | −1.0522416E−09 | −1.5161753E−07 |
| A10 | 4.5534242E−09 | 1.3483605E−08 | 2.2064141E−08 |

TABLE 12-continued

Example 3

| A11 | 1.7670465E−10 | −6.1406687E−10 | 2.6459474E−09 |
|---|---|---|---|
| A12 | −8.9230030E−11 | −2.1492710E−10 | −6.6757744E−10 |
| A13 | 9.8605943E−13 | 1.6126607E−11 | −7.2551557E−12 |
| A14 | 9.1026367E−13 | 1.8406398E−12 | 9.4356112E−12 |
| A15 | −2.6987126E−14 | −1.8992571E−13 | −3.7169345E−13 |
| A16 | −5.1576978E−15 | −6.8322003E−15 | −6.0274798E−14 |
| A17 | 1.6710822E−16 | 1.0989691E−15 | 4.7688849E−15 |
| A18 | 1.5919930E−17 | −3.4095781E−18 | 8.4364753E−17 |
| A19 | −3.4243665E−19 | −2.5349836E−18 | −1.7932280E−17 |
| A20 | −2.2636736E−20 | 6.7179824E−20 | 4.7454974E−19 |

Example 4

Figure 9:
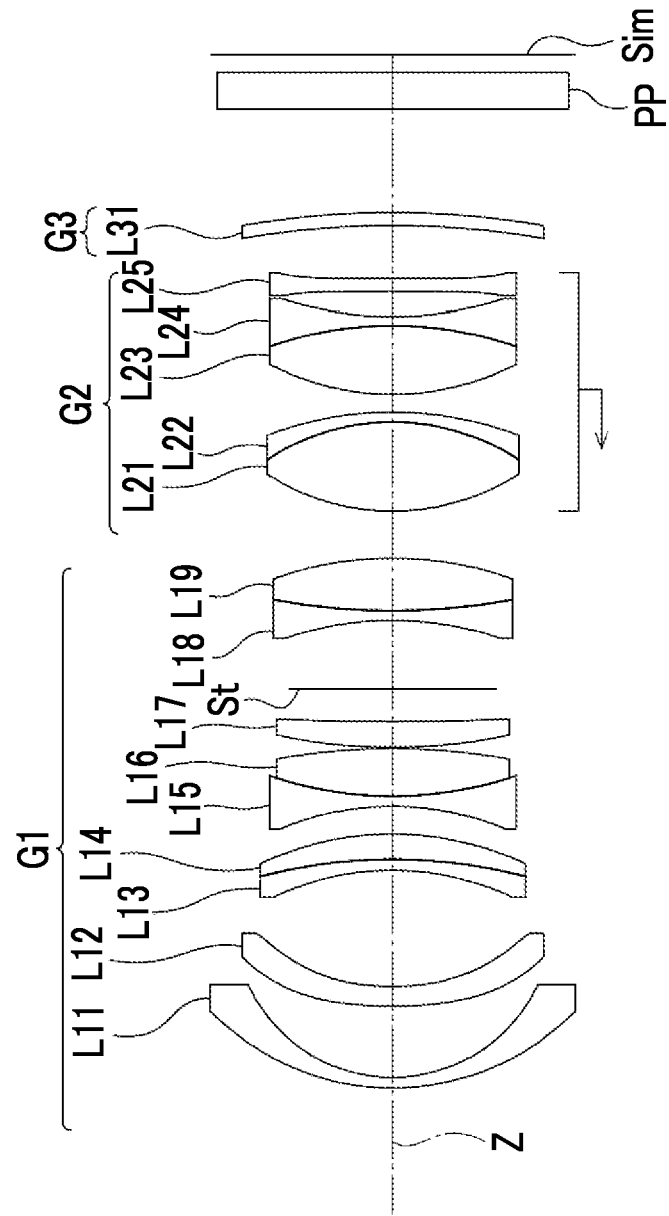
FIG. 9 is a cross-sectional view showing a configuration of an imaging lens of Example 4.

FIG. 9 is a cross-sectional view of a configuration of an imaging lens of Example 4. The imaging lens of Example 4 consists of, in order from the object side to the image side, a first lens group G1 that has a negative refractive power, a second lens group G2 that has a positive refractive power, and a third lens group G3 that has a positive refractive power. The first lens group G1 consists of nine lenses and an aperture stop St. More specifically, the first lens group G1 consists of lenses L11 to L17, an aperture stop St, and lenses L18 and L19, in order from the object side to the image side. The second lens group G2 consists of five lenses L21 to L25, in order from the object side to the image side. The third lens group G3 consists of one lens L31. During focusing from the infinite distance object to the close object, the first lens group G1 and the third lens group G3 remain stationary with respect to the image plane Sim, and the second lens group G2 moves toward the object side.

Figure 10:
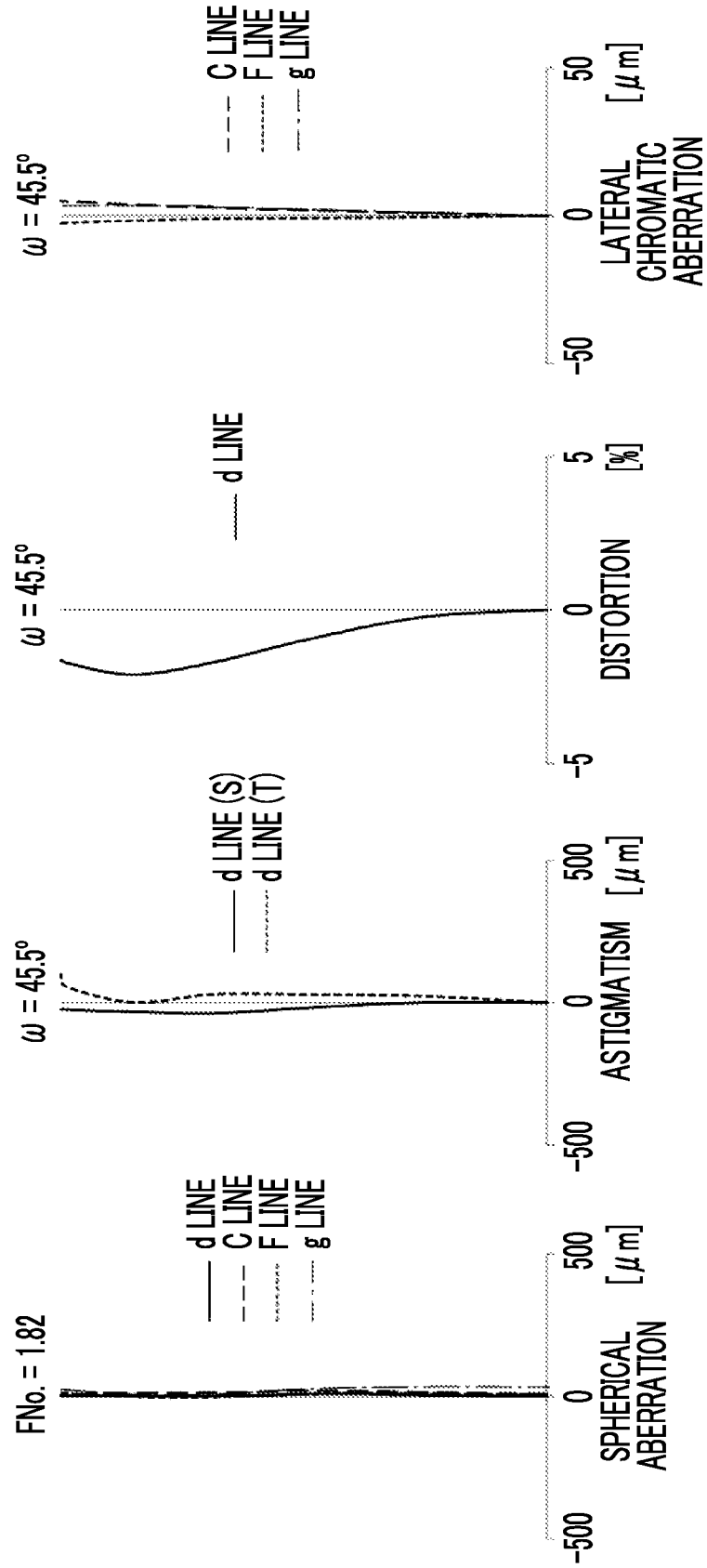
FIG. 10 is a diagram showing aberrations of the imaging lens of Example 4.

Regarding the imaging lens of Example 4, Table 13 shows basic lens data, Table 14 shows specifications, Table 15 shows variable surface spacings, and Table 16 shows aspherical coefficients thereof. FIG. 10 shows aberration diagrams.

TABLE 13

Example 4

| Sn | R | D | Nd | vd | |
|---|---|---|---|---|---|
| 1 | 20.5240 | 0.8100 | 2.00000 | 16.63 | |
| 2 | 12.7778 | 5.5601 | | | |
| *3 | 44.4376 | 1.5000 | 1.58313 | 59.38 | |
| *4 | 20.6701 | 8.9303 | | | |
| 5 | −22.5924 | 0.8500 | 2.00000 | 15.00 | |
| 6 | −42.1243 | 1.9880 | 1.82717 | 45.28 | |
| 7 | −24.9265 | 2.1369 | | | |
| 8 | −23.9247 | 0.7900 | 1.49700 | 81.61 | |
| 9 | 30.8941 | 3.6843 | 1.95246 | 20.43 | |
| 10 | −52.3892 | 0.1000 | | | |
| *11 | 46.2776 | 2.0000 | 1.75904 | 31.41 | |
| *12 | 356.4691 | 2.5002 | | | |
| 13 (St) | ∞ | 5.3438 | | | |
| 14 | −27.1695 | 0.7500 | 1.67661 | 31.83 | |
| 15 | 52.0718 | 4.0669 | 1.59282 | 68.62 | |
| 16 | −28.8320 | 3.6420 | | | Variable |
| 17 | 18.7761 | 6.9345 | 1.55032 | 75.50 | |
| 18 | −18.3304 | 0.7500 | 1.90219 | 35.99 | |
| 19 | −28.5361 | 1.3695 | | | |
| 20 | 21.4595 | 5.3112 | 1.49700 | 81.61 | |
| 21 | −30.7895 | 0.6800 | 1.84617 | 22.69 | |
| 22 | 28.8892 | 1.9336 | | | |
| *23 | −964.6081 | 1.0002 | 1.80610 | 40.73 | |
| *24 | −332.3014 | 4.1083 | | | Variable |
| 25 | −71.4174 | 1.0002 | 1.48001 | 65.77 | |
| 26 | −70.6982 | 8.0000 | | | |

TABLE 13-continued

Example 4

| Sn | R | D | Nd | vd |
|---|---|---|---|---|
| 27 | ∞ | 2.8500 | 1.51680 | 64.20 |
| 28 | ∞ | 1.3848 | | |

TABLE 14

Example 4

| | |
|---|---|
| f | 14.42 |
| Bf | 11.26 |
| FNo | 1.82 |
| 2ω[°] | 91.0 |

TABLE 15

Example 4

| | Infinity | 0.06 m |
|---|---|---|
| D16 | 3.6420 | 0.5557 |
| D24 | 4.1083 | 3.5526 |

TABLE 16

Example 4

| Sn | 3 | 4 | 11 |
|---|---|---|---|
| KA | 1.0000000E+00 | 1.0000000E+00 | 6.1035840E+00 |
| A3 | 5.0194545E−20 | −8.8519203E−20 | −1.7606644E−20 |
| A4 | 1.9412881E−04 | 2.0943253E−04 | −9.9485501E−06 |
| A5 | 9.3178648E−06 | −5.5306529E−06 | 5.3862387E−06 |
| A6 | −8.9705659E−06 | −5.3030804E−06 | −1.5096341E−06 |
| A7 | 1.0019921E−06 | 1.0392855E−06 | −2.5546939E−07 |
| A8 | 2.2713760E−07 | 1.0113143E−07 | 2.3020202E−07 |
| A9 | −5.1236320E−08 | −4.3335232E−08 | −1.9732329E−08 |
| A10 | −2.4900387E−09 | −9.0586716E−10 | −1.1444393E−08 |
| A11 | 1.1376077E−09 | 9.9286808E−10 | 2.0388331E−09 |
| A12 | −4.4427985E−12 | −7.4396643E−12 | 2.4630542E−10 |
| A13 | −1.3911060E−11 | −1.3730007E−11 | −7.1361833E−11 |
| A14 | 4.0816547E−13 | 3.0717523E−13 | −1.4668283E−12 |
| A15 | 9.6878769E−14 | 1.1420215E−13 | 1.2321755E−12 |
| A16 | −4.2966145E−15 | −3.6549432E−15 | −2.8675640E−14 |
| A17 | −3.6027894E−16 | −5.2754317E−16 | −1.0610194E−14 |
| A18 | 1.9564767E−17 | 2.0733033E−17 | 5.0528911E−16 |
| A19 | 5.5565700E−19 | 1.0419530E−18 | 3.6461992E−17 |
| A20 | −3.4176773E−20 | −4.7511326E−20 | −2.2959531E−18 |

| Sn | 12 | 23 | 24 |
|---|---|---|---|
| KA | 3.1749954E+00 | 1.0000000E+00 | 1.0000000E+00 |
| A3 | 0.0000000E+00 | 1.2803671E−19 | 5.6644032E−20 |
| A4 | 2.9406304E−06 | 4.3035916E−06 | 8.2238431E−05 |
| A5 | 1.0603021E−05 | −3.5170346E−05 | −6.0504547E−06 |
| A6 | −5.3466434E−06 | 7.9253290E−06 | −7.0263093E−06 |
| A7 | 7.3938273E−07 | 5.9125322E−07 | 2.8710411E−06 |
| A8 | 3.0917401E−07 | −3.7803541E−07 | 1.0836562E−07 |
| A9 | −9.8305062E−08 | 6.8174627E−09 | −1.6253335E−07 |
| A10 | −4.9431997E−09 | 9.3180123E−09 | 6.9750056E−09 |
| A11 | 4.3265009E−09 | −4.7650390E−10 | 4.7458250E−09 |
| A12 | −1.2384711E−10 | −1.4818668E−10 | −3.7032620E−10 |
| A13 | −9.9078746E−11 | 8.8301342E−12 | −8.2558392E−11 |
| A14 | 6.4071037E−12 | 1.7240345E−12 | 8.1372206E−12 |
| A15 | 1.2621439E−12 | −8.0840048E−14 | 8.7263985E−13 |
| A16 | −1.0840408E−13 | −1.6174422E−14 | −9.8083584E−14 |
| A17 | −8.4650363E−15 | 3.6525793E−16 | −5.2483234E−15 |
| A18 | 8.4929036E−16 | 1.0971224E−16 | 6.4240505E−16 |
| A19 | 2.3288574E−17 | −6.3416440E−19 | 1.3890126E−17 |
| A20 | −2.5914029E−18 | −3.5895584E−19 | −1.8025640E−18 |

Example 5

Figure 11:
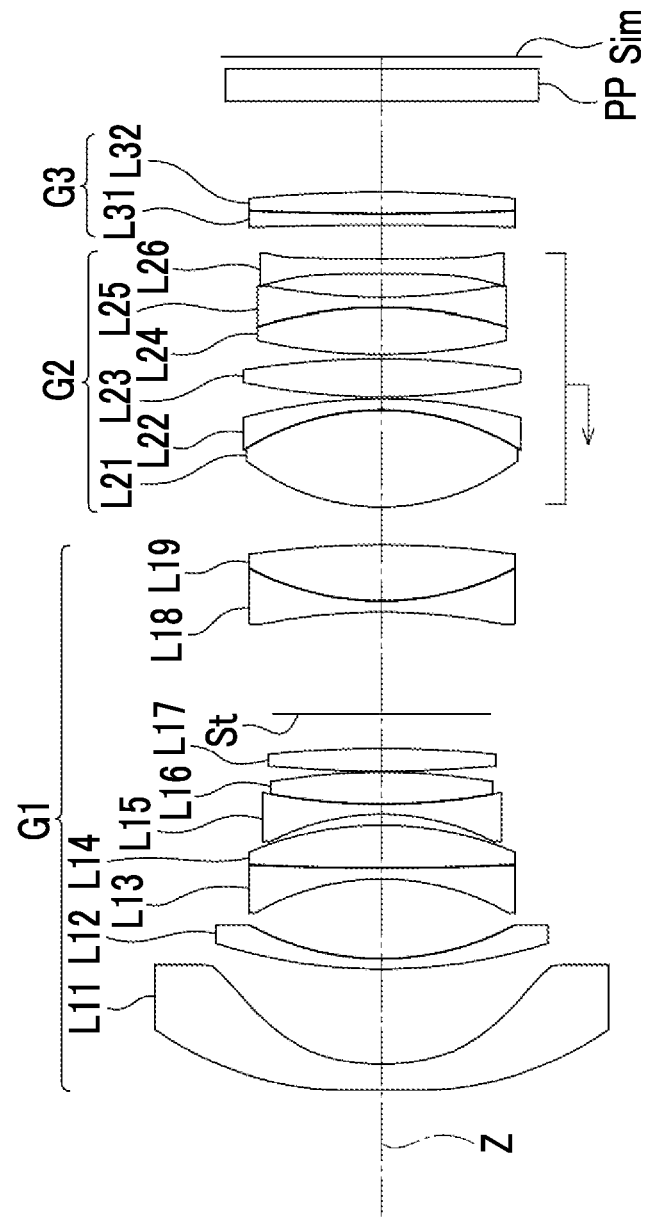
FIG. 11 is a cross-sectional view showing a configuration of an imaging lens of Example 5.

FIG. 11 is a cross-sectional view of a configuration of an imaging lens of Example 5. The imaging lens of Example 5 consists of, in order from the object side to the image side, a first lens group G1 that has a negative refractive power, a second lens group G2 that has a positive refractive power, and a third lens group G3 that has a positive refractive power. The first lens group G1 consists of nine lenses and an aperture stop St. More specifically, the first lens group G1 consists of lenses L11 to L17, an aperture stop St, and lenses L18 and L19, in order from the object side to the image side. The second lens group G2 consists of six lenses L21 to L26, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves toward the object side.

Figure 12:
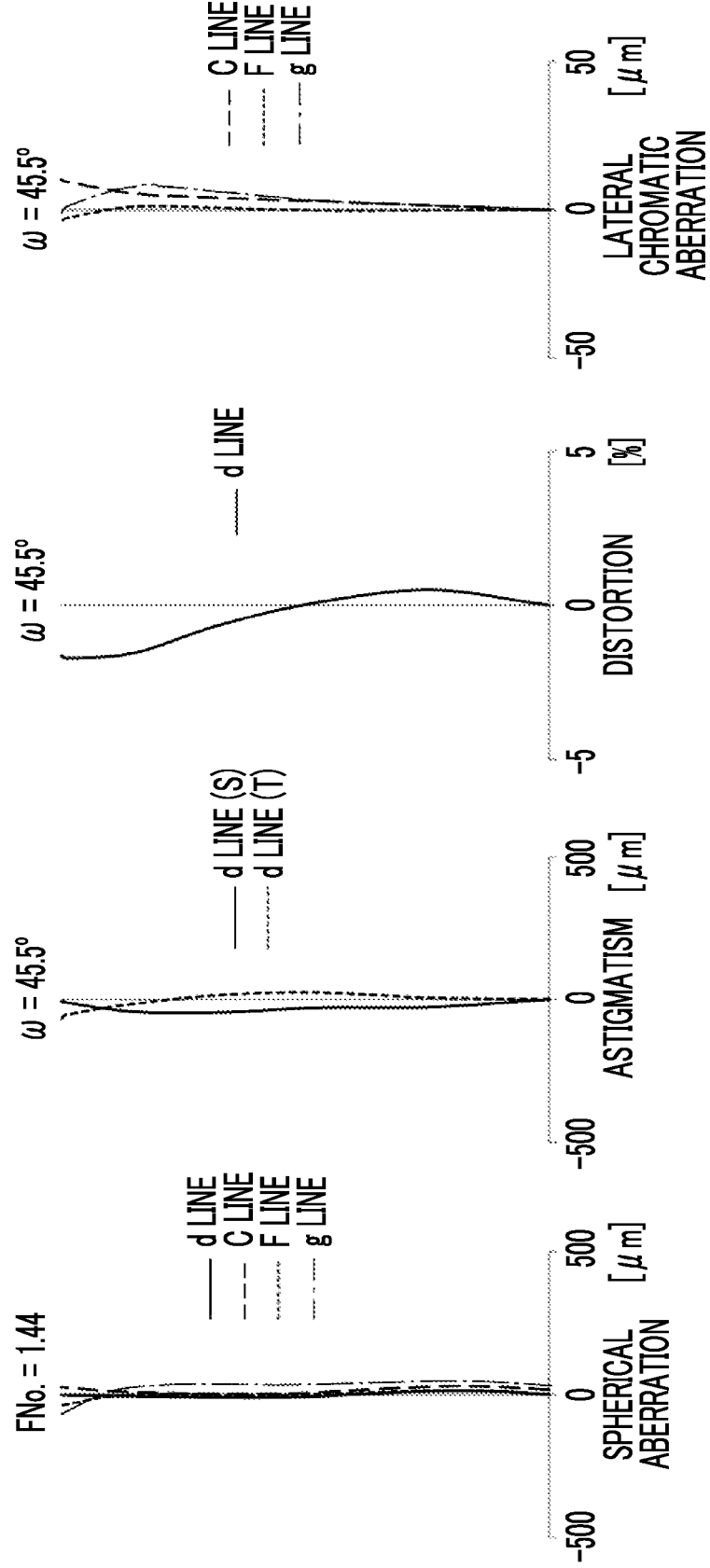
FIG. 12 is a diagram showing aberrations of the imaging lens of Example 5.

Regarding the imaging lens of Example 5, Table 17 shows basic lens data, Table 18 shows specifications, Table 19 shows variable surface spacings, and Table 20 shows aspherical coefficients thereof. FIG. 12 shows aberration diagrams.

TABLE 17

Example 5

| Sn | R | D | Nd | vd | |
|---|---|---|---|---|---|
| *1 | −157.7441 | 2.3000 | 1.51633 | 64.06 | |
| *2 | 25.1960 | 8.3862 | | | |
| 3 | 50.8833 | 0.9000 | 1.49700 | 81.61 | |
| 4 | 25.5907 | 6.9435 | | | |
| 5 | −23.2356 | 0.9700 | 1.49700 | 81.61 | |
| 6 | 248.6657 | 3.7806 | 1.95375 | 32.32 | |
| 7 | −31.6116 | 0.9838 | | | |
| 8 | −21.9452 | 0.8900 | 1.75520 | 27.51 | |
| 9 | 57.4170 | 2.7977 | 1.87070 | 40.73 | |
| 10 | −61.3204 | 0.1041 | | | |
| *11 | 124.7058 | 1.9887 | 1.80139 | 45.45 | |
| *12 | −88.4889 | 3.0002 | | | |
| 13 (St) | ∞ | 9.0508 | | | |
| 14 | −55.3666 | 0.9700 | 1.48703 | 57.43 | |
| 15 | 26.4050 | 4.9348 | 1.67092 | 57.95 | |
| 16 | −88.1447 | 3.3306 | | | Variable |
| 17 | 20.3469 | 8.5696 | 1.49700 | 81.61 | |
| 18 | −23.8473 | 1.0000 | 2.00069 | 25.46 | |
| 19 | −47.3196 | 0.1679 | | | |
| 20 | 62.3864 | 3.3394 | 1.98613 | 16.48 | |
| 21 | −80.1012 | 0.3993 | | | |
| 22 | 52.4934 | 4.0565 | 1.43700 | 95.10 | |
| 23 | −39.0659 | 0.9000 | 1.96521 | 16.74 | |
| 24 | 54.4328 | 2.0571 | | | |
| *25 | 3025.3303 | 1.3200 | 1.68948 | 31.02 | |
| *26 | 392.1354 | 3.0002 | | | Variable |
| 27 | −333.1057 | 1.0000 | 2.00000 | 18.46 | |
| 28 | 287.5773 | 1.8988 | 1.69847 | 56.58 | |
| 29 | −127.3945 | 8.0000 | | | |
| 30 | ∞ | 2.8500 | 1.51680 | 64.20 | |
| 31 | ∞ | 1.0907 | | | |

TABLE 18

Example 5

| | |
|---|---|
| f | 14.42 |
| Bf | 10.97 |
| FNo | 1.44 |
| 2ω[°] | 91.0 |

TABLE 19

Example 5

|  | Infinity | 0.06 m |
|---|---|---|
| D16 | 3.3306 | 0.3131 |
| D26 | 3.0002 | 6.0177 |

TABLE 20

Example 5

| Sn | 1 | 2 | 11 |
|---|---|---|---|
| KA | 1.0000000E+00 | 1.0000000E+00 | 1.0000000E+00 |
| A3 | 0.0000000E+00 | 0.0000000E+00 | 5.0339475E−20 |
| A4 | 4.4926496E−04 | 3.7008429E−04 | 9.7391916E−06 |
| A5 | −7.6891954E−05 | −1.7311563E−05 | 5.8801832E−06 |
| A6 | 4.7610030E−06 | −9.1262583E−06 | −1.8414009E−06 |
| A7 | 5.5287521E−07 | 1.4689451E−06 | 2.2724255E−07 |
| A8 | −1.0491686E−07 | 1.0120342E−07 | 1.4849800E−08 |
| A9 | 7.8479885E−10 | −3.4118673E−08 | −1.3099939E−08 |
| A10 | 8.1070620E−10 | −3.4216821E−11 | 1.8298819E−09 |
| A11 | −3.4570442E−11 | 4.0826937E−10 | 1.6642984E−10 |
| A12 | −3.1503037E−12 | −1.0689793E−11 | −5.8940659E−11 |
| A13 | 2.2132219E−13 | −2.8151674E−12 | 1.0063437E−12 |
| A14 | 5.5783257E−15 | 1.1405311E−13 | 7.4968996E−13 |
| A15 | −6.7845101E−16 | 1.1282119E−14 | −4.1556333E−14 |
| A16 | 3.1413499E−20 | −5.5422501E−16 | −4.2542765E−15 |
| A17 | 1.0431724E−18 | −2.4437917E−17 | 3.5142427E−16 |
| A18 | −1.4088706E−20 | 1.3364178E−18 | 7.0384474E−18 |
| A19 | −6.4483166E−22 | 2.2135471E−20 | −9.9435487E−19 |
| A20 | 1.4074486E−23 | −1.2942039E−21 | 1.3451720E−20 |

| Sn | 12 | 25 | 26 |
|---|---|---|---|
| KA | 1.0000000E+00 | 1.0000000E+00 | 1.0000000E+00 |
| A3 | 2.0135790E−20 | 1.1655173E−19 | −3.1279762E−18 |
| A4 | 2.6478492E−05 | −1.6721549E−04 | −2.9201818E−05 |
| A5 | −4.8340066E−06 | 2.8151968E−05 | 7.3417678E−06 |
| A6 | 1.2255998E−06 | 2.4572773E−06 | −2.4051081E−06 |
| A7 | 1.8714357E−07 | −2.2746234E−06 | 1.5241439E−06 |
| A8 | −1.2342297E−07 | 7.5439551E−08 | −2.5014137E−07 |
| A9 | 4.4773430E−09 | 7.6344940E−08 | −6.7092600E−08 |
| A10 | 4.2754283E−09 | −5.5637740E−09 | 1.9753999E−08 |
| A11 | −4.0733063E−10 | −1.4773540E−09 | 6.6197348E−10 |
| A12 | −7.2916099E−11 | 1.4344527E−10 | −5.5963268E−10 |
| A13 | 1.0239875E−11 | 1.7220763E−11 | 1.9910887E−11 |
| A14 | 5.8281640E−13 | −1.9861654E−12 | 7.5532474E−12 |
| A15 | −1.2633836E−13 | −1.1750983E−13 | −5.8889432E−13 |
| A16 | −7.8288263E−16 | 1.5520313E−14 | −4.3380413E−14 |
| A17 | 7.8008534E−16 | 4.2388306E−16 | 5.7083489E−15 |
| A18 | −1.6751916E−17 | −6.4026956E−17 | 6.9073670E−18 |
| A19 | −1.9246965E−18 | −6.0456746E−19 | −1.9630528E−17 |
| A20 | 7.4451508E−20 | 1.0758596E−19 | 6.1809969E−19 |

Example 6

Figure 13:
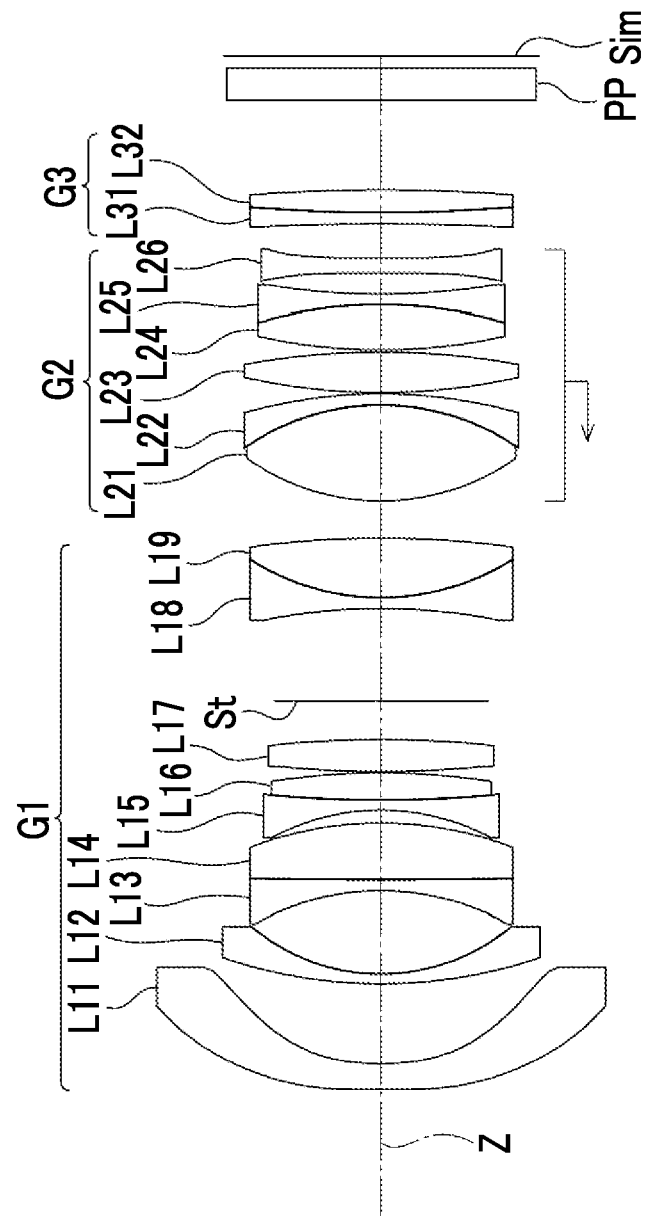
FIG. 13 is a cross-sectional view showing a configuration of an imaging lens of Example 6.

FIG. 13 is a cross-sectional view of a configuration of an imaging lens of Example 6. The imaging lens of Example 6 consists of, in order from the object side to the image side, a first lens group G1 that has a negative refractive power, a second lens group G2 that has a positive refractive power, and a third lens group G3 that has a negative refractive power. The first lens group G1 consists of nine lenses and an aperture stop St. More specifically, the first lens group G1 consists of lenses L11 to L17, an aperture stop St, and lenses L18 and L19, in order from the object side to the image side. The second lens group G2 consists of six lenses L21 to L26, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves toward the object side.

Figure 14:
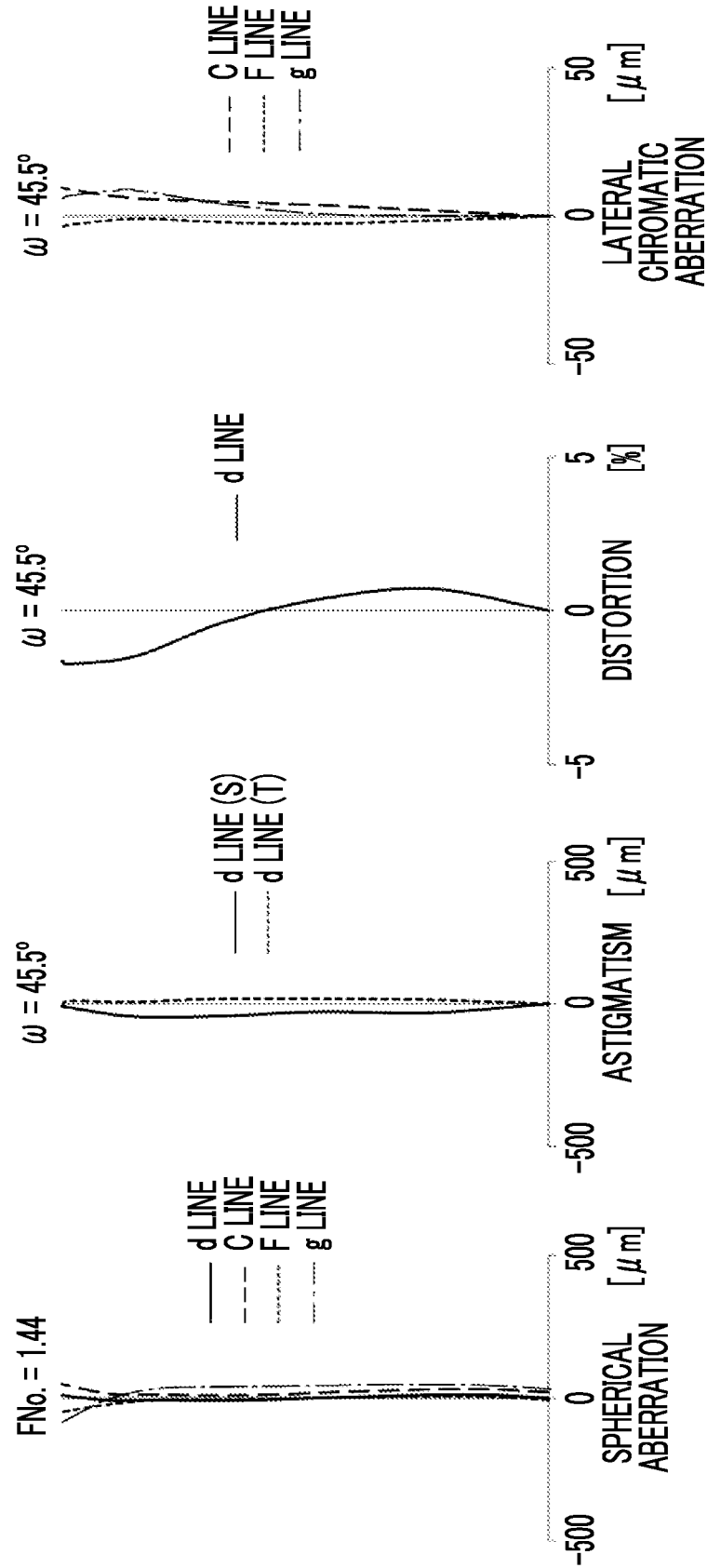
FIG. 14 is a diagram showing aberrations of the imaging lens of Example 6.

Regarding the imaging lens of Example 6, Table 21 shows basic lens data, Table 22 shows specifications, Table 23 shows variable surface spacings, and Table 24 shows aspherical coefficients thereof. FIG. 14 shows aberration diagrams.

TABLE 21

Example 6

| Sn | R | D | Nd | νd |  |
|---|---|---|---|---|---|
| *1 | −1791.9688 | 2.3000 | 1.51633 | 64.06 |  |
| *2 | 27.6931 | 7.1321 |  |  |  |
| 3 | 46.1782 | 0.8700 | 1.43700 | 95.10 |  |
| 4 | 18.7642 | 7.3552 |  |  |  |
| 5 | −24.2340 | 0.9700 | 1.43700 | 95.10 |  |
| 6 | 723.5215 | 5.0563 | 1.95375 | 32.32 |  |
| 7 | −34.4925 | 1.1595 |  |  |  |
| 8 | −21.4810 | 0.8900 | 1.75520 | 27.51 |  |
| 9 | 112.6781 | 2.4253 | 1.87070 | 40.73 |  |
| 10 | −64.9397 | 0.1002 |  |  |  |
| *11 | 96.6071 | 2.8659 | 1.80139 | 45.45 |  |
| *12 | −85.8422 | 3.4454 |  |  |  |
| 13(St) | ∞ | 8.2421 |  |  |  |
| 14 | −56.2722 | 0.9700 | 1.51742 | 52.43 |  |
| 15 | 22.7859 | 5.2872 | 1.65161 | 58.42 |  |
| 16 | −91.4410 | 3.3234 |  |  | Variable |
| 17 | 21.7807 | 8.5621 | 1.55032 | 75.50 |  |
| 18 | −22.3663 | 1.0000 | 2.05090 | 26.94 |  |
| 19 | −46.8392 | 0.1002 |  |  |  |
| 20 | 57.7442 | 3.6097 | 1.95906 | 17.47 |  |
| 21 | −70.8940 | 0.1907 |  |  |  |
| 22 | 53.1373 | 4.0007 | 1.43700 | 95.10 |  |
| 23 | −40.0092 | 0.9000 | 1.95906 | 17.47 |  |
| 24 | 65.6417 | 1.8731 |  |  |  |
| *25 | −447.7352 | 1.3200 | 1.68948 | 31.02 |  |
| *26 | 555.6263 | 3.0810 |  |  | Variable |
| 27 | −231.9241 | 1.0000 | 1.85896 | 22.73 |  |
| 28 | 146.3368 | 2.0098 | 1.49700 | 81.54 |  |
| 29 | −165.7402 | 8.0000 |  |  |  |
| 30 | ∞ | 2.8500 | 1.51680 | 64.20 |  |
| 31 | ∞ | 1.0931 |  |  |  |

TABLE 22

Example 6

| f | 14.43 |
| Bf | 10.97 |
| FNo | 1.44 |
| 2ω[°] | 91.0 |

TABLE 23

Example 6

|  | Infinity | 0.06 m |
|---|---|---|
| D16 | 3.3234 | 0.5726 |
| D26 | 3.0810 | 5.8318 |

TABLE 24

| | Example 6 | | |
|---|---|---|---|
| Sn | 1 | 2 | 11 |
| KA | 1.0000000E+00 | 1.0000000E+00 | 1.0000000E+00 |
| A3 | −1.8076158E−05 | 0.0000000E+00 | 4.0271580E−20 |
| A4 | 4.6829573E−04 | 3.5932070E−04 | 1.4964289E−05 |
| A5 | −8.8413242E−05 | −1.6854851E−05 | 1.3049468E−06 |
| A6 | 5.6817320E−06 | −1.0413773E−05 | −2.0807364E−06 |
| A7 | 7.0823083E−07 | 1.6125482E−06 | 7.7509858E−07 |
| A8 | −1.2251500E−07 | 1.3538870E−07 | −9.0708622E−08 |
| A9 | −3.0045614E−10 | −3.8266175E−08 | −2.0323237E−08 |
| A10 | 9.6596422E−10 | −4.5526325E−10 | 6.6665254E−09 |
| A11 | −3.0060172E−11 | 4.6164999E−10 | −1.7230209E−10 |
| A12 | −3.9484300E−12 | −7.6715746E−12 | −1.4262246E−10 |
| A13 | 2.0947706E−13 | −3.1911224E−12 | 1.3695463E−11 |
| A14 | 8.1229756E−15 | 1.0053514E−13 | 1.2536775E−12 |
| A15 | −6.5811903E−16 | 1.2783063E−14 | −2.1642783E−13 |
| A16 | −4.9821175E−18 | −5.1600895E−16 | −1.8363531E−15 |
| A17 | 1.0208666E−18 | −2.7631580E−17 | 1.4715734E−15 |
| A18 | −8.4292551E−21 | 1.2727858E−18 | −3.6516904E−17 |
| A19 | −6.3243112E−22 | 2.4950492E−20 | −3.7844211E−18 |
| A20 | 1.1242649E−23 | −1.2459275E−21 | 1.6268771E−19 |
| Sn | 12 | 25 | 26 |
| KA | 1.0000000E+00 | 1.0000000E+00 | 1.0000000E+00 |
| A3 | 4.0271580E−20 | −3.0902746E−05 | −4.0650915E−05 |
| A4 | 3.3048835E−05 | 3.4468533E−05 | 1.9022739E−04 |
| A5 | −1.3029358E−05 | −6.4538474E−05 | −9.4016564E−05 |
| A6 | 3.5107439E−06 | 3.1813845E−05 | 2.5124825E−05 |
| A7 | 7.6974311E−09 | −9.4088307E−06 | −1.4629341E−06 |
| A8 | −1.8739319E−07 | 1.8456129E−06 | −4.9355730E−07 |
| A9 | 2.2057514E−08 | −2.3883282E−07 | 6.2587362E−08 |
| A10 | 4.1438664E−09 | 1.4626522E−08 | 5.0850875E−09 |
| A11 | −8.6419414E−10 | 6.6517838E−10 | −9.4930234E−10 |
| A12 | −3.9962447E−11 | −1.6066051E−10 | 1.2850444E−11 |
| A13 | 1.6393575E−11 | 9.9262759E−12 | −9.1423949E−12 |
| A14 | −7.0879784E−14 | −7.3916213E−13 | 2.5627003E−12 |
| A15 | −1.7325455E−13 | 3.2412021E−15 | −1.3352299E−13 |
| A16 | 5.3558021E−15 | 1.3144831E−14 | −1.3227263E−14 |
| A17 | 9.7513748E−16 | −4.5509887E−16 | 1.7803284E−15 |
| A18 | −4.6117714E−17 | −1.5298726E−16 | −6.4227014E−17 |
| A19 | −2.2765232E−18 | 1.4794423E−17 | −1.4304041E−19 |
| A20 | 1.3263875E−19 | −3.9362049E−19 | 4.1977071E−20 |

Example 7

Figure 15:
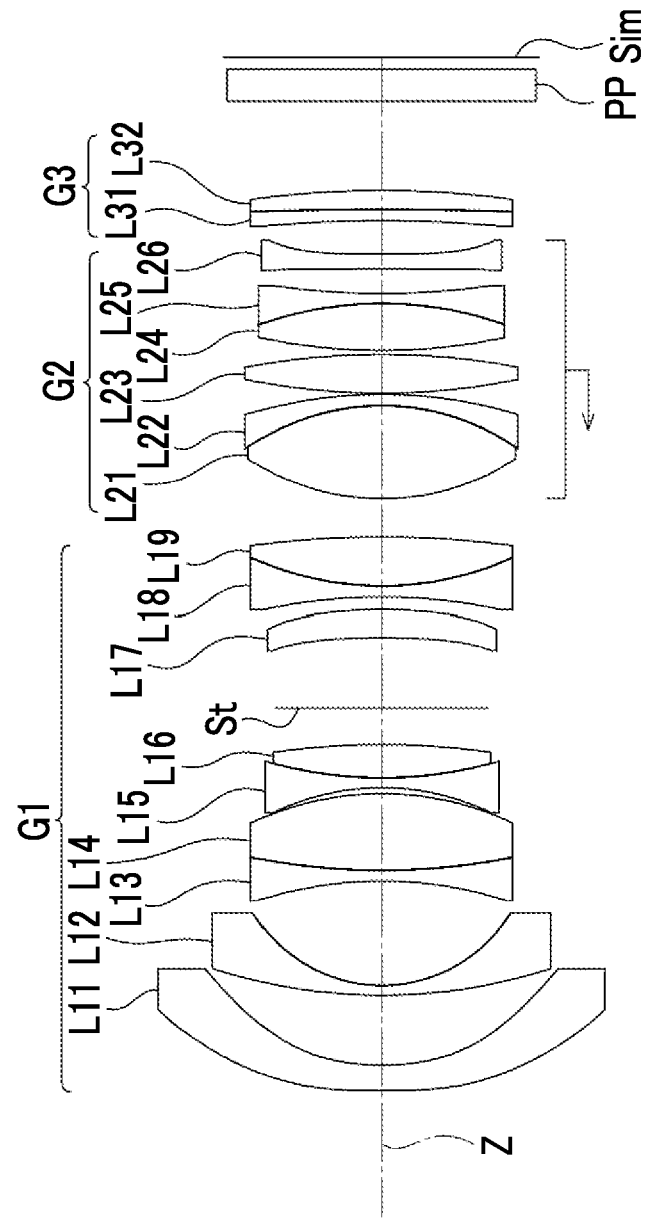
FIG. 15 is a cross-sectional view showing a configuration of an imaging lens of Example 7.

FIG. 15 is a cross-sectional view of a configuration of an imaging lens of Example 7. The imaging lens of Example 7 consists of, in order from the object side to the image side, a first lens group G1 that has a negative refractive power, a second lens group G2 that has a positive refractive power, and a third lens group G3 that has a negative refractive power. The first lens group G1 consists of nine lenses and an aperture stop St. More specifically, the first lens group G1 consists of lenses L11 to L16, an aperture stop St, and lenses L17 to L19, in order from the object side to the image side. The second lens group G2 consists of six lenses L21 to L26, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves toward the object side.

Figure 16:
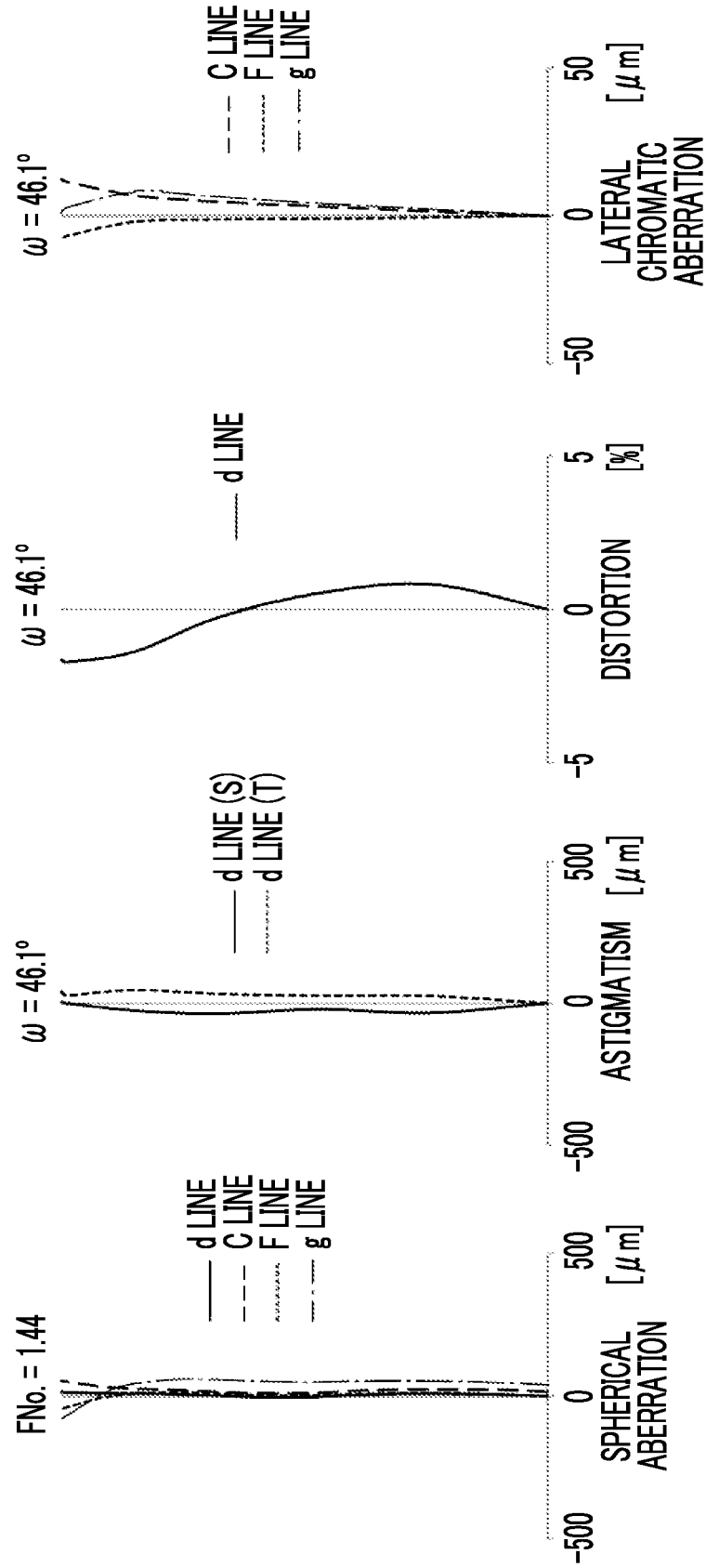
FIG. 16 is a diagram showing aberrations of the imaging lens of Example 7.

Regarding the imaging lens of Example 7, Table 25 shows basic lens data, Table 26 shows specifications, Table 27 shows variable surface spacings, and Table 28 shows aspherical coefficients thereof. FIG. 16 shows aberration diagrams.

TABLE 25

| | Example 7 | | | | |
|---|---|---|---|---|---|
| Sn | R | D | Nd | vd | |
| *1 | 174.4159 | 2.3000 | 1.51633 | 64.06 | |
| *2 | 29.2936 | 6.2432 | | | |
| 3 | 51.4937 | 0.8700 | 1.43700 | 95.10 | |
| 4 | 14.0312 | 9.3818 | | | |
| 5 | −37.9043 | 0.9700 | 1.43700 | 95.10 | |
| 6 | 63.6908 | 6.8493 | 1.91082 | 35.25 | |
| 7 | −28.7732 | 0.5342 | | | |
| 8 | −23.5572 | 0.8900 | 1.78880 | 28.43 | |
| 9 | 39.7838 | 2.9697 | 1.87428 | 39.53 | |
| 10 | −71.3564 | 3.2628 | | | |
| 11(St) | ∞ | 6.2776 | | | |
| *12 | −79.1855 | 2.5000 | 1.49710 | 81.56 | |
| *13 | −45.1424 | 1.1053 | | | |
| 14 | −52.6673 | 0.9700 | 1.51832 | 51.57 | |
| 15 | 29.6944 | 4.3857 | 1.69465 | 56.77 | |
| 16 | −92.5686 | 3.4230 | | | Variable |
| 17 | 22.7912 | 8.3627 | 1.55032 | 75.50 | |
| 18 | −22.0853 | 1.0000 | 2.05090 | 26.94 | |
| 19 | −44.1774 | 0.1002 | | | |
| 20 | 63.3884 | 3.4734 | 1.95906 | 17.47 | |
| 21 | −68.4689 | 0.3641 | | | |
| 22 | 56.2948 | 4.1915 | 1.43700 | 95.10 | |
| 23 | −34.7044 | 0.9000 | 1.95906 | 17.47 | |
| 24 | 72.6306 | 2.1974 | | | |
| *25 | −291.9501 | 1.3200 | 1.80610 | 40.73 | |

TABLE 25-continued

Example 7

| Sn | R | D | Nd | vd |
|---|---|---|---|---|
| *26 | 692.5684 | 3.0001 | | Variable |
| 27 | −121.3798 | 1.0000 | 1.89286 | 20.36 |
| 28 | −385.2528 | 1.6979 | 1.49700 | 81.54 |
| 29 | −90.0784 | 8.0000 | | |
| 30 | ∞ | 2.8500 | 1.51680 | 64.20 |
| 31 | ∞ | 1.0907 | | |

TABLE 26

Example 7

| | |
|---|---|
| f | 14.16 |
| Bf | 10.97 |
| FNo | 1.44 |
| 2ω[°] | 92.2 |

TABLE 27

Example 7

| | Infinity | 0.06 m |
|---|---|---|
| D16 | 3.4230 | 0.6651 |
| D26 | 3.0001 | 5.7580 |

TABLE 28

Example 7

| Sn | 1 | 2 | 12 |
|---|---|---|---|
| KA | 1.0000000E+00 | 1.0000000E+00 | 1.0000000E+00 |
| A3 | 0.0000000E+00 | 0.0000000E+00 | 4.3481907E−20 |
| A4 | 4.3391934E−04 | 3.3575827E−04 | −2.9817116E−05 |
| A5 | −8.6601964E−05 | −1.7646975E−05 | 2.1430763E−06 |
| A6 | 5.6935655E−06 | −1.0333454E−05 | −1.1431221E−06 |
| A7 | 7.0877127E−07 | 1.6170538E−06 | 1.7247039E−07 |
| A8 | −1.2256328E−07 | 1.3549184E−07 | 2.7366801E−08 |
| A9 | −3.0588423E−10 | −3.8270506E−08 | −1.1548111E−08 |
| A10 | 9.6567494E−10 | −4.5594198E−10 | 2.4789892E−10 |
| A11 | −3.0066220E−11 | 4.6159862E−10 | 2.6519477E−10 |
| A12 | −3.9481546E−12 | −7.6743314E−12 | −1.8564696E−11 |
| A13 | 2.0951931E−13 | −3.1911957E−12 | −3.2396407E−12 |
| A14 | 8.1254985E−15 | 1.0053771E−13 | 3.1721876E−13 |
| A15 | −6.5800447E−16 | 1.2783625E−14 | 2.2319274E−14 |
| A16 | −4.9821393E−18 | −5.1595347E−16 | −2.6867963E−15 |
| A17 | 1.0204929E−18 | −2.7628060E−17 | −8.2007361E−17 |
| A18 | −8.4582597E−21 | 1.2729248E−18 | 1.1693345E−17 |
| A19 | −6.3333312E−22 | 2.4950415E−20 | 1.2491683E−19 |
| A20 | 1.1335156E−23 | −1.2467505E−21 | −2.1017724E−20 |

| Sn | 13 | 25 | 26 |
|---|---|---|---|
| KA | 1.0000000E+00 | 1.0000000E+00 | 1.0000000E+00 |
| A3 | −1.3925120E−20 | −4.8874628E−20 | −1.5421629E−19 |
| A4 | −1.0427903E−05 | 4.3410220E−05 | 1.3869385E−04 |
| A5 | −1.0528654E−05 | −2.4450340E−05 | −2.3102604E−05 |
| A6 | 2.6241067E−06 | 9.5033870E−06 | 4.5800546E−07 |
| A7 | −1.0784278E−08 | 1.9402365E−09 | 3.2099196E−06 |
| A8 | −1.1250861E−07 | −4.9962263E−07 | −5.5141389E−07 |
| A9 | 1.1513105E−08 | 4.1199600E−08 | −1.0922560E−07 |
| A10 | 2.1330908E−09 | 1.0996814E−08 | 2.9505518E−08 |
| A11 | −3.7631580E−10 | −1.4371406E−09 | 1.2493513E−09 |
| A12 | −1.7054414E−11 | −1.1243033E−10 | −7.3175109E−10 |
| A13 | 5.7291657E−12 | 2.2124072E−11 | 1.5052641E−11 |
| A14 | −2.0902173E−14 | 3.3816560E−13 | 9.3633726E−12 |
| A15 | −4.6906811E−14 | −1.7240465E−13 | −5.6462408E−13 |
| A16 | 1.3373325E−15 | 2.6640899E−15 | −5.4779230E−14 |
| A17 | 1.9948548E−16 | 6.3663344E−16 | 5.6338664E−15 |

TABLE 28-continued

Example 7

| A18 | −8.6454384E−18 | −2.0742044E−17 | 4.7128681E−17 |
|---|---|---|---|
| A19 | −3.4637422E−19 | −7.9853345E−19 | −1.9502253E−17 |
| A20 | 1.8335735E−20 | 3.2766899E−20 | 5.5557080E−19 |

Example 8

Figure 17:
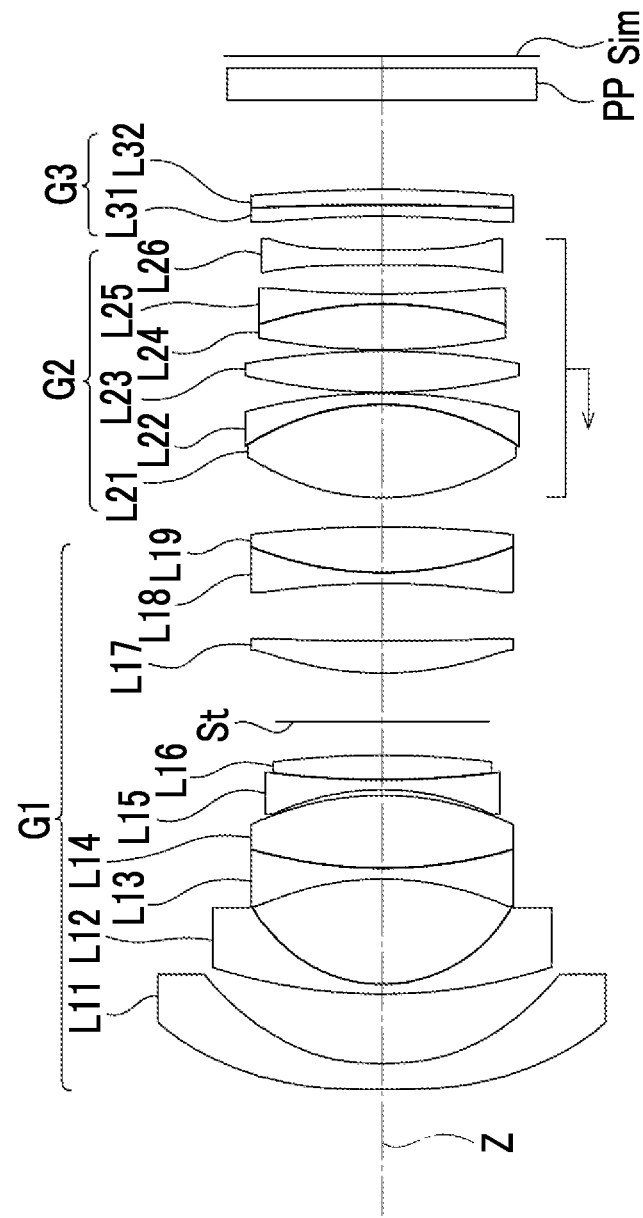
FIG. 17 is a cross-sectional view showing a configuration of an imaging lens of Example 8.

FIG. 17 is a cross-sectional view of a configuration of the imaging lens of Example 8. The imaging lens of Example 8 consists of, in order from the object side to the image side, a first lens group G1 that has a negative refractive power, a second lens group G2 that has a positive refractive power, and a third lens group G3 that has a negative refractive power. The first lens group G1 consists of nine lenses and an aperture stop St. More specifically, the first lens group G1 consists of lenses L11 to L16, an aperture stop St, and lenses L17 to L19, in order from the object side to the image side. The second lens group G2 consists of six lenses L21 to L26, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves toward the object side.

Figure 18:
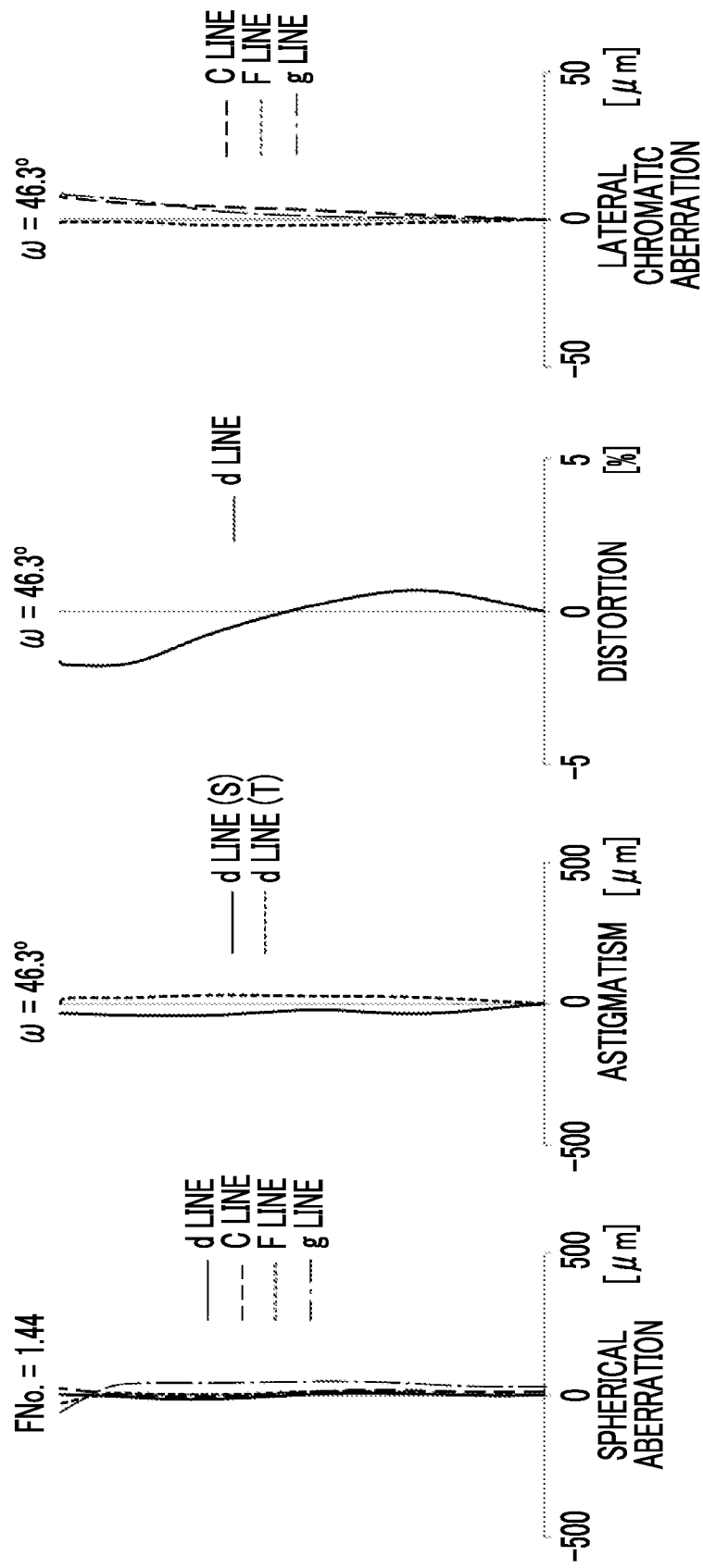
FIG. 18 is a diagram showing aberrations of the imaging lens of Example 8.

Regarding the imaging lens of Example 8, Table 29 shows basic lens data, Table 30 shows specifications, Table 31 shows variable surface spacings, and Table 32 shows aspherical coefficients thereof. FIG. 18 shows aberration diagrams.

TABLE 29

Example 8

| Sn | R | D | Nd | vd |
|---|---|---|---|---|
| *1 | 821.0545 | 2.3000 | 1.51633 | 64.06 |
| *2 | 30.4417 | 6.2185 | | |
| 3 | 51.8054 | 0.8700 | 1.43700 | 95.10 |
| 4 | 13.6882 | 9.4201 | | |
| 5 | −27.8680 | 0.9700 | 1.43700 | 95.10 |
| 6 | 43.5386 | 6.4971 | 1.91082 | 35.25 |
| 7 | −28.7894 | 0.5049 | | |
| 8 | −24.1598 | 0.8900 | 1.78880 | 28.43 |
| 9 | 83.9736 | 2.1881 | 1.84926 | 39.01 |
| 10 | −84.9876 | 3.0000 | | |
| 11(St) | ∞ | 4.3436 | | |
| *12 | 32.5627 | 2.8550 | 1.49710 | 81.56 |
| *13 | 359.1233 | 5.0599 | | |
| 14 | −74.4764 | 0.9600 | 1.59551 | 39.24 |
| 15 | 32.3168 | 4.0968 | 1.59522 | 67.73 |
| 16 | −102.5765 | 2.6000 | | Variable |
| 17 | 22.2017 | 8.3367 | 1.55032 | 75.50 |
| 18 | −22.8058 | 1.0000 | 2.05090 | 26.94 |
| 19 | −47.8982 | 0.1002 | | |
| 20 | 53.3079 | 3.6659 | 1.95906 | 17.47 |
| 21 | −71.0829 | 0.1285 | | |
| 22 | 60.3153 | 4.0798 | 1.43700 | 95.10 |
| 23 | −35.3234 | 0.9000 | 1.95906 | 17.47 |
| 24 | 102.0111 | 2.6105 | | |
| *25 | −169.3517 | 1.3200 | 1.85135 | 40.10 |
| *26 | 295.2912 | 3.0000 | | Variable |
| 27 | −108.8425 | 1.0100 | 1.88475 | 22.20 |
| 28 | −278.0229 | 1.3737 | 1.96291 | 31.71 |
| 29 | −128.6519 | 8.0000 | | |
| 30 | ∞ | 2.8500 | 1.51680 | 64.20 |
| 31 | ∞ | 1.0894 | | |

TABLE 30

Example 8

| | |
|---|---|
| f | 14.03 |
| Bf | 10.97 |
| FNo | 1.44 |
| 2ω[°] | 92.6 |

TABLE 31

Example 8

| | Infinity | 0.06 m |
|---|---|---|
| D16 | 2.6000 | 0.6755 |
| D26 | 3.0000 | 4.9245 |

TABLE 32

Example 8

| Sn | 1 | 2 | 12 |
|---|---|---|---|
| KA | 1.0000000E+00 | 1.0000000E+00 | 1.0000000E+00 |
| A3 | 0.0000000E+00 | 0.0000000E+00 | 1.2548636E−20 |
| A4 | 4.2278125E−04 | 3.1769113E−04 | 2.4964344E−07 |
| A5 | −8.6554351E−05 | −1.7761441E−05 | 2.2405454E−06 |
| A6 | 5.7064728E−06 | −1.0329265E−05 | −6.4630061E−07 |
| A7 | 7.0949074E−07 | 1.6177502E−06 | 1.3449467E−08 |
| A8 | −1.2255298E−07 | 1.3556798E−07 | 2.3913625E−08 |
| A9 | −3.0635783E−10 | −3.8266628E−08 | −3.3967141E−09 |
| A10 | 9.6564862E−10 | −4.5585086E−10 | −2.7738083E−10 |
| A11 | −3.0066674E−11 | 4.6159988E−10 | 9.8151602E−11 |
| A12 | −3.9482581E−12 | −7.6746741E−12 | −1.6996923E−12 |
| A13 | 2.0952238E−13 | −3.1912275E−12 | −1.3565272E−12 |
| A14 | 8.1253196E−15 | 1.0053391E−13 | 7.6953592E−14 |
| A15 | −6.5801237E−16 | 1.2783667E−14 | 1.0123123E−14 |
| A16 | −4.9826113E−18 | −5.1594740E−16 | −8.1651290E−16 |
| A17 | 1.0205113E−18 | −2.7627457E−17 | −3.9291088E−17 |
| A18 | −8.4538384E−21 | 1.2729606E−18 | 3.9037270E−18 |
| A19 | −6.3306056E−22 | 2.4951131E−20 | 6.2101646E−20 |
| A20 | 1.1317018E−23 | −1.2469082E−21 | −7.2949051E−21 |

| Sn | 13 | 25 | 26 |
|---|---|---|---|
| KA | 1.0000000E+00 | 1.0000000E+00 | 1.0000000E+00 |
| A3 | −1.2910120E−20 | 1.5476966E−19 | −1.2337303E−18 |
| A4 | 5.2156268E−06 | 5.5344056E−05 | 1.4883199E−04 |
| A5 | 2.7555773E−06 | −5.4908358E−05 | −4.9620317E−05 |
| A6 | −1.0147952E−06 | 1.2043852E−05 | 1.6198288E−06 |
| A7 | 3.7201656E−08 | 1.4885143E−06 | 4.5719955E−06 |
| A8 | 4.4604628E−08 | −7.1115667E−07 | −6.4636867E−07 |
| A9 | −6.6044119E−09 | −2.5958870E−09 | −1.5906191E−07 |
| A10 | −8.1129667E−10 | 1.8559849E−08 | 3.3276624E−08 |
| A11 | 2.2477109E−10 | −6.4629421E−10 | 2.4357616E−09 |
| A12 | 3.6717186E−12 | −2.6525409E−10 | −8.2360564E−10 |
| A13 | −3.7804207E−12 | 1.3327363E−11 | −2.5851095E−12 |
| A14 | 9.3546454E−14 | 2.1963901E−12 | 1.0747549E−11 |
| A15 | 3.4803683E−14 | −1.1371660E−13 | −4.0758341E−13 |
| A16 | −1.6189079E−15 | −1.0816518E−14 | −6.7212713E−14 |
| A17 | −1.6789364E−16 | 4.2162874E−16 | 4.8691194E−15 |
| A18 | 1.0063481E−17 | 3.3059195E−17 | 1.0788276E−16 |
| A19 | 3.3239302E−19 | −4.6645071E−19 | −1.7936046E−17 |
| A20 | −2.2965999E−20 | −5.8191108E−20 | 4.3141151E−19 |

Example 9

Figure 19:
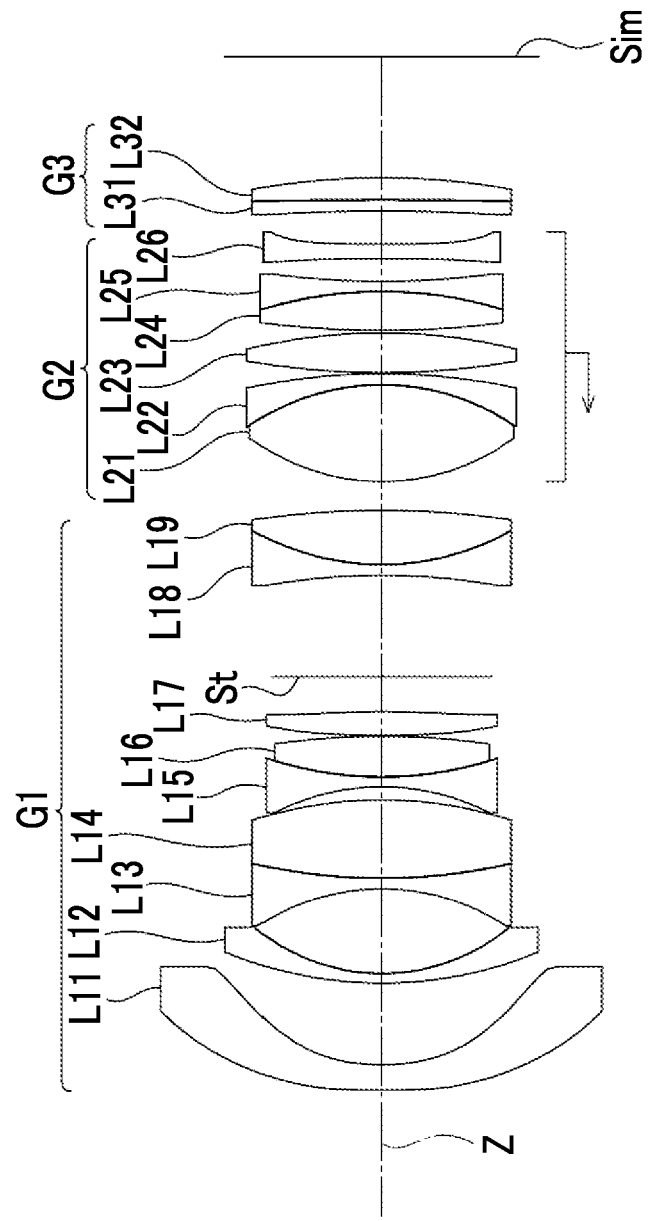
FIG. 19 is a cross-sectional view showing a configuration of an imaging lens of Example 9.

FIG. 19 is a cross-sectional view of a configuration of an imaging lens of Example 9. The imaging lens of Example 9 consists of, in order from the object side to the image side, a first lens group G1 that has a negative refractive power, a second lens group G2 that has a positive refractive power, and a third lens group G3 that has a positive refractive power. The first lens group G1 consists of nine lenses and an aperture stop St. More specifically, the first lens group G1 consists of lenses L11 to L17, an aperture stop St, and lenses L18 and L19, in order from the object side to the image side. The second lens group G2 consists of six lenses L21 to L26, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves toward the object side.

Figure 20:
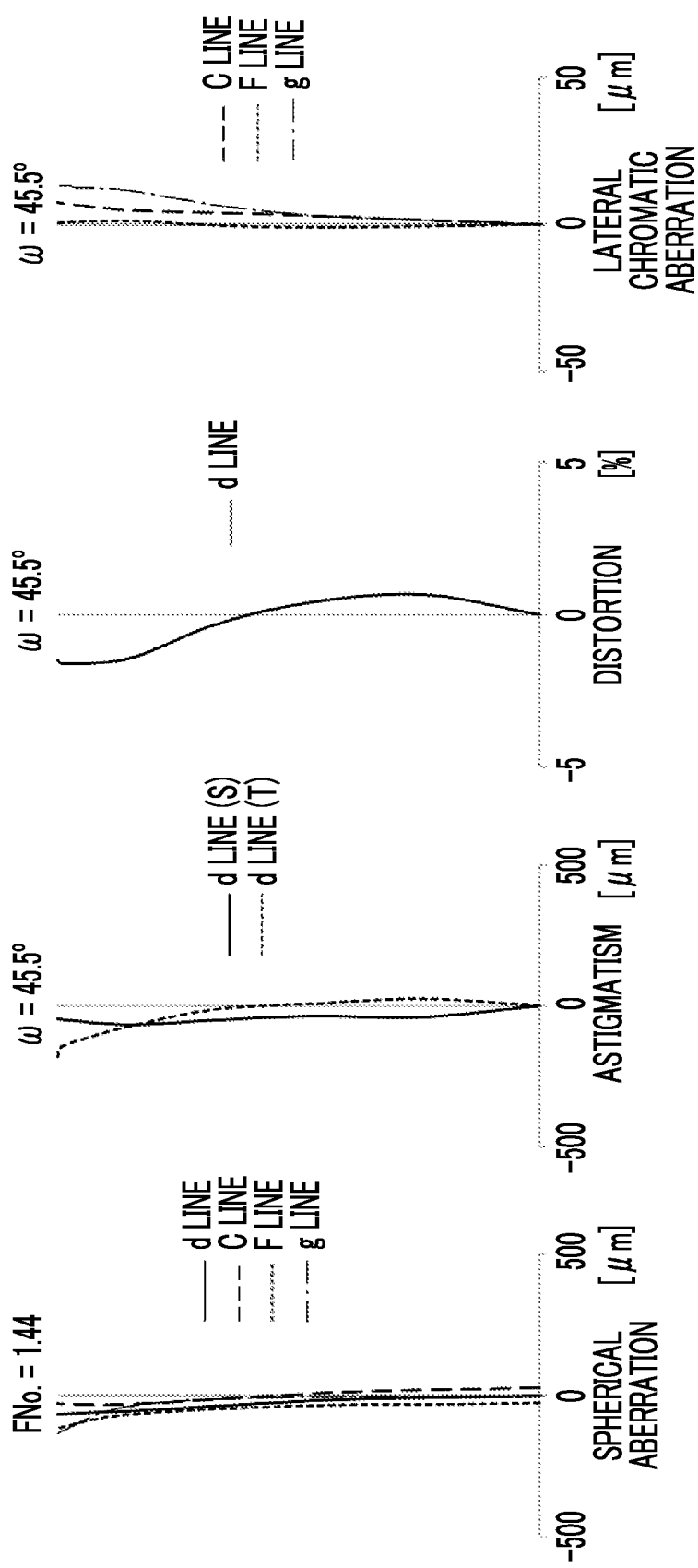
FIG. 20 is a diagram showing aberrations of the imaging lens of Example 9.

Regarding the imaging lens of Example 9, Table 33 shows basic lens data, Table 34 shows specifications, Table 35 shows variable surface spacings, and Table 36 shows aspherical coefficients thereof. FIG. 20 shows aberration diagrams.

TABLE 33

Example 9

| Sn | R | D | Nd | Vd |
|---|---|---|---|---|
| *1 | 331.1480 | 2.3000 | 1.51633 | 64.06 |
| *2 | 23.5871 | 7.3879 | | |
| 3 | 39.0057 | 0.8700 | 1.43700 | 95.10 |
| 4 | 18.8719 | 7.6848 | | |
| 5 | −21.3477 | 0.9700 | 1.43700 | 95.10 |
| 6 | 55.5156 | 7.0745 | 1.91082 | 35.25 |
| 7 | −40.5427 | 1.1978 | | |
| 8 | −22.4482 | 0.8900 | 1.78880 | 28.43 |
| 9 | 34.6622 | 3.6816 | 1.88300 | 39.22 |
| 10 | −71.3576 | 0.1001 | | |
| *11 | 123.0312 | 2.1305 | 1.85135 | 40.10 |
| *12 | −80.7734 | 3.1611 | | |
| 13(St) | ∞ | 9.0910 | | |
| 14 | −63.1289 | 0.9700 | 1.51742 | 52.43 |
| 15 | 25.0740 | 4.8941 | 1.69680 | 55.53 |
| 16 | −85.3315 | 2.6391 | | Variable |
| 17 | 21.0063 | 8.7625 | 1.55032 | 75.50 |
| 18 | −22.3948 | 1.0000 | 2.05090 | 26.94 |
| 19 | −60.9190 | 0.1000 | | |
| 20 | 74.4136 | 3.5933 | 1.95906 | 17.47 |
| 21 | −54.0957 | 0.2236 | | |
| 22 | 90.6737 | 3.5316 | 1.43700 | 95.10 |
| 23 | −39.1983 | 0.9000 | 1.95906 | 17.47 |
| 24 | 77.7709 | 2.0566 | | |
| *25 | −462.9204 | 1.3200 | 1.80610 | 40.73 |
| *26 | 276.0467 | 3.0000 | | Variable |
| 27 | −175.5495 | 1.0000 | 1.89286 | 20.36 |
| 28 | −628.2735 | 2.0098 | 1.49700 | 81.54 |
| 29 | −69.5896 | 10.9775 | | |

TABLE 34

Example 9

| | |
|---|---|
| f | 14.43 |
| Bf | 10.98 |
| FNo | 1.44 |
| 2ω[°] | 91.0 |

TABLE 35

Example 9

| | Infinity | 0.09 m |
|---|---|---|
| D16 | 2.6391 | 0.4661 |
| D26 | 3.0000 | 5.1730 |

TABLE 36

| | Example 9 | | |
|---|---|---|---|
| Sn | 1 | 2 | 11 |
| KA | 1.0000000E+00 | 1.0000000E+00 | 1.0000000E+00 |
| A3 | 0.0000000E+00 | 0.0000000E+00 | 0.0000000E+00 |
| A4 | 4.5487243E−04 | 3.6180625E−04 | 1.9772465E−05 |
| A5 | −8.7953376E−05 | −1.9348496E−05 | 1.1461316E−05 |
| A6 | 5.6690477E−06 | −1.0264585E−05 | −4.1647141E−06 |
| A7 | 7.0891447E−07 | 1.6152994E−06 | 5.4342861E−07 |
| A8 | −1.2249276E−07 | 1.3520873E−07 | 6.9832969E−08 |
| A9 | −3.0129271E−10 | −3.8282034E−08 | −2.8110971E−08 |
| A10 | 9.6587745E−10 | −4.5587792E−10 | 1.2262603E−09 |
| A11 | −3.0064866E−11 | 4.6164649E−10 | 5.0214095E−10 |
| A12 | −3.9484932E−12 | −7.6701773E−12 | −5.8900125E−11 |
| A13 | 2.0948472E−13 | −3.1909733E−12 | −3.3381700E−12 |
| A14 | 8.1237478E−15 | 1.0054414E−13 | 8.3822605E−13 |
| A15 | −6.5808160E−16 | 1.2783362E−14 | −1.1040257E−14 |
| A16 | −4.9812812E−18 | −5.1600905E−16 | −5.1404641E−15 |
| A17 | 1.0207978E−18 | −2.7632977E−17 | 2.5581902E−16 |
| A18 | −8.4372264E−21 | 1.2726390E−18 | 9.2107999E−18 |
| A19 | −6.3273161E−22 | 2.4942052E−20 | −9.3836009E−19 |
| A20 | 1.1265669E−23 | −1.2453900E−21 | 1.8198452E−20 |

| Sn | 12 | 25 | 26 |
|---|---|---|---|
| KA | 1.0000000E+00 | 1.0000000E+00 | 1.0000000E+00 |
| A3 | −1.9506547E−20 | −3.2583086E−20 | −1.3879466E−18 |
| A4 | 2.5065266E−05 | −3.5880238E−05 | 3.3805768E−05 |
| A5 | 9.1066954E−06 | −5.8932484E−06 | 1.2262177E−05 |
| A6 | −2.9821271E−06 | 4.1114770E−06 | −8.2237723E−06 |
| A7 | 1.5347159E−07 | −4.1326443E−07 | 2.2777074E−06 |
| A8 | 1.3500516E−07 | −1.1453949E−07 | 5.3897974E−08 |
| A9 | −2.4803720E−08 | 2.1888708E−08 | −1.2727402E−07 |
| A10 | −1.8723938E−09 | 7.9898771E−10 | 1.2857110E−08 |
| A11 | 8.0577794E−10 | −3.9934602E−10 | 2.5804979E−09 |
| A12 | −1.7731338E−11 | 2.0192637E−11 | −4.9665355E−10 |
| A13 | −1.1813566E−11 | 2.0598360E−12 | −1.2729900E−11 |
| A14 | 7.7539764E−13 | −4.0622150E−13 | 7.7284107E−12 |
| A15 | 8.1796753E−14 | 2.4437975E−14 | −2.7728590E−13 |
| A16 | −8.2088961E−15 | 2.0691381E−15 | −5.1777634E−14 |
| A17 | −2.0720372E−16 | −3.4349874E−16 | 4.1321194E−15 |
| A18 | 3.4245187E−17 | 4.1338034E−18 | 7.0665097E−17 |
| A19 | −8.4971392E−20 | 1.1709868E−18 | −1.6337509E−17 |
| A20 | −3.9877417E−20 | −4.4798456E−20 | 4.5529454E−19 |

Example 10

Figure 21:
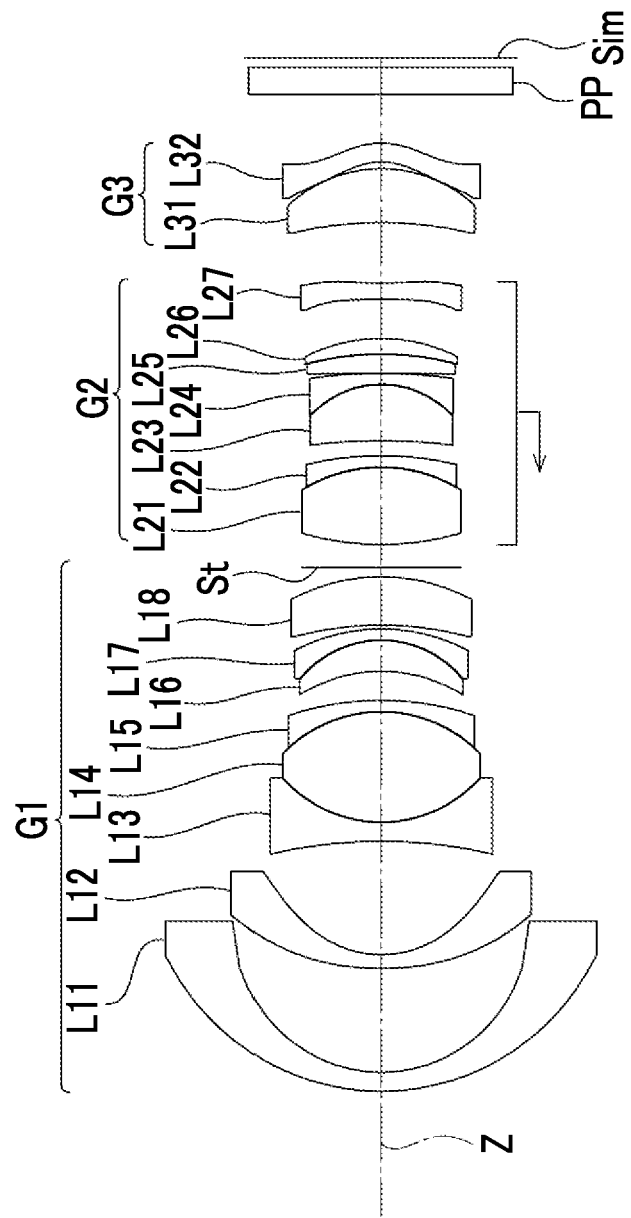
FIG. 21 is a cross-sectional view showing a configuration of an imaging lens of Example 10.

FIG. 21 is a cross-sectional view of a configuration of an imaging lens of Example 10. The imaging lens of Example 10 consists of, in order from the object side to the image side, a first lens group G1 that has a negative refractive power, a second lens group G2 that has a positive refractive power, and a third lens group G3 that has a positive refractive power. The first lens group G1 consists of eight lenses L11 to L18 and an aperture stop St, in order from the object side to the image side. The second lens group G2 consists of seven lenses L21 to L27, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves toward the object side.

Figure 22:
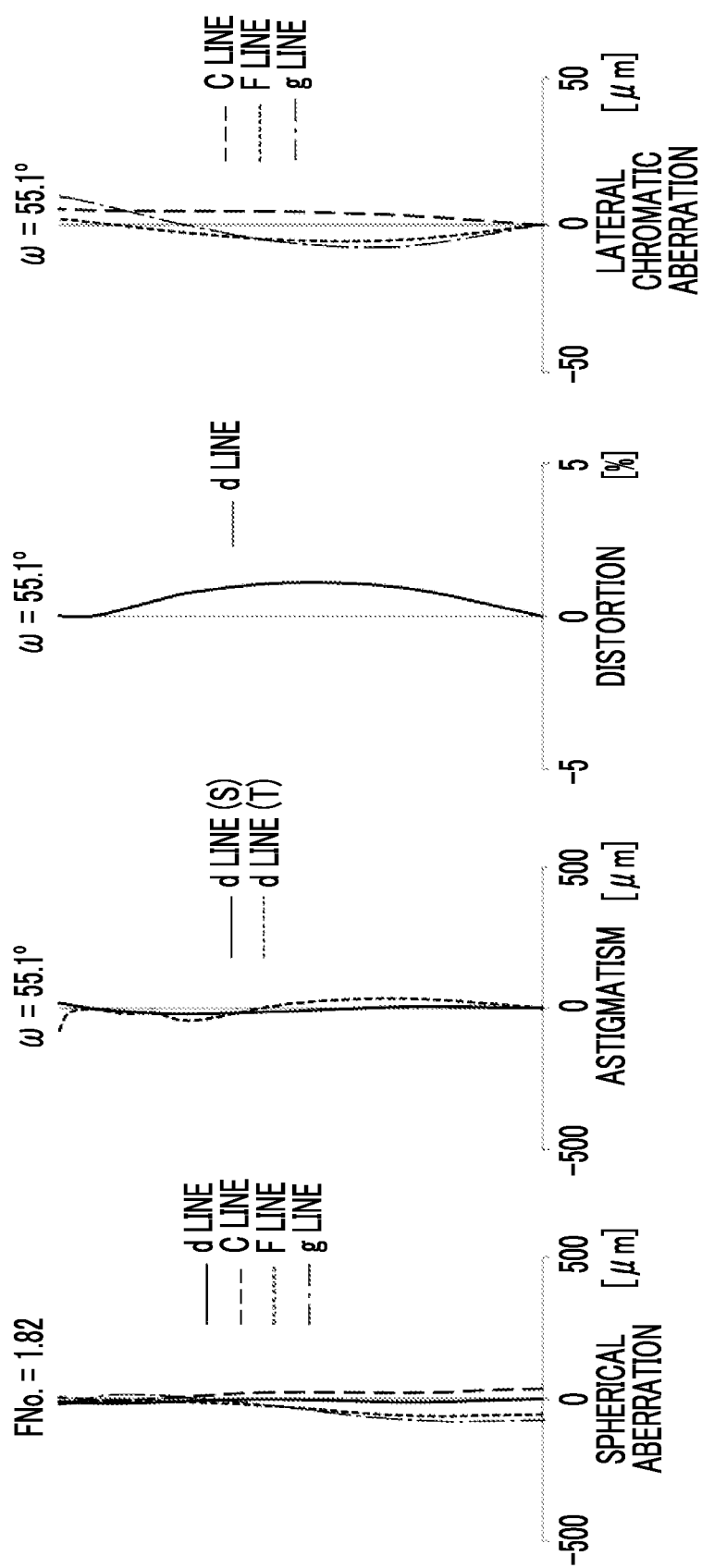
FIG. 22 is a diagram showing aberrations of the imaging lens of Example 10.

Regarding the imaging lens of Example 10, Table 37 shows basic lens data, Table 38 shows specifications, Table 39 shows variable surface spacings, and Table 40 shows aspherical coefficients thereof. FIG. 22 shows aberration diagrams.

TABLE 37

| | Example 10 | | | |
|---|---|---|---|---|
| Sn | R | D | Nd | vd |
| 1 | 26.1289 | 2.0000 | 1.51426 | 64.45 |
| 2 | 16.1004 | 10.9924 | | |
| *3 | 36.0265 | 1.4550 | 1.65234 | 58.88 |
| *4 | 12.3575 | 12.0000 | | |
| 5 | −53.0489 | 2.0000 | 1.64803 | 59.10 |
| 6 | 14.6983 | 11.6802 | 1.76649 | 23.51 |
| 7 | −15.2265 | 1.2000 | 2.05485 | 13.49 |
| 8 | −32.4348 | 3.1122 | | |
| *9 | −16.6518 | 3.2800 | 1.48735 | 65.49 |
| 10 | −11.5886 | 1.1844 | 1.99199 | 23.45 |
| 11 | −20.5606 | 0.4114 | | |
| 12 | −36.7955 | 4.9980 | 2.02755 | 15.16 |
| 13 | −21.2243 | 1.0000 | | |
| 14(St) | ∞ | 2.4206 | | Variable |
| 15 | 31.6590 | 8.1800 | 1.58006 | 70.73 |
| 16 | −16.6016 | 1.2000 | 1.87325 | 21.34 |
| 17 | −36.5937 | 1.5737 | | |
| 18 | −68.6009 | 5.9657 | 1.62987 | 60.01 |
| 19 | −10.6614 | 1.1750 | 1.90564 | 23.44 |
| 20 | −54.9924 | 0.0219 | | |
| 21 | −275.0133 | 2.0000 | 1.72924 | 55.04 |
| 22 | −32.3867 | 0.0048 | | |
| 23 | −32.5269 | 1.6572 | 2.02135 | 13.93 |
| 24 | −18.5296 | 4.1181 | | |
| *25 | −766.6253 | 1.7296 | 1.81890 | 46.11 |
| *26 | 43.9360 | 6.4420 | | Variable |
| 27 | −42.5727 | 5.6760 | 1.50037 | 81.19 |
| 28 | −15.2458 | 0.7125 | | |
| *29 | −7.5156 | 2.0007 | 1.79270 | 48.73 |
| *30 | −8.3235 | 5.1611 | | |
| 31 | ∞ | 2.8500 | 1.51680 | 64.20 |
| 32 | ∞ | 1.0245 | | |

TABLE 38

| Example 10 | |
|---|---|
| f | 10.25 |
| Bf | 8.06 |
| FNo | 1.82 |
| 2ω[°] | 110.2 |

TABLE 39

| Example 10 | | |
|---|---|---|
| | Infinity | 0.09 m |
| D14 | 2.4206 | 1.3769 |
| D26 | 6.4420 | 7.4857 |

TABLE 40

| | Example 10 | | |
|---|---|---|---|
| Sn | 3 | 4 | 9 |
| KA | 3.6121886E+00 | −3.7226183E+00 | −2.9320028E+00 |
| A3 | 0.0000000E+00 | 0.0000000E+00 | 0.0000000E+00 |

TABLE 40-continued

| | | Example 10 | |
|---|---|---|---|
| A4 | 1.0699059E−04 | 3.9810183E−04 | −1.0056185E−04 |
| A5 | −1.0627499E−05 | −1.2505065E−05 | 3.3216874E−06 |
| A6 | 5.7888160E−07 | −1.1690090E−06 | −1.4356767E−06 |
| A7 | −2.9636306E−08 | 1.1714155E−08 | 3.9836313E−07 |
| A8 | −1.8790143E−09 | 6.3468999E−09 | −3.2611121E−08 |
| A9 | 4.1223281E−10 | 1.8674895E−10 | −2.2857086E−09 |
| A10 | −1.4891090E−11 | −1.5920635E−11 | 3.7008246E−10 |
| A11 | −1.9250089E−13 | −1.4817119E−12 | 3.8081117E−11 |
| A12 | −2.7549148E−14 | −2.8722204E−13 | −6.5278472E−12 |
| A13 | 3.4550258E−15 | 5.1778848E−14 | −1.9827717E−13 |
| A14 | −3.3692979E−18 | −2.5436015E−15 | 7.4328954E−14 |
| A15 | −6.6190899E−18 | 3.6355556E−17 | −4.3033445E−15 |
| A16 | 1.5051321E−19 | −3.5885540E−19 | 8.2827657E−17 |

| Sn | 25 | 26 | 29 | 30 |
|---|---|---|---|---|
| KA | −7.7665829E+04 | 3.1201763E+00 | 3.2548940E−01 | −1.6018858E−01 |
| A3 | −2.3236378E−19 | 4.1234311E−20 | 1.2609711E−18 | 0.0000000E+00 |
| A4 | −2.8569355E−04 | −2.7136658E−04 | −6.9643115E−05 | 1.2452435E−04 |
| A5 | −2.8262372E−05 | −2.3608215E−05 | 1.4194437E−04 | 1.2860431E−05 |
| A6 | 6.9241370E−06 | 7.4639770E−06 | 2.4456983E−06 | 1.5158206E−05 |
| A7 | 3.1241630E−07 | −3.7847833E−07 | −2.9247897E−06 | −1.3908134E−06 |
| A8 | −1.6575794E−07 | −3.9599074E−08 | 8.2562184E−08 | −2.7423083E−07 |
| A9 | −1.2147471E−09 | 7.5570739E−10 | 3.6522859E−08 | 4.4179398E−08 |
| A10 | 2.6896145E−09 | 7.1796972E−10 | −2.7170221E−09 | 1.1773690E−09 |
| A11 | −1.7431709E−11 | −1.0410405E−11 | −2.7114345E−10 | −6.0886695E−10 |
| A12 | −2.6462971E−11 | −6.1653484E−12 | 3.0780198E−11 | 1.6149672E−11 |
| A13 | 3.3124887E−13 | 1.4650955E−13 | 1.1104561E−12 | 3.8094513E−12 |
| A14 | 1.3168297E−13 | 8.7070135E−15 | −1.6188219E−13 | −1.8795784E−13 |
| A15 | −1.0797078E−15 | 1.4173796E−15 | 1.9725525E−15 | −8.9462129E−15 |
| A16 | −2.8566256E−16 | −9.7237411E−17 | 3.3680732E−16 | 5.5004669E−16 |

Example 11

Figure 23:
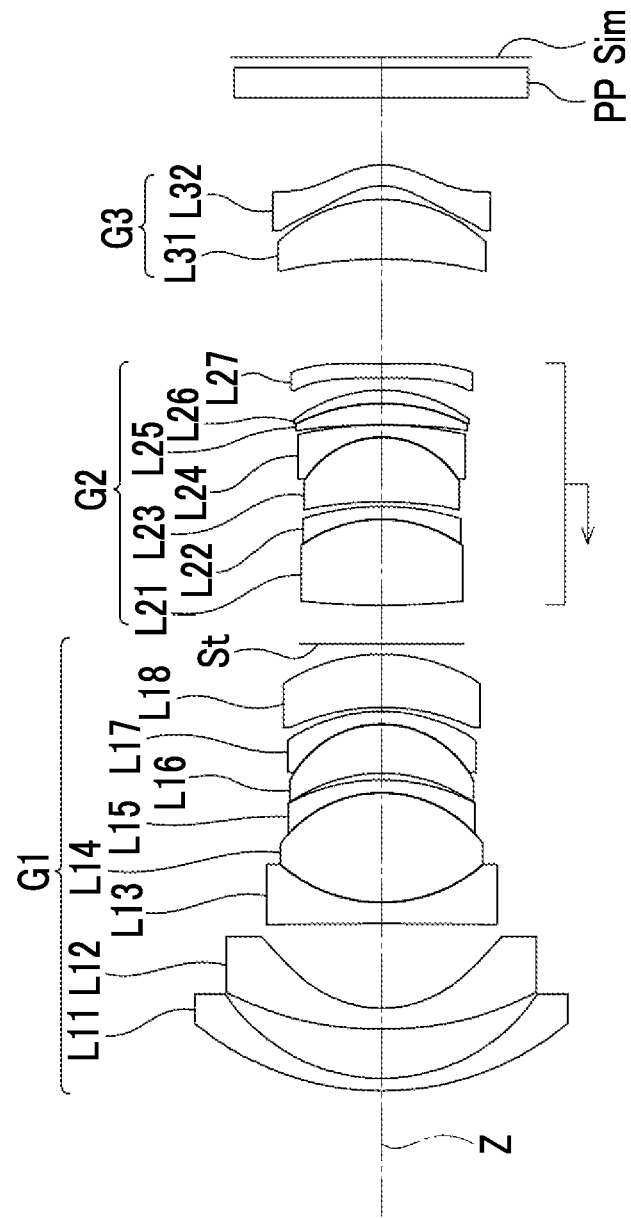
FIG. 23 is a cross-sectional view showing a configuration of an imaging lens of Example 11.

FIG. 23 is a cross-sectional view of a configuration of an imaging lens of Example 11. The imaging lens of Example 11 consists of, in order from the object side to the image side, a first lens group G1 that has a negative refractive power, a second lens group G2 that has a positive refractive power, and a third lens group G3 that has a positive refractive power. The first lens group G1 consists of eight lenses L11 to L18 and an aperture stop St, in order from the object side to the image side. The second lens group G2 consists of seven lenses L21 to L27, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves toward the object side.

Figure 24:
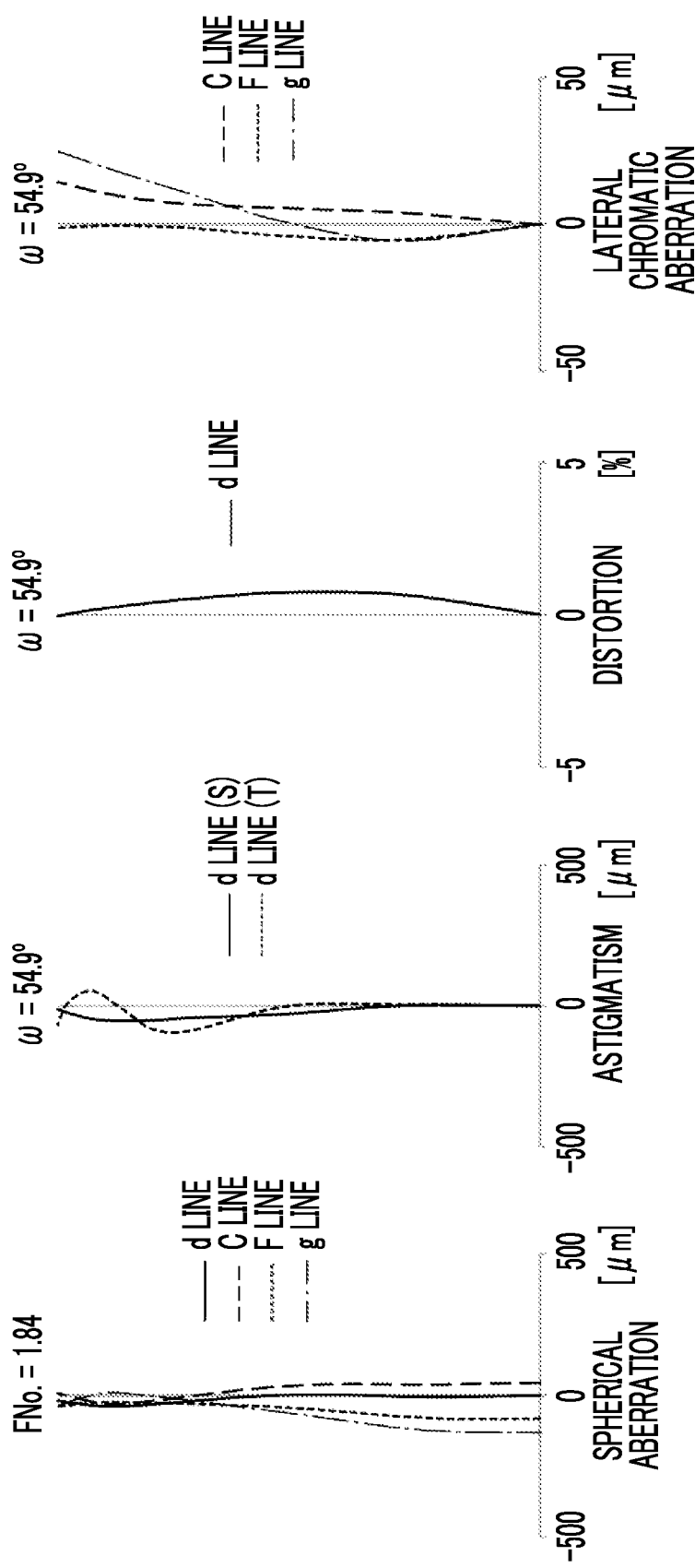
FIG. 24 is a diagram showing aberrations of the imaging lens of Example 11.

Regarding the imaging lens of Example 11, Table 41 shows basic lens data, Table 42 shows specifications, Table 43 shows variable surface spacings, and Table 44 shows aspherical coefficients thereof. FIG. 24 shows aberration diagrams.

TABLE 41

| | | Example 11 | | |
|---|---|---|---|---|
| Sn | R | D | Nd | vd |
| 1 | 29.0858 | 1.1797 | 1.85686 | 42.31 |
| 2 | 18.5395 | 4.7264 | | |
| *3 | 49.7638 | 1.9735 | 1.78480 | 49.52 |
| *4 | 12.1746 | 8.0654 | | |
| 5 | −666.3028 | 2.0094 | 1.60089 | 61.12 |
| 6 | 15.4101 | 10.4619 | 1.70802 | 29.60 |

TABLE 41-continued

| | | Example 11 | | |
|---|---|---|---|---|
| Sn | R | D | Nd | vd |
| 7 | −12.5761 | 1.2309 | 2.00000 | 25.51 |
| 8 | −19.9587 | 0.6308 | | |
| *9 | −15.6825 | 4.6725 | 1.51671 | 51.87 |
| 10 | −10.2198 | 1.2117 | 1.99809 | 28.19 |
| 11 | −16.9028 | 0.4114 | | |
| 12 | −21.7246 | 5.0763 | 2.00003 | 21.49 |
| 13 | −17.9835 | 1.0000 | | |
| 14(St) | ∞ | 3.5914 | | Variable |
| 15 | 81.9033 | 8.1800 | 1.57980 | 68.31 |
| 16 | −13.8133 | 1.2276 | 1.80550 | 28.08 |
| 17 | −26.4266 | 0.4453 | | |
| 18 | −39.1591 | 6.1532 | 1.62400 | 60.18 |
| 19 | −9.0146 | 1.1768 | 1.89790 | 26.52 |
| 20 | −37.1012 | 0.0219 | | |
| 21 | −63.7928 | 2.0144 | 1.65052 | 57.52 |
| 22 | −19.2222 | 1.2713 | 1.99986 | 16.29 |
| 23 | −14.4734 | 1.1727 | | |
| *24 | −434.1767 | 1.3447 | 1.84759 | 41.80 |
| *25 | 141.4486 | 10.0172 | | Variable |
| 26 | −43.2486 | 5.6760 | 1.43299 | 91.45 |
| 27 | −14.7781 | 1.3194 | | |
| *28 | −6.3477 | 1.9885 | 1.84182 | 43.82 |
| *29 | −7.4994 | 6.4058 | | |
| 30 | ∞ | 2.8500 | 1.51680 | 64.20 |
| 31 | ∞ | 1.0311 | | |

TABLE 42

| Example 11 | |
|---|---|
| f | 10.32 |
| Bf | 9.32 |
| FNo | 1.84 |
| 2ω[°] | 109.8 |

TABLE 43

Example 11

|     | Infinity | 0.05 m  |
|-----|----------|---------|
| D14 | 3.5914   | 1.9684  |
| D25 | 10.017   | 11.6400 |

TABLE 44

Example 11

| Sn  | 3 | 4 | 9 |
|-----|---|---|---|
| KA  | 3.3416686E+00 | −3.6065691E+00 | −2.9184652E+00 |
| A3  | 0.0000000E+00 | 0.0000000E+00 | 0.0000000E+00 |
| A4  | 1.1118298E−04 | 4.0271245E−04 | −1.3166276E−04 |
| A5  | −1.0783392E−05 | −1.3302149E−05 | 3.7345020E−06 |
| A6  | 5.7258725E−07 | −1.2122357E−06 | −1.3434206E−06 |
| A7  | −2.9524130E−08 | 9.1725087E−09 | 4.0195013E−07 |
| A8  | −1.8365920E−09 | 6.1690378E−09 | −3.2571444E−08 |
| A9  | 4.1223739E−10 | 1.7528537E−10 | −2.2850988E−09 |
| A10 | −1.4908759E−11 | −1.6129369E−11 | 3.7191990E−10 |
| A11 | −1.9604909E−13 | −1.5182761E−12 | 3.8205994E−11 |
| A12 | −2.7571925E−14 | −2.9032511E−13 | −6.5378135E−12 |
| A13 | 3.4739076E−15 | 5.1530748E−14 | −2.0240250E−13 |
| A14 | −2.4410801E−18 | −2.5734087E−15 | 7.3933018E−14 |
| A15 | −6.6273912E−18 | 3.5156948E−17 | −4.3079803E−15 |
| A16 | 1.4554886E−19 | −3.8175895E−19 | 9.6564449E−17 |

| Sn  | 24 | 25 | 28 | 29 |
|-----|----|----|----|----|
| KA  | −2.4837072E+04 | −5.2967877E+00 | 2.6465780E−01 | −2.0043733E−01 |
| A3  | −1.6899184E−19 | −6.7005755E−19 | 8.6691766E−19 | 0.0000000E+00 |
| A4  | −2.5200507E−04 | −2.0250482E−04 | 2.7496602E−05 | 8.9502349E−05 |
| A5  | −1.2353680E−05 | −1.5474752E−05 | 1.5406111E−04 | 2.0350561E−05 |
| A6  | 5.2197372E−06 | 5.7379218E−06 | 2.9206245E−06 | 1.6721085E−05 |
| A7  | −2.7764206E−07 | −6.4866156E−07 | −2.8206388E−06 | −1.5988787E−06 |
| A8  | −9.2663179E−08 | −4.4962421E−10 | 1.4874878E−08 | −2.9073343E−07 |
| A9  | 9.7576564E−09 | 5.5505790E−09 | 3.2444867E−08 | 4.7742316E−08 |
| A10 | 1.0445382E−09 | 7.0311721E−11 | −1.1513695E−09 | 1.1685092E−09 |
| A11 | −1.3147639E−10 | −5.9844854E−11 | −2.3313452E−10 | −6.4602384E−10 |
| A12 | −8.3476876E−12 | −4.7111959E−13 | 1.3541451E−11 | 1.7419788E−11 |
| A13 | 9.5448631E−13 | 4.1928195E−13 | 9.9115918E−13 | 4.0167119E−12 |
| A14 | 3.7135581E−14 | −1.3442229E−14 | −6.6756091E−14 | −1.9706429E−13 |
| A15 | −2.4699890E−15 | 7.9870454E−16 | −1.9569681E−15 | −9.4183252E−15 |
| A16 | −9.8790248E−17 | −7.2336010E−17 | 1.2682773E−16 | 5.7182445E−16 |

Example 12

Figure 25:
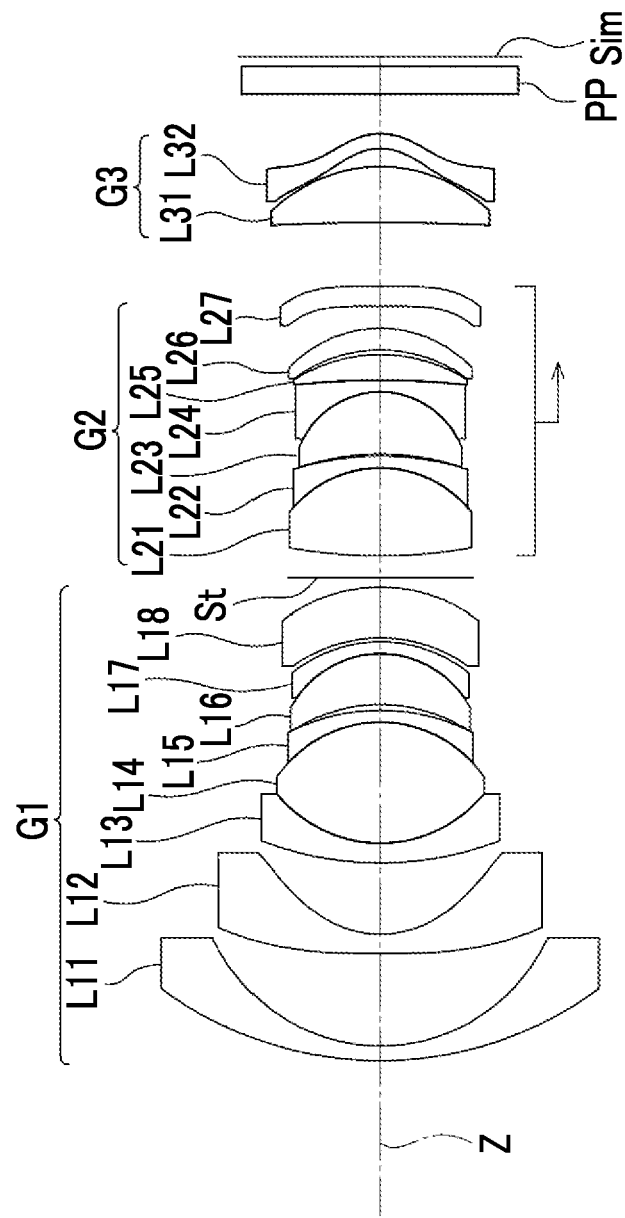
FIG. 25 is a cross-sectional view showing a configuration of an imaging lens of Example 12.

FIG. 25 is a cross-sectional view of a configuration of an imaging lens of Example 12. The imaging lens of Example 12 consists of, in order from the object side to the image side, a first lens group G1 that has a negative refractive power, a second lens group G2 that has a positive refractive power, and a third lens group G3 that has a positive refractive power. The first lens group G1 consists of eight lenses L11 to L18 and an aperture stop St, in order from the object side to the image side. The second lens group G2 consists of seven lenses L21 to L27, in order from the object side to the image side. The third lens group G3 consists of two lenses L31 and L32, in order from the object side to the image side. During focusing from the infinite distance object to the close object, the first lens group G1 and the third lens group G3 remain stationary with respect to the image plane Sim, and the second lens group G2 moves to the image side.

Figure 26:
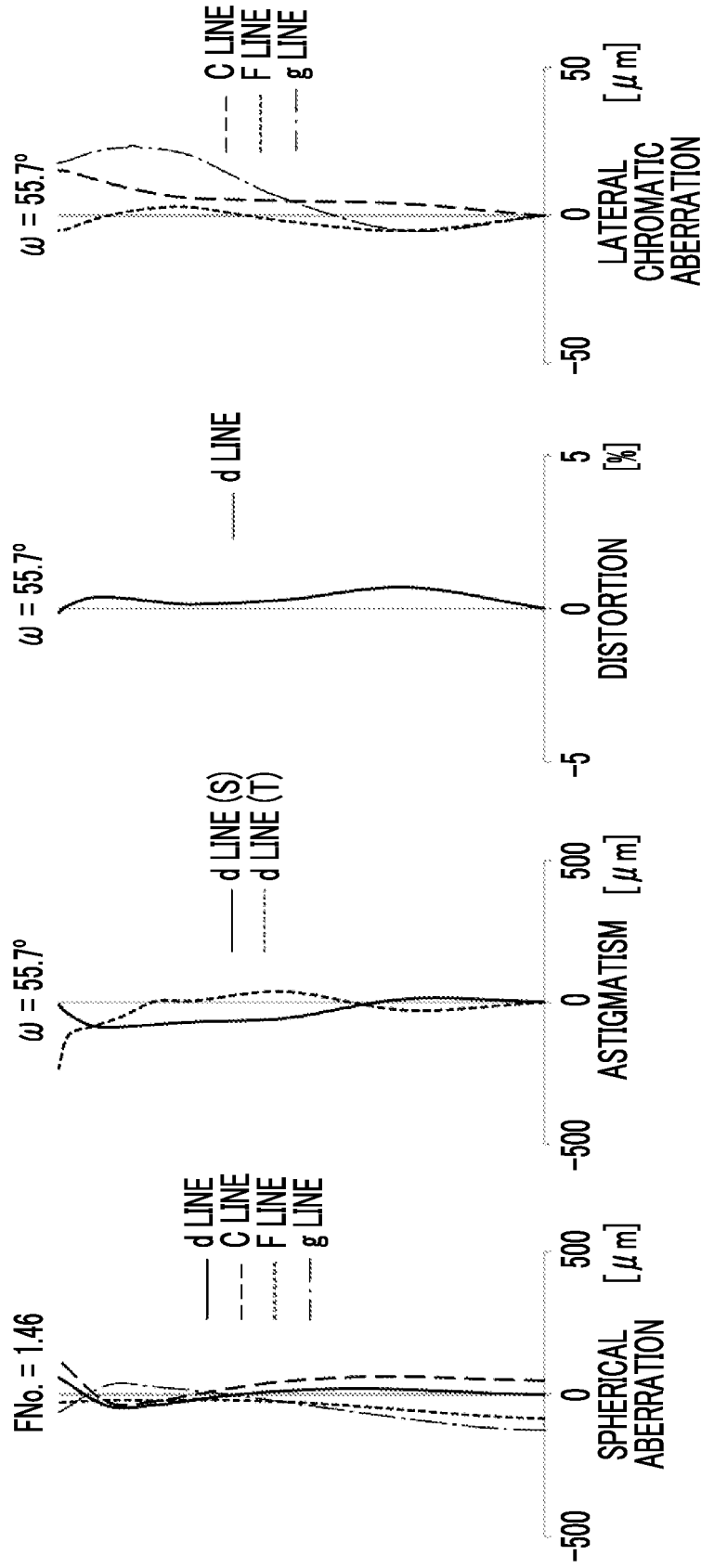
FIG. 26 is a diagram showing aberrations of the imaging lens of Example 12.

Regarding the imaging lens of Example 12, Table 45 shows basic lens data, Table 46 shows specifications, Table 47 shows variable surface spacings, and Table 48 shows aspherical coefficients thereof. FIG. 26 shows aberration diagrams.

TABLE 45

Example 12

| Sn | R | D | Nd | vd |
|----|---|---|-----|-----|
| 1  | 39.2296  | 1.4930 | 1.77317 | 50.68 |
| 2  | 19.4157  | 9.4349 |         |       |
| *3 | 490.6527 | 1.9547 | 1.51599 | 64.39 |

TABLE 45-continued

Example 12

| Sn | R | D | Nd | vd |
|----|---|---|-----|-----|
| *4 | 11.4411   | 7.2633  |         |       |
| 5  | 35.6151   | 2.0000  | 1.64111 | 59.45 |
| 6  | 14.2103   | 12.3314 | 1.68010 | 31.42 |
| 7  | −13.3443  | 1.2000  | 2.00000 | 28.00 |
| 8  | −21.8396  | 0.6010  |         |       |
| *9 | −16.9174  | 5.2067  | 1.51599 | 64.39 |
| 10 | −10.7737  | 1.2000  | 1.98323 | 29.68 |
| 11 | −15.1451  | 0.4114  |         |       |
| 12 | −16.0303  | 5.0590  | 2.00006 | 18.53 |
| 13 | −17.5498  | 1.0000  |         |       |
| 14(St) | ∞     | 2.1901  |         | Variable |
| 15 | 54.6773   | 8.9634  | 1.76048 | 54.70 |
| 16 | −12.3527  | 1.2100  | 1.71174 | 34.96 |
| 17 | −30.9333  | 0.1967  |         |       |
| 18 | −27.5805  | 6.3305  | 1.60237 | 61.06 |
| 19 | −9.2549   | 1.1750  | 1.88225 | 31.26 |
| 20 | −90.5247  | 2.6218  | 1.56505 | 62.50 |
| 21 | −17.2247  | 0.4711  |         |       |
| 22 | −15.5541  | 2.2057  | 1.91783 | 19.11 |
| 23 | −13.4180  | 2.2477  |         |       |
| *24| 1370.2636 | 2.0001  | 2.00001 | 15.00 |
| *25| 259.4181  | 6.5617  |         | Variable |

TABLE 45-continued

Example 12

| Sn | R | D | Nd | vd |
|---|---|---|---|---|
| 26 | −229.4996 | 5.6760 | 1.43299 | 91.45 |
| 27 | −16.7192 | 1.8604 | | |
| *28 | −6.0305 | 1.5000 | 1.93968 | 34.03 |
| *29 | −6.7831 | 3.9924 | | |
| 30 | ∞ | 2.8500 | 1.51680 | 64.20 |
| 31 | ∞ | 1.0366 | | |

TABLE 46

Example 12

| | |
|---|---|
| f | 10.04 |
| Bf | 6.91 |

TABLE 46-continued

Example 12

| | |
|---|---|
| FNo | 1.46 |
| 2ω[°] | 111.4 |

TABLE 47

Example 12

| | Infinity | 0.10 m |
|---|---|---|
| D14 | 2.1901 | 7.6321 |
| D25 | 6.5617 | 1.1197 |

TABLE 48

Example 12

| Sn | 3 | 4 | 9 |
|---|---|---|---|
| KA | 3.8458630E+00 | −3.5644005E+00 | −2.8839303E+00 |
| A3 | 0.0000000E+00 | 0.0000000E+00 | 0.0000000E+00 |
| A4 | 1.2296197E−04 | 4.1677373E−04 | −1.0092415E−04 |
| A5 | −1.0624154E−05 | −1.3708874E−05 | 4.6743005E−06 |
| A6 | 5.7149760E−07 | −1.3689759E−06 | −1.3757696E−06 |
| A7 | −2.9573520E−08 | 1.0786013E−08 | 3.9008768E−07 |
| A8 | −1.8417524E−09 | 6.5196388E−09 | −3.3440779E−08 |
| A9 | 4.1282192E−10 | 1.8555780E−10 | −2.3079136E−09 |
| A10 | −1.4786510E−11 | −1.5917984E−11 | 3.7363198E−10 |
| A11 | −2.0330401E−13 | −1.3212628E−12 | 3.8920722E−11 |
| A12 | −2.7567062E−14 | −2.8906728E−13 | −6.4753354E−12 |
| A13 | 3.4814398E−15 | 5.2028291E−14 | −2.0044316E−13 |
| A14 | −2.8750456E−18 | −2.5442044E−15 | 7.3630727E−14 |
| A15 | −6.5819706E−18 | 3.0300794E−17 | −4.3691065E−15 |
| A16 | 1.4618854E−19 | −3.3179282E−20 | 9.0525637E−17 |

| Sn | 24 | 25 | 28 | 29 |
|---|---|---|---|---|
| KA | 1.6812986E+04 | −3.5998985E+03 | 2.2682820E−01 | −3.9813155E−01 |
| A3 | 2.5348776E−19 | −1.6029838E−18 | −7.8810696E−20 | 1.4208854E−19 |
| A4 | −1.8964672E−04 | −1.5202093E−04 | −6.9178346E−04 | −3.3872471E−04 |
| A5 | −1.1913592E−05 | −1.6598193E−05 | 1.6833792E−04 | −3.9524306E−05 |
| A6 | 3.3033376E−06 | 4.8424979E−06 | 2.8286805E−05 | 3.2972617E−05 |
| A7 | −4.0344930E−07 | −7.9287110E−07 | −2.9417072E−06 | 7.5703721E−07 |
| A8 | −4.4339604E−08 | 2.0692225E−08 | −4.6413920E−07 | −6.6900395E−07 |
| A9 | 1.1661376E−08 | 9.1121550E−09 | 3.2870532E−08 | 5.0068289E−09 |
| A10 | 1.4018493E−10 | −4.0717830E−10 | 4.3304745E−09 | 6.8375545E−09 |
| A11 | −1.4510285E−10 | −9.8857977E−11 | −2.3751818E−10 | −2.4025398E−10 |
| A12 | 2.3329722E−12 | 5.7703565E−12 | −2.3370943E−11 | −3.3079914E−11 |
| A13 | 9.9323647E−13 | 6.2485340E−13 | 1.0555856E−12 | 2.0646965E−12 |
| A14 | −3.7307632E−14 | −5.6487573E−14 | 6.2431763E−14 | 4.1777050E−14 |
| A15 | −2.4624139E−15 | 3.7353781E−16 | −2.2141178E−15 | −5.6673105E−15 |
| A16 | 1.2740937E−16 | 4.8215250E−17 | −4.0040182E−17 | 1.1247535E−16 |

Table 49 shows corresponding values of Conditional Expressions (1) to (12) of the imaging lenses of Examples 1 to 12. Preferable ranges of the conditional expressions may be set by using the corresponding values of the examples shown in Table 49 as the upper limits or the lower limits of the conditional expressions.

TABLE 49

| Expression number | | Example 1 | Example 2 | Example 3 | Example 4 |
|---|---|---|---|---|---|
| (1) | FNo/tanω) | 1.39 | 1.42 | 1.40 | 1.79 |
| (2) | Bf/(f × tanω) | 0.75 | 0.75 | 0.75 | 0.77 |
| (3) | TTL × FNo/(f × tanω) | 8.83 | 8.83 | 8.79 | 9.80 |

TABLE 49-continued

| | | | | | |
|---|---|---|---|---|---|
| (4) | Denp/f | 1.21 | 1.17 | 1.22 | 0.97 |
| (5) | f/f2 | 0.45 | 0.49 | 0.48 | 0.51 |
| (6) | f/fL12 | −2.11 | −2.06 | −2.13 | −1.52 |
| (7) | STI/TTL | 0.37 | 0.36 | 0.39 | 0.42 |
| (8) | (Rf + Rr)/(Rf − Rr) | 0.113 | 0.156 | 0.117 | −0.044 |
| (9) | HG1/(f × tanω) | 1.258 | 1.217 | 1.273 | 0.976 |
| (10) | (R1f + R1r)/(R1f − R1r) | 1.432 | 1.349 | 1.484 | 4.299 |
| (11) | f/f3 | 0.036 | 0.001 | — | 0.001 |
| (12) | NL12ave | 1.506665 | 1.506665 | 1.506665 | 1.791565 |

| Expression number | | Example 5 | Example 6 | Example 7 | Example 8 |
|---|---|---|---|---|---|
| (1) | FNo/tanω) | 1.42 | 1.42 | 1.39 | 1.38 |
| (2) | Bf/(f × tanω) | 0.75 | 0.75 | 0.75 | 0.75 |
| (3) | TTL × FNo/(f × tanω) | 8.83 | 8.93 | 8.93 | 8.95 |
| (4) | Denp/f | 1.12 | 1.18 | 1.23 | 1.18 |
| (5) | f/f2 | 0.49 | 0.55 | 0.51 | 0.53 |
| (6) | f/fL12 | −1.95 | −1.99 | −1.80 | −1.68 |
| (7) | STI/TTL | 0.37 | 0.38 | 0.34 | 0.33 |
| (8) | (Rf + Rr)/(Rf − Rr) | 0.048 | −0.127 | −0.460 | −0.341 |
| (9) | HG1/(f × tanω) | 1.146 | 1.239 | 1.239 | 1.166 |
| (10) | (R1f + R1r)/(R1f − R1r) | 0.725 | 0.970 | 1.404 | 1.077 |
| (11) | f/f3 | 0.021 | −0.045 | −0.011 | −0.012 |
| (12) | NL12ave | 1.506665 | 1.476665 | 1.476665 | 1.476665 |

| Expression number | | Example 9 | Example 10 | Example 11 | Example 12 |
|---|---|---|---|---|---|
| (1) | FNo/tanω) | 1.42 | 1.27 | 1.29 | 1.00 |
| (2) | Bf/(f × tanω) | 0.75 | 0.55 | 0.63 | 0.47 |
| (3) | TTL × FNo/(f × tanω) | 9.17 | 13.41 | 12.23 | 10.05 |
| (4) | Denp/f | 1.21 | 2.22 | 1.43 | 2.07 |
| (5) | f/f2 | 0.45 | 0.33 | 0.34 | 0.32 |
| (6) | f/fL12 | −2.03 | −1.98 | −1.43 | −1.39 |
| (7) | STI/TTL | 0.37 | 0.50 | 0.43 | 0.48 |
| (8) | (Rf + Rr)/(Rf − Rr) | −0.062 | −0.622 | −0.964 | −1.947 |
| (9) | HG1/(f × tanω) | 1.277 | 2.388 | 1.373 | 2.016 |
| (10) | (R1f + R1r)/(R1f − R1r) | 1.153 | 4.211 | 4.516 | 2.960 |
| (11) | f/f3 | 0.040 | 0.217 | 0.141 | 0.211 |
| (12) | NL12ave | 1.476665 | 1.5833 | 1.82083 | 1.64458 |

The imaging lenses of Examples 1 to 12 each have an open F number smaller than 1.9 and a maximum total angle of view larger than 90 degrees in a state where the infinite distance object is in focus. That is, the imaging lenses of Examples 1 to 12 each have a small F number and a wide angle of view. Further, the imaging lenses of Examples 1 to 12 each are configured to have a small size, and maintain favorable optical performance by suppressing various aberrations.

Figure 27:
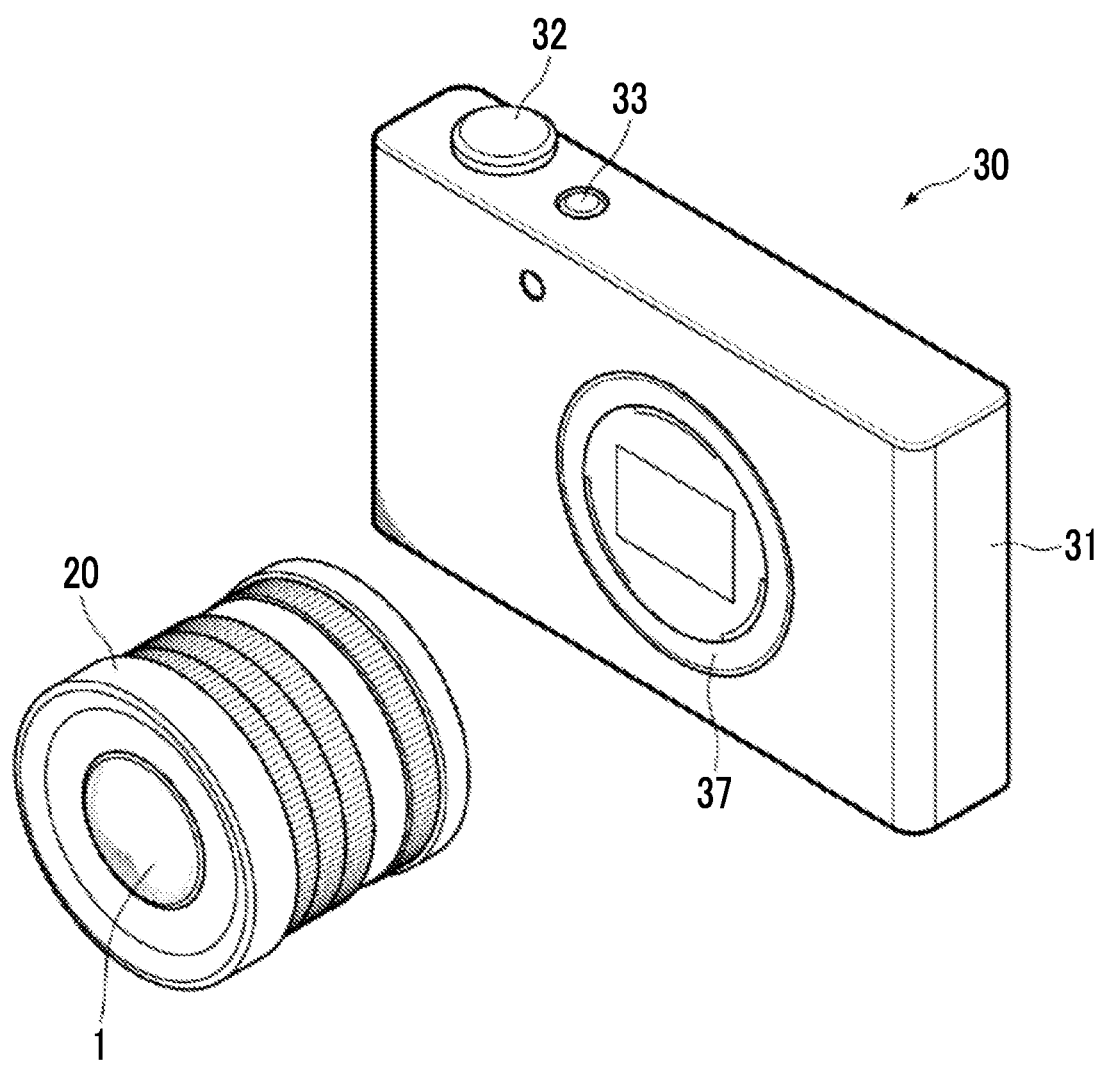
FIG. 27 is a perspective view of the front side of the imaging apparatus according to an embodiment.
Figure 28:
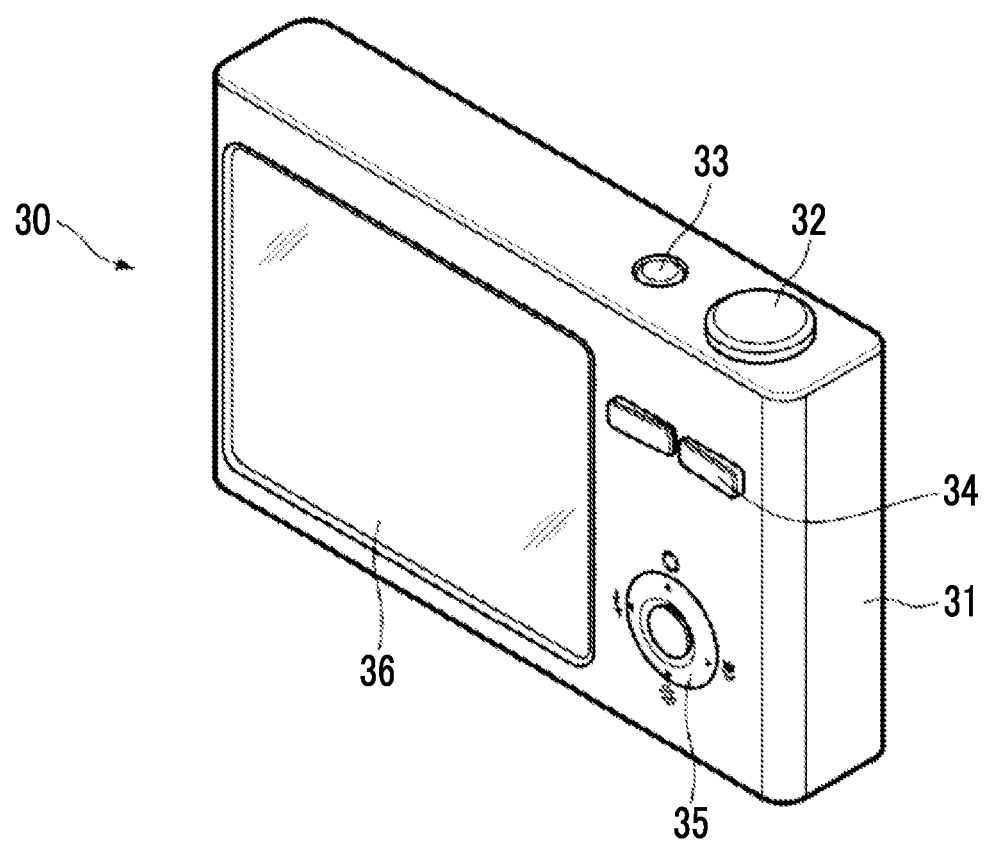
FIG. 28 is a perspective view of the rear side of the imaging apparatus according to the embodiment.

Next, an imaging apparatus according to an embodiment of the present disclosure will be described. FIGS. 27 and 28 are external views of a camera 30 which is the imaging apparatus according to the embodiment of the present disclosure. FIG. 27 is a perspective view of the camera 30 viewed from a front side, and FIG. 28 is a perspective view of the camera 30 viewed from a rear side. The camera 30 is a so-called mirrorless type digital camera, and the interchangeable lens 20 can be removably mounted thereon. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens comprising, successively in order from a position closest to an object side to an image side: a first lens group that has a negative refractive power; and a second lens group that has a positive refractive power,
wherein only the second lens group moves along an optical axis during focusing,
the first lens group includes, successively in order from the position closest to the object side to the image side, a first negative lens, a second negative lens, and a third negative lens, and
assuming that
an open F number in a state where an infinite distance object is in focus is FNo,
a maximum half angle of view in a state where the infinite distance object is in focus is ω,
a back focal length of the imaging lens at an air-equivalent distance in a state where the infinite distance object is in focus is Bf, and
a focal length of the imaging lens in a state where the infinite distance object is in focus is f,
Conditional Expressions (1) and (2) are satisfied, which are represented by $$0.8 < FNo/\tan \omega < 1.9 \quad (1), \text{ and}$$

$$0.3 < Bf/(f \times \tan \omega) < 1.2 \quad (2).$$

2. The imaging lens according to claim 1,
wherein assuming that a sum of Bf and a distance on the optical axis from a lens surface closest to the object side in the imaging lens to a lens surface closest to the image side in the imaging lens is TTL, Conditional Expression (3) is satisfied, which is represented by $$6 < TTL \times FNo/(f \times \tan \omega) < 15 \quad (3).$$

3. The imaging lens according to claim 1,
wherein assuming that a distance on the optical axis from a lens surface closest to the object side in the imaging lens to a paraxial entrance pupil position in a state where the infinite distance object is in focus is Denp, Conditional Expression (4) is satisfied, which is represented by $$0.7 < Denp/f < 3 \quad (4).$$

4. The imaging lens according to claim 1,
wherein assuming that a focal length of the second lens group is f2, Conditional Expression (5) is satisfied, which is represented by $$0.2 < f/f2 < 0.7 \quad (5).$$

5. The imaging lens according to claim 1,
wherein assuming that a combined focal length between the first negative lens and the second negative lens is fL12, Conditional Expression (6) is satisfied, which is represented by $$-2.75 < f/fL12 < -0.75 \quad (6).$$

6. The imaging lens according to claim 1,
wherein the imaging lens includes an aperture stop, and assuming that
a sum of Bf and a distance on the optical axis from the aperture stop to a lens surface closest to the image side in the imaging lens in a state where the infinite distance object is in focus is STI, and
a sum of Bf and a distance on the optical axis from a lens surface closest to the object side in the imaging lens to the lens surface closest to the image side in the imaging lens is TTL, Conditional Expression (7) is satisfied, which is represented by $$0.25 < STI/TTL < 0.6 \quad (7).$$

7. The imaging lens according to claim 1,
wherein the first lens group includes an air lens formed of two concave lens surfaces facing toward each other, and
assuming that
a paraxial curvature radius of an object side surface of the air lens of the first lens group is Rf, and
a paraxial curvature radius of an image side surface of the air lens of the first lens group is Rr,
Conditional Expression (8) is satisfied, which is represented by $$-1 < (Rf+Rr)/(Rf-Rr) < 0.5 \quad (8).$$

8. The imaging lens according to claim 1,
wherein assuming that a height of a principal ray with a maximum image height from an optical axis in a plane which is perpendicular to the optical axis and which passes through an intersection between the optical axis and a lens surface closest to the object side in the imaging lens in a state where the infinite distance object is in focus is HG1, Conditional Expression (9) is satisfied, which is represented by $$0.5 < HG1/(f \times \tan \omega) < 2.5 \quad (9).$$

9. The imaging lens according to claim 1,
wherein the first negative lens and the second negative lens are meniscus lenses having surfaces convex toward the object side.

10. The imaging lens according to claim 9,
wherein assuming that
a paraxial curvature radius of an object side surface of the first negative lens is R1f, and
a paraxial curvature radius of an image side surface of the first negative lens is R1r,
Conditional Expression (10) is satisfied, which is represented by $$1 < (R1f+R1r)/(R1f-R1r) < 3 \quad (10).$$

11. The imaging lens according to claim 1,
wherein the first lens group includes a positive lens disposed adjacent to the image side of the third negative lens, and
the third negative lens and the positive lens are cemented to each other.

12. The imaging lens according to claim 1,
wherein the imaging lens consists of, in order from the object side to the image side, the first lens group, the second lens group, and a third lens group that has a positive or negative refractive power.

13. The imaging lens according to claim 12,
wherein assuming that a focal length of the third lens group is f3, Conditional Expression (11) is satisfied, which is represented by $$-0.1 < f/f3 < 0.25 \quad (11).$$

14. The imaging lens according to claim 1,
wherein assuming that an average value of a refractive index of the first negative lens at a d line and a refractive index of the second negative lens at the d line is NL12ave, Conditional Expression (12) is satisfied, which is represented by $$1.5 < NL12ave < 1.95 \quad (12).$$

15. The imaging lens according to claim 1, comprising two or more cemented lenses closer to the image side than the first lens group.

16. The imaging lens according to claim 1,
wherein the first lens group includes four positive lenses.

17. The imaging lens according to claim 1,
wherein the first lens group includes five negative lenses.

18. The imaging lens according to claim 1, comprising three cemented lenses closer to the image side than the first lens group.

19. The imaging lens according to claim 1,
wherein either one of the first negative lens or the second negative lens has an object side surface and an image side surface which are aspherical surfaces.

20. An imaging apparatus comprising the imaging lens according to claim 1.

* * * * *